(12) United States Patent
Udall et al.

(10) Patent No.: US 12,001,614 B2
(45) Date of Patent: *Jun. 4, 2024

(54) CONFIDENCE-BASED APPLICATION-SPECIFIC USER INTERACTIONS

(71) Applicant: Google LLC, Mountain View, CA (US)

(72) Inventors: Ashton Udall, San Bruno, CA (US); Andrew Christopher Felch, Palo Alto, CA (US); James Paul Tobin, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,188

(22) Filed: Jul. 21, 2022

(65) Prior Publication Data

US 2022/0357801 A1 Nov. 10, 2022

Related U.S. Application Data

(63) Continuation of application No. 16/889,674, filed on Jun. 1, 2020, now Pat. No. 11,429,192, which is a
(Continued)

(51) Int. Cl.
G06V 40/20 (2022.01)
G01V 1/00 (2006.01)
G06F 3/01 (2006.01)

(52) U.S. Cl.
CPC .............. *G06F 3/017* (2013.01); *G01V 1/001* (2013.01); *G06V 40/20* (2022.01)

(58) Field of Classification Search
None
See application file for complete search history.

(56) References Cited

U.S. PATENT DOCUMENTS 9,442,564 B1 9/2016 Dillon
10,304,450 B2 5/2019 Tak et al.
(Continued)

FOREIGN PATENT DOCUMENTS

WO WO 2016094380 6/2016
WO WO 2020076287 4/2020

OTHER PUBLICATIONS

Dinh, D.L., et al., "Hand Gesture Recognition and Interface via a Depth Imaging Sensor for Smart Home Appliances", In Energy Procedia, vol. 62, 2014, pp. 576-582.
(Continued)

*Primary Examiner* — Rinna Yi
(74) *Attorney, Agent, or Firm* — Kilpatrick Townsend & Stockton LLP

(57) ABSTRACT

This application is directed to a method for controlling user experience (UX) operations on an electronic device that executes an application. A touchless UX operation associated with the application has an initiation condition including at least detection of a presence and a gesture in a required proximity range with a required confidence level. The electronic device then determines from a first sensor signal the proximity of the presence with respect to the electronic device. In accordance with a determination that the determined proximity is in the required proximity range, the electronic device determines from a second sensor signal a gesture associated with the proximity of the presence and an associated confidence level of the determination of the gesture. In accordance with a determination that the determined gesture and associated confidence level satisfy the initiation condition, the electronic device initializes the touchless UX operation associated with the application.

18 Claims, 26 Drawing Sheets

Related U.S. Application Data continuation of application No. PCT/US2019/035669, filed on Jun. 5, 2019.

(60) Provisional application No. 62/844,677, filed on May 7, 2019.

(56) References Cited

U.S. PATENT DOCUMENTS

| | | | |
|---|---|---|---|
| 10,687,184 | B2 | 6/2020 | Silverstein et al. |
| 2010/0188328 | A1 | 7/2010 | Dodge et al. |
| 2013/0229508 | A1 | 9/2013 | Li et al. |
| 2013/0271397 | A1 | 10/2013 | MacDougall et al. |
| 2013/0328763 | A1 | 12/2013 | Latta et al. |
| 2014/0330560 | A1* | 11/2014 | Venkatesha .......... G06F 21/32 704/235 |
| 2014/0368626 | A1 | 12/2014 | Archibald et al. |
| 2017/0059197 | A1 | 3/2017 | Goyal et al. |
| 2018/0012462 | A1 | 1/2018 | Heitz, III et al. |
| 2018/0321731 | A1 | 11/2018 | Alfano et al. |
| 2018/0342151 | A1 | 11/2018 | VanBlon et al. |

OTHER PUBLICATIONS

Extended European Search Report dated Mar. 1, 2021 in EP Patent Application No. 20206704.7.
Extended European Search Report dated May 12, 2021 in EP Patent Application No. 21155840.8.
International Search Report and Written Opinion dated Sep. 25, 2019 in International Patent Application No. PCT/US2019/035669.
Notice of Allowance dated Jan. 20, 2022 in U.S. Appl. No. 16/889,674.
Office Action dated Jul. 14, 2021 in U.S. Appl. No. 16/889,674.
Office Action dated Oct. 28, 2021 in U.S. Appl. No. 16/889,674.

* cited by examiner

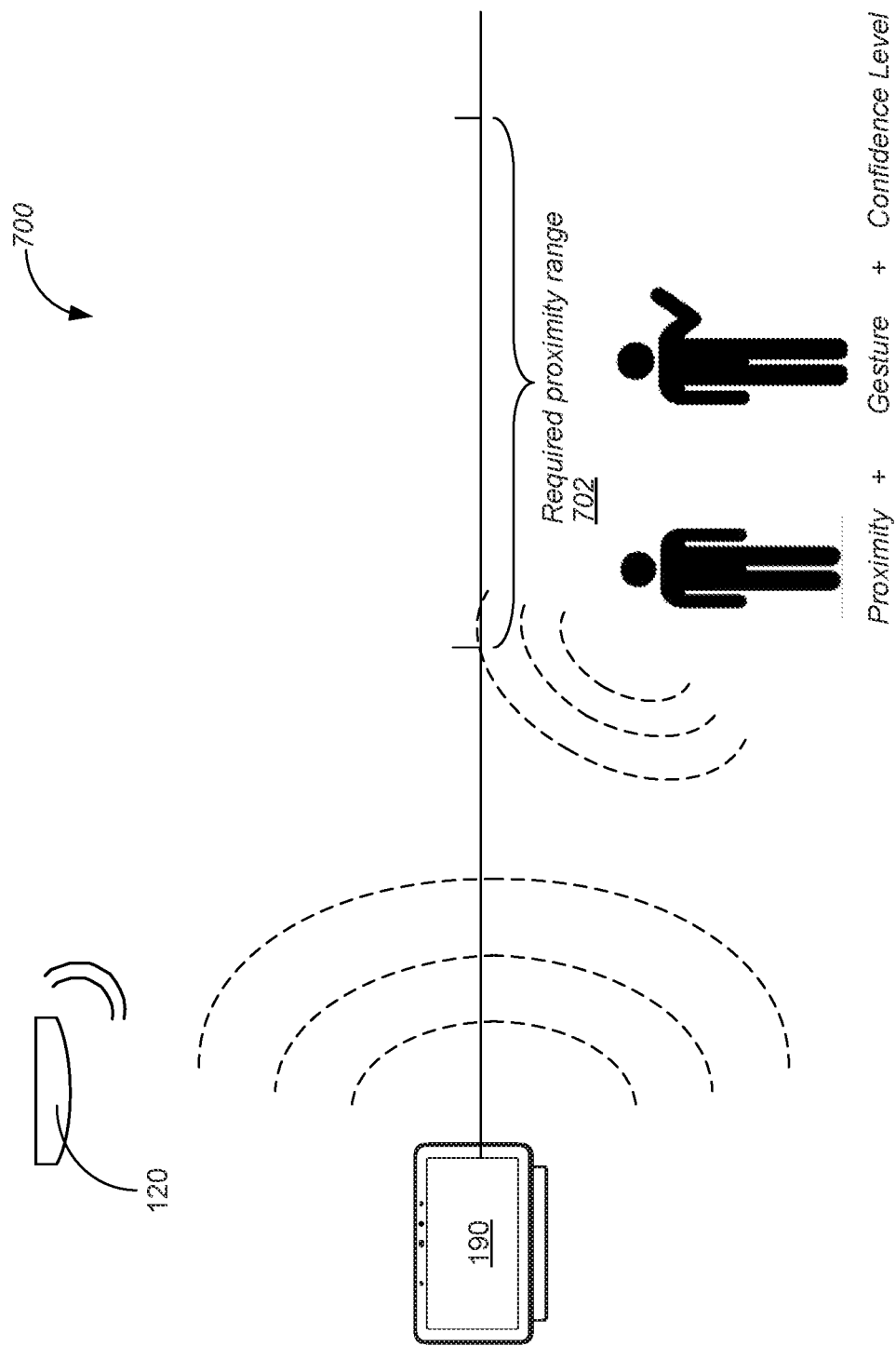

| Confidence Level | Range | Duration | Noise Suppression | Change Based | Machine Learning | UX Operations |
|---|---|---|---|---|---|---|
| Low | 0-3 feet | 50 ms | Y | Y | N | Touch Control 810 |
| Low | 0-6 feet | 50 ms | Y | N | N | Display Missed Message Notification 820 |
| High | 0-6 feet | 50 ms | Y | N | N | Play Missed Message Notification 820' |
| High | 0-6 feet | 5 s | Not Triggered in Noise | Y | N | Play Greetings and Daily Updates 830 |
| High | 0-4 feet 4-8 feet | 1 s | | Y | N | Alarm Volume Up 840 |
| Low | 0-4 feet 4-8 feet | 1 s | | Y | N | Alarm Volume Down 840 |
| High | 1-5 feet | 0.5 s | SNR increase if in range, ML | Y | Y | Gesture-based Operation (in music) 870 |
| Medium | 1-8 feet | 0.5 s | SNR increase if in range, ML | Y | Y | Gesture-based Operation (in quiet) 870 |
| Highest | 0-15 feet | 5 s | Highest SNR setting and ML if change detected | Y | Y | Security Alarm System 850 |
| Low | 0-15 feet | 10+ s | | Y | N | Logged onto Sleep Log (Sleep Monitor) 860 |

Figure 8B

CONFIDENCE-BASED APPLICATION-SPECIFIC USER INTERACTIONS

CROSS-REFERENCE TO RELATED APPLICATIONS

This application is a continuation of U.S. patent application Ser. No. 16/889,674, filed Jun. 1, 2020, which is a continuation of International Application No. PCT/US2019/035669, filed Jun. 5, 2019, which claims the benefit of U.S. Provisional Patent Application No. 62/844,677, filed May 7, 2019. International Application No. PCT/US2019/035669 is a continuation-in-part of International Patent Application No. PCT/US2018/048780, filed Aug. 30, 2018, which claims the benefit of U.S. Provisional Patent Application No. 62/680,982, filed Jun. 5, 2018. Each of the above-referenced patent applications is herein incorporated by reference in its entirety.

This application is related to International Patent Application No. PCT/US2018/064449, filed Dec. 7, 2018, and International Patent Application No. PCT/US2019/028601, filed Apr. 23, 2019. Each of these patent applications is herein incorporated by reference in its entirety.

TECHNICAL FIELD

This application relates generally to electronic devices, including but not limited to a display assistant device that provide touchless user experience operations associated with an application executed on the display assistant device.

BACKGROUND

Electronic devices integrated with cameras and microphones are extraordinarily popular. These devices are also referred to as smart home devices or smart assistant devices. They are widely used to capture and save an ever expanding collection of media files such as digital photos. They are also used to collect voice inputs from users and implement different voice-activated functions according to the voice inputs. For example, many state-of-the-art mobile devices include a voice assistant system (e.g., GOOGLE ASSISTANT) that is configured to use voice inputs to initiate a phone call, conduct a restaurant search, start routing on a map, create calendar events, add a post to a social network, recognize a song and complete many other tasks. These electronic devices are also used to perform functions such as voice calls and videoconferencing.

Despite the prevalence of electronic devices for assistant-based consumption uses, these electronic devices pay little attention to their physical context and rely on voice or touch inputs to initiate their functions at a right time. However, the voice or touch inputs can be disruptive to regular activities of users and compromise user experience with the electronic devices. It is beneficial to make an electronic device smart, contextual and delightful, e.g., proactively predict needs of its user in real time and provide user friendly interfaces with more relevant information.

SUMMARY

The present disclosure addresses the above-identified shortcomings by providing an electronic device (e.g., a display assistant device) that controls contextual and touchless user experience (UX) operations associated with one or more applications executed thereon. The electronic device is configured to initiate touchless UX operations (e.g., enabling display of user interfaces) according to a proximity of a presence, showing right amount of information and/or touch control options at a right distance. For example, most useful information is provided in a far view based on common user intents, and additional information and controls are provided in a near view when a user is sufficiently close to the electronic device. The touchless UX operations transition smoothly while the proximity of the presence varies. Each touchless UX operation is initiated based on an initiation condition involving a confidence level associated with a determination of the proximity of the presence.

In accordance with one aspect of the application, a method for controlling user experience (UX) operation is implemented at an electronic device having one or more processors and memory. The method includes identifying a first application being executed on the electronic device and identifying a first touchless UX operation associated with the first application. The first UX operation has an initiation condition including at least detection of a presence and a gesture in a required proximity range with a required confidence level. Optionally, the required confidence level is selected from a plurality of predetermined confidence levels. The method further includes identifying a first sensor signal that can be used to determine a proximity of a presence with respect to the electronic device for the initiation condition and determining from the first sensor signal the proximity of the presence with respect to the electronic device. The method further includes determining whether the determined proximity is in the required proximity range. The method further includes in accordance with a determination that the determined proximity is in the required proximity range, identifying a second sensor signal that can be used to capture a gesture of the presence within the required proximity range, determining from the second sensor signal the gesture associated with the proximity of the presence and an associated confidence level of the determination of the gesture, and determining whether the determined gesture and associated confidence level satisfy the initiation condition. The method further includes in accordance with a determination that the initiation condition has been satisfied, initializing the first UX operation associated with the first application.

In accordance with another aspect of the application, a method for controlling user experience (UX) operation is implemented at an electronic device having one or more processors and memory. The method includes identifying a first application being executed on the electronic device and identifying a first touchless UX operation associated with the first application. The first UX operation has an initiation condition including at least detection of a presence in a required proximity range with a required confidence level. Optionally, the required confidence level is selected from a plurality of predetermined confidence levels. The method further includes identifying a first sensor signal that can be used to determine a proximity of a presence with respect to the electronic device for the initiation condition, determining from the first sensor signal the proximity of the presence with respect to the electronic device and an associated confidence level of the determination, and determining whether the determined proximity and associated confidence level satisfy the initiation condition. The method further includes in accordance with the determination that the initiation condition has been satisfied, initializing the first UX operation associated with the first application.

In some implementations, the initiation condition includes a first initiation condition. The method further includes identifying a second application being executed on the electronic device and identifying a second touchless UX operation associated with the second application. The second UX operation has a second initiation condition including at least detection of a presence in the required proximity range with a second required confidence level. The first sensor signal is identified to determine the proximity of the presence with respect to the electronic device for both the first and second UX operations. The first sensor signal is identified according to a higher confidence level of the first required confidence level of the first touchless UX operation and the second required confidence level of the second touchless UX operation. Further, in some implementation, the second required confidence level is lower than the first required confidence level.

In some implementations, the initiation condition further includes detection of a required gesture in the required proximity range with the required confidence level. The method further includes in accordance with a determination that the determined proximity and associated confidence level satisfy the initiation condition, identifying a second sensor signal that can be used to capture a gesture of the presence within the required proximity range, determining from the second sensor signal a gesture associated with the proximity of the presence, and updating the associated confidence level based on the determination of the gesture. The method further includes determining whether the determined gesture and updated confidence level satisfy the initiation condition. The first UX operation associated with the first application is initialized in accordance with the determination that the initiation condition has been satisfied for the proximity of the presence and the gesture.

In some implementations, the initiation condition includes a first initiation condition including at least detection of the presence in a first required proximity range with a first required confidence level. The method further includes identifying a third touchless UX operation associated with the first application. The third UX operation has a third initiation condition including at least detection of the presence in a third proximity range with a third required confidence level. The third required proximity range is distinct from the first required proximity range. The method further includes in accordance with the determination that the third initiation condition has been satisfied, aborting the first UX operation and initializing the third UX operation associated with the first application. In some circumstances, each location in the first required proximity range has a first distance from the electronic device that is greater than a threshold distance, and each location in the third required proximity range has a second distance from the electronic device that is not greater than the threshold distance. In some implementations, the first UX operation is configured to display a first user interface on the electronic device, and the third UX operation is configured to display a second user interface on the electronic device. The second user interface is configured to display more information than the first user interface and optionally includes at least one actionable item In another aspect, an electronic device is configured to perform any of the methods described herein.

In another aspect, a non-transitory computer-readable storage medium stores one or more programs. The one or more programs comprise instructions, which when executed by an electronic device, cause the computer system to perform any of the methods described herein.

In some implementations, a mapping (e.g., a lookup table) is provided, for one or more applications executable on an electronic device, of available touchless UX operations to respective initiation conditions, each initiation condition requiring detection of a presence and a gesture in a required proximity range with a required confidence level selected from a plurality of confidence levels.

The applications can be a home screen application, a security application, a chat or other communication application, a media play application, a security application, an Internet browser and the like.

The electronic device includes multiple sensors capable of detection of the presence and/or the gesture to differing degrees of accuracy. The sensors include IR/motion, ultrasound, Radar, camera video/stills, Bluetooth radios, WiFi radios and the like. Different sensors have different inherent resolution capabilities, which determine at least in part the confidence with which signals from that sensor can be used to detect a presence and/or to determine whether a particular gesture occurred within the required proximity with the required confidence level.

In some implementations, different sensors on the same electronic device might be able to detect a presence and/or to determine whether a particular gesture occurred within the required proximity with the required confidence level, but processing signals from those sensors might take different amounts of time and require different processing techniques. For example, processing ultrasound signals (which can be done using on-device DSP techniques) might be faster than processing video from a camera (which might require the use of machine learning processing performed on the electronic device and/or in the cloud). What signals and/or processing techniques to use depends on required response times associated with an application and/or initiation conditions for an associated UX operation.

In some implementations, the electronic device performs an initial fast determination using less accurate sensor signals (e.g., from a PIR motion sensor) to identify a presence, which identification might not be accurate enough to determine whether a particular initiation condition has been triggered for a particular gesture, and then, if a presence is identified (e.g., in the approximate required range), more accurate sensor signals are collected then processed (in a slower, more compute intensive process, such as an ML-based process) to determine whether a particular gesture occurred within the required proximity.

In some implementations, confidence-based UX initiation processing adapts performance of the sensors to fit the requirements of a particular initiation condition. For example, if only video processing is available to identify a media control or security control gesture to a required confidence level, then the confidence-based determination processing might, after identifying a presence using less accurate sensor signals, might control the electronic device to turn on its screen to max brightness, or turn on its IR illuminators, to better capture facial or gesture details in order to be able to identify a particular touchless UX gesture at a required confidence level.

Similarly, confidence-based UX initiation processing can increase signal strength based on ambient conditions so sensors and associated sensor processing can operate with a high signal to noise ratio in order to identify a presence and/or gesture to a required confidence level.

For example, when music is playing, and ultrasound sensing is being used to identify a gesture, the ultrasound signal volume can be increased to provide an improved SNR, and the resulting received signals can be processed using highly accurate machine learning techniques in lieu of DSP-based techniques.

Similarly, when a presence is backlit or a room is dark, which might provide too low SNR for accurate facial detection, the device screen brightness can be increased in order to provide higher SNR for visual processing of facial and/or gesture features of the presence Similarly, when an environment is quiet and/or pets with sensitive hearing are present, ultrasound sensing might not be used to identify presences, or the ultrasound amplitude might be decreased, to avoid making the pets uncomfortable.

In some implementations, when multiple applications are executing concurrently on an electronic device, and each of the applications is associated with one or more touchless UX operations with proximity-based initiation conditions, the electronic device employs the sensors and/or processing techniques for proximity and/or gesture identification that are appropriate to the highest associated required confidence levels for initiation of the multiple UX operations.

In some implementations, when one application is executing on an electronic device and that application is associated with multiple touchless UX operations with proximity-based initiation conditions, the electronic device employs the sensors and/or processing techniques for proximity and/or gesture identification that are appropriate to the associated required confidence levels for initiation of the multiple UX operations.

ML techniques can be performed on device and/or in the cloud. DSP techniques can be performed on device and/or in the cloud, but tend to be executed on device as they can provide results in very little time.

In some implementations, on-device processing of sensor inputs is employed where feasible to reduce the transmission of information collected from home and work environments to the cloud, which benefits user privacy.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 7 is a presentative operating environment in which an electronic device controls a first touchless UX operation based on detection of a presence and/or a gesture in a required proximity range with a required confidence level in accordance with some implementations.

FIG. 8B is a table summarizing the initiation conditions for the UX operations listed in FIG. 8A in accordance with some implementations.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Display assistant devices integrated with microphones and cameras can be used to collect audio and visual inputs from users and implement voice-activated functions according to voice inputs. Some display assistant devices include a voice assistant feature that is configured to use audio inputs to perform many tasks. The functionality of these display assistant devices can be further expanded to understand the context of a smart home environment where the devices are disposed and initiate contextual and touchless user experience (UX) operations adaptively. The electronic device is configured to initiate touchless UX operations (e.g., enabling display of user interfaces) according to a proximity of a presence and/or a gesture associated with the proximity, thereby showing right amount of information and/or touch control options at a right distance. For example, as a user approaches the display assistant devices, their user interfaces are updated to provide more information and selectable affordances automatically and without user intervention (i.e., without voice or touch inputs).

Figure 1A:
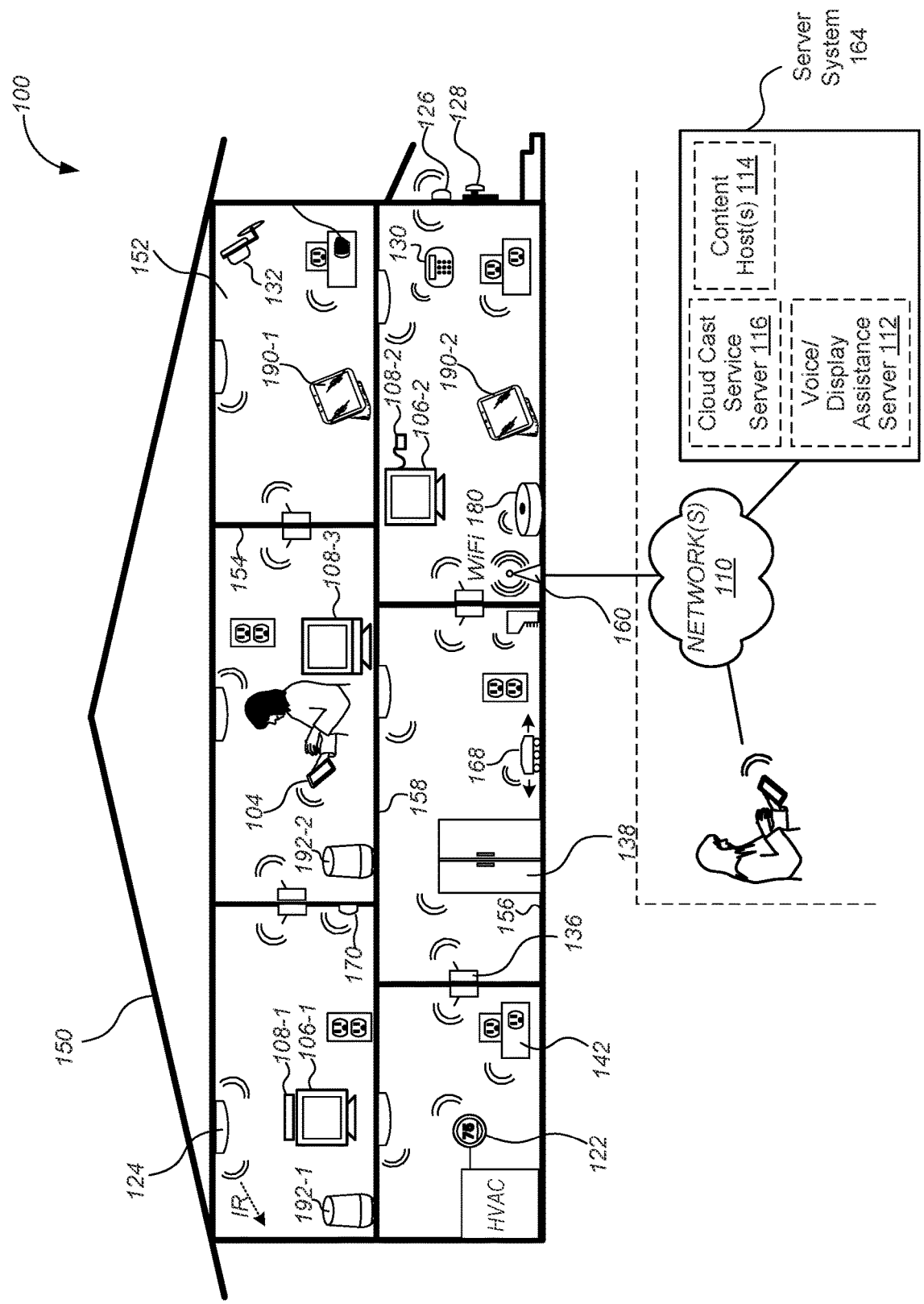
FIG. 1A is an example smart home environment in accordance with some implementations.

FIG. 1A is an example smart home environment 100 in accordance with some implementations. The smart home environment 100 includes a structure 150 (e.g., a house, office building, garage, or mobile home) with various integrated devices (also referred to herein as "connected" or "smart" devices). It will be appreciated that smart devices may also be integrated into a smart home environment 100 that does not include an entire structure 150, such as an apartment, condominium, or office space. In some implementations, the smart devices include one or more of: personal client devices 104 (e.g., tablets, laptops or mobile phones), display devices 106, media casting or streaming devices 108, thermostats 122, home protection devices 124 (e.g., smoke, fire and carbon dioxide detector), home security devices (e.g., motion detectors, window and door sensors and alarms), including connected doorbell/cameras 126, connected locksets 128, alarm systems 130 and cameras 132, connected wall switches transponders 136, connected appliances 138, WiFi communication devices 160 (e.g., hubs, routers, extenders), connected home cleaning devices 168 (e.g., vacuum or floor cleaner), smart home communication and control hubs 180, voice assistant devices 192, and display assistant devices 190.

It is to be appreciated that the term "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, yards, parks, and more generally any living space or work space.

It is also to be appreciated that while the terms user, customer, installer, homeowner, occupant, guest, tenant, landlord, repair person, and the like may be used to refer to a person or persons acting in the context of some particular situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158.

One or more media devices are disposed in the smart home environment 100 to provide users with access to media content that is stored locally or streamed from a remote content source (e.g., content host(s) 114). In some implementations, the media devices include media output devices 106, which directly output/display/play media content to an audience, and cast devices 108, which stream media content received over one or more networks to the media output devices 106. Examples of the media output devices 106 include, but are not limited to, television (TV) display devices, music players and computer monitors. Examples of the cast devices 108 include, but are not limited to, medial streaming boxes, casting devices (e.g., GOOGLE CHROMECAST devices), set-top boxes (STBs), DVD players and TV boxes.

In the example smart home environment 100, media output devices 106 are disposed in more than one location, and each media output device 106 is coupled to a respective cast device 108 or includes an embedded casting unit. The media output device 106-1 includes a TV display that is hard wired to a DVD player or a set top box 108-1. The media output device 106-2 includes a smart TV device that integrates an embedded casting unit to stream media content for display to its audience. The media output device 106-3 includes a regular TV display that is coupled to a TV box 108-3 (e.g., Google TV or Apple TV products), and such a TV box 108-3 streams media content received from a media content host server 114 and provides an access to the Internet for displaying Internet-based content on the media output device 106-3.

In addition to the media devices 106 and 108, one or more electronic devices 190 and 192 are disposed in the smart home environment 100. Electronic devices 190 are display assistant devices and electronic devices 192 are voice assistant devices. In some implementations, the display assistant device 190 is also a voice assistant device. The electronic devices 190 and 192 collect audio inputs for initiating various media play functions of the devices 190 and 192 and/or media devices 106 and 108. In some implementations, the devices 190 and 192 are configured to provide media content that is stored locally or streamed from a remote content source. In some implementations, the electronic devices 190 and 192 are voice-activated and are disposed in proximity to a media device, for example, in the same room with the cast devices 108 and the media output devices 106. Alternatively, in some implementations, a voice-activated display assistant device 190-1 is disposed in a room having one or more smart home devices but not any media device. Alternatively, in some implementations, a voice-activated electronic device 190 is disposed in a location having no networked electronic device. This allows for the devices 190 and 192 to communicate with the media devices and share content that is being displayed on one device to another device (e.g., from device 190-1 to device 190-2 and/or media devices 108).

The voice-activated electronic device 190 includes at least one microphone, a speaker, a processor and memory storing at least one program for execution by the processor. The speaker is configured to allow the electronic device 190 to deliver voice messages to a location where the electronic device 190 is located in the smart home environment 100, thereby broadcasting information related to a current media content being displayed, reporting a state of audio input processing, having a conversation with or giving instructions to a user of the electronic device 190. For instance, in some embodiments, in response to a user query the device provides audible information to the user through the speaker. As an alternative to the voice messages, visual signals could also be used to provide feedback to the user of the electronic device 190 concerning the state of audio input processing, such as a notification displayed on the device.

In accordance with some implementations, an electronic device 190 is a voice interface device that is network-connected to provide voice recognition functions with the aid of a server system 164. In some implementations, the server system 164 includes a cloud cast service server 116 and/or a voice/display assistance server 112. For example, in some implementations an electronic device 190 includes a smart speaker that provides music (e.g., audio for video content being displayed on the device 190 or on a display device 106) to a user and allows eyes-free and hands-free access to a voice assistant service (e.g., Google Assistant). Optionally, the electronic device 190 is a simple and low cost voice interface device, e.g., a speaker device and a display assistant device (including a display screen having no touch detection capability).

In some implementations, the voice-activated electronic devices 190 integrates a display screen in addition to the microphones, speaker, processor and memory (e.g., 190-1 and 190-2), and are referred to as "display assistant devices." The display screen is configured to provide additional visual information (e.g., media content, information pertaining to media content, etc.) in addition to audio information that can be broadcast via the speaker of the voice-activated electronic device 190. When a user is nearby and his or her line of sight is not obscured, the user may review the additional visual information directly on the display screen of the display assistant device. Optionally, the additional visual information provides feedback to the user of the electronic device 190 concerning the state of audio input processing. Optionally, the additional visual information is provided in response to the user's previous voice inputs (e.g., user queries), and may be related to the audio information broadcast by the speaker. In some implementations, the display screen of the voice-activated electronic devices 190 includes a touch display screen configured to detect touch inputs on its surface (e.g., instructions provided through the touch display screen). Alternatively, in some implementations, the display screen of the voice-activated electronic devices 190 is not a touch display screen, which is relatively expensive and can compromise the goal of offering the display assistant device 190 as a low cost user interface solution.

When voice inputs from the electronic device 190 are used to control the electronic device 190 and/or media output devices 106 via the cast devices 108, the electronic device 190 effectively enables a new level of control of cast-enabled media devices independently of whether the electronic device 190 has its own display. In an example, the electronic device 190 includes a casual enjoyment speaker with far-field voice access and functions as a voice interface device for Google Assistant. The electronic device 190 could be disposed in any room in the smart home environment 100. When multiple electronic devices 190 are distributed in multiple rooms, they become audio receivers that are synchronized to provide voice inputs from all these rooms. For instant, a first electronic device 190 may receive a user instruction that is directed towards a second electronic device 190-2 (e.g., a user instruction of "OK Google, show this photo album on the Kitchen device.").

Specifically, in some implementations, an electronic device 190 includes a WiFi speaker with a microphone that is connected to a voice-activated personal assistant service (e.g., Google Assistant). A user could issue a media play request via the microphone of electronic device 190, and ask the personal assistant service to play media content on the electronic device 190 itself and/or on another connected media output device 106. For example, the user could issue a media play request by saying to the Wi-Fi speaker "OK Google, Play cat videos on my Living room TV." The personal assistant service then fulfils the media play request by playing the requested media content on the requested device using a default or designated media application.

A user could also make a voice request via the microphone of the electronic device 190 concerning the media content that has already been played and/or is being played on a display device. For instance, a user may instruct the device to provide information related to a current media content being displayed, such as ownership information or subject matter of the media content. In some implementations, closed captions of the currently displayed media content are initiated or deactivated on the display device by voice when there is no remote control or a second screen device is available to the user. Thus, the user can turn on the closed captions on a display device via an eyes-free and hands-free voice-activated electronic device 190 without involving any other device having a physical user interface, and such a voice-activated electronic device 190 satisfies federal accessibility requirements for users having hearing disability. In some implementations, a user wants to take a current media session with them as they move through the house. This requires the personal assistant service to transfer the current media session from a first cast device to a second cast device that is not directly connected to the first cast device or has no knowledge of the existence of the first cast device. Subsequent to the media content transfer, a second output device 106 coupled to the second cast device 108 continues to play the media content previously a first output device 106 coupled to the first cast device 108 from the exact point within a photo album or a video clip where play of the media content was forgone on the first output device 106.

In some implementations, the display assistant device 190 includes a display screen and one- or more built in cameras. The cameras are configured to capture images and/or videos, which are then transmitted (e.g., streamed) to a server system 164 for display on client devices(s) (e.g., authorized client devices 104 and 220, FIG. 2C).

In some implementations, the voice-activated electronic devices 190, smart home devices could also be mounted on, integrated with and/or supported by a wall 154, floor 156 or ceiling 158 of the smart home environment 100 (which is also broadly called as a smart home environment in view of the existence of the smart home devices). The integrated smart home devices include intelligent, multi-sensing, network-connected devices that integrate seamlessly with each other in a smart home network (e.g., 102 FIG. 1B) and/or with a central server or a cloud-computing system to provide a variety of useful smart home functions. In some implementations, a smart home device is disposed at the same location of the smart home environment 100 as a cast device 108 and/or an output device 106, and therefore, is located in proximity to or with a known distance with respect to the cast device 108 and the output device 106.

In some implementations, the smart home devices in the smart home environment 100 includes, but is not limited to, one or more intelligent, multi-sensing, network-connected camera systems 132. In some embodiments, content that is captured by the camera systems 132 is displayed on the electronic devices 190 at a request of a user (e.g., a user instruction of "OK Google, Show the baby room monitor.") and/or according to settings of the home environment 100 (e.g., a setting to display content captured by the camera systems during the evening or in response to detecting an intruder).

The smart home devices in the smart home environment 100 may include, but are not limited to, one or more intelligent, multi-sensing, network-connected thermostats 122, one or more intelligent, network-connected, multi-sensing hazard detectors 124, one or more intelligent, multi-sensing, network-connected entryway interface devices 126 and 128 (hereinafter referred to as "smart doorbells 126" and "smart door locks 128"), one or more intelligent, multi-sensing, network-connected alarm systems 130, one or more intelligent, multi-sensing, network-connected camera systems 132, and one or more intelligent, multi-sensing, network-connected wall switches 136. In some implementations, the smart home devices in the smart home environment 100 of FIG. 1 includes a plurality of intelligent, multi-sensing, network-connected appliances 138 (hereinafter referred to as "smart appliances 138"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth.

The smart home devices in the smart home environment 100 may additionally or alternatively include one or more other occupancy sensors (e.g., touch screens, IR sensors, ambient light sensors and motion detectors). In some implementations, the smart home devices in the smart home environment 100 include radio-frequency identification (RFID) readers (e.g., in each room 152 or a portion thereof) that determine occupancy based on RFID tags located on or embedded in occupants. For example, RFID readers may be integrated into the smart hazard detectors 104.

In some implementations, in addition to containing sensing capabilities, devices 122, 124, 126, 128, 130, 132, 136, 138, and 190 (which are collectively referred to as "the smart home devices" or "the smart home devices 120") are capable of data communications and information sharing with other smart home devices, a central server or cloud-computing system, and/or other devices (e.g., the client device 104, the cast devices 108 and the voice-activated electronic devices 190) that are network-connected. Similarly, each of the cast devices 108 and the voice-activated electronic devices 190 is also capable of data communications and information sharing with other cast devices 108, voice-activated electronic devices 190, smart home devices, a central server or cloud-computing system 164, and/or other devices (e.g., the client device 104) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the cast devices 108, the electronic devices 190 and the smart home devices serve as wireless or wired repeaters. In some implementations, a first one of and the cast devices 108 communicates with a second one of the cast devices 108 and the smart home devices 120 via a wireless router. The cast devices 108, the electronic devices 190 and the smart home devices 120 may further communicate with each other via a connection (e.g., network interface 160) to a network, such as the Internet 110. Through the Internet 110, the cast devices 108, the electronic devices 190 and the smart home devices 120 may communicate with a server system 164 (also called a central server system and/or a cloud-computing system herein). Optionally, the server system 164 may be associated with a manufacturer, support entity, or service provider associated with the cast devices 108 and the media content displayed to the user.

In general, any of the connected electronic devices described herein can be configured with a range of capabilities for interacting with users in the environment. For example, an electronic device can be configured with one or more microphones, one or more speakers and voice-interaction capabilities in which a user interacts with the device display assistant device via voice inputs received by the microphone and audible outputs played back by the speakers to present information to users. Similarly, an electronic device can be configured with buttons, switches and/or other touch-responsive sensors (such as a touch screen, touch panel, or capacitive or resistive touch sensors) to receive user inputs, and with haptic or other tactile feedback capabilities to provide tactile outputs to users. An electronic device can also be configured with visual output capabilities, such as a display panel and/or one or more indicator lights to output information to users visually, as described in U.S. patent application Ser. No. 15/592,120, titled "LED Design Language for Visual Affordance of Voice User Interfaces," which is incorporated herein by reference. In addition, an electronic device can be configured with movement sensors that can detect movement of objects and people in proximity to the electronic device, such as a radar transceiver(s) or PIR detector(s), as described in U.S. patent application Ser. No. 15/481,289, titled "Systems, Methods, and Devices for Utilizing Radar-Based Touch Interfaces," which is incorporated herein by reference.

Inputs received by any of these sensors can be processed by the electronic device and/or by a server communicatively coupled with the electronic device (e.g., the server system 164 of FIG. 1A). In some implementations, the electronic device and/or the server processes and/or prepares a response to the user's input(s), which response is output by the electronic device via one or more of the electronic device's output capabilities. In some implementations, the electronic device outputs via one or more of the electronic device's output capabilities information that is not directly responsive to a user input, but which is transmitted to the electronic device by a second electronic device in the environment, or by a server communicatively coupled with the electronic device. This transmitted information can be of virtually any type that is displayable/playable by the output capabilities of the electronic device.

The server system 164 provides data processing for monitoring and facilitating review of events (e.g., motion, audio, security, etc.) from data captured by the smart devices 120, such as video cameras 132, smart doorbells 106, and display assistant device 190. In some implementations, the server system 164 may include a voice/display assistance server 112 that processes audio inputs collected by voice-activated electronic devices 190, one or more content hosts 104 that provide the displayed media content, and a cloud cast service server 116 creating a virtual user domain based on distributed device terminals. The server system 164 also includes a device registry for keeping a record of the distributed device terminals in the virtual user environment. Examples of the distributed device terminals include, but are not limited to the voice-activated electronic devices 190, cast devices 108, media output devices 106 and smart home devices 122-138. In some implementations, these distributed device terminals are linked to a user account (e.g., a Google user account) in the virtual user domain. In some implementations, each of these functionalities and content hosts is a distinct server within the server system 164. In some implementations, a subset of these functionalities is integrated within the server system 164.

In some implementations, the network interface 160 includes a conventional network device (e.g., a router). The smart home environment 100 of FIG. 1 further includes a hub device 180 that is communicatively coupled to the network(s) 110 directly or via the network interface 160. The hub device 180 is further communicatively coupled to one or more of the above intelligent, multi-sensing, network-connected devices (e.g., the cast devices 108, the electronic devices 190, the smart home devices and the client device 104). Each of these network-connected devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled network-connected devices, configure the hub device to interoperate with devices newly introduced to the home network, commission new devices, and adjust or view settings of connected devices, etc.

Figure 1B:
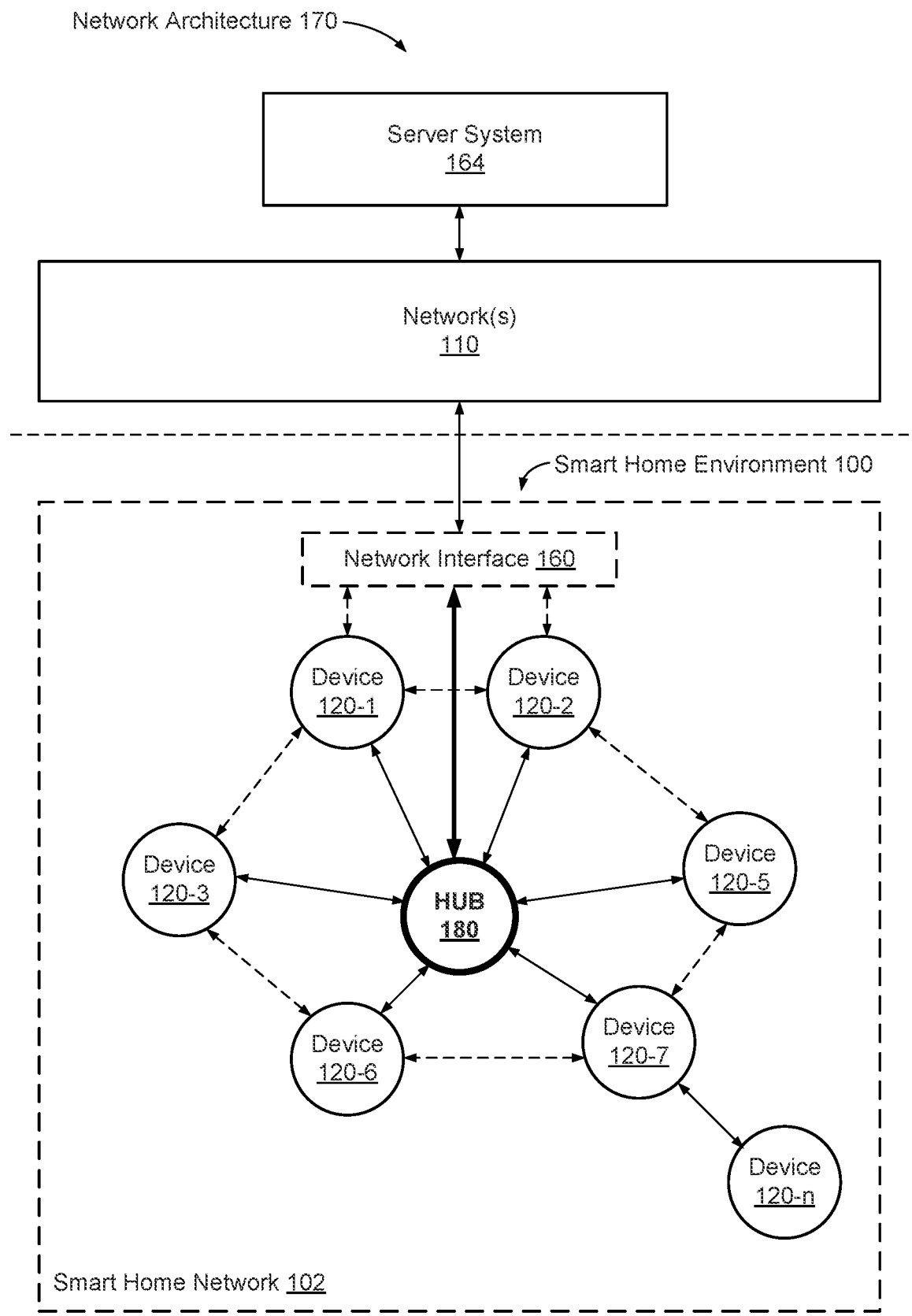
FIG. 1B is a block diagram illustrating a representative network architecture that includes a smart home network in accordance with some implementations.

FIG. 1B is a block diagram illustrating a representative network architecture 170 that includes a smart home network 102 in accordance with some implementations.

In some implementations, the integrated devices of the smart home environment 100 include intelligent, multi-sensing, network-connected devices (e.g., devices 122, 124, 126, 128, 130, 132, 136 and/or 138), herein referred to collectively as smart devices 120, that integrate seamlessly with each other in a smart home network (e.g., 102 FIG. 1B) and/or with a central server or a cloud-computing system (e.g., server system 164) to provide a variety of useful smart home functions.

In some implementations, the smart home devices 120 in the smart home environment 100 combine with the hub device 180 to create a mesh network in smart home network 102. In some implementations, one or more smart devices 120 in the smart home network 102 operate as a smart home controller. Additionally and/or alternatively, the hub device 180 operates as the smart home controller. In some implementations, a smart home controller has more computing power than other smart devices. In some implementations, a smart home controller processes inputs (e.g., from smart devices 120, electronic devices 190 (FIG. 1A), and/or server system 164) and sends commands (e.g., to smart devices 120 in the smart home network 102) to control operation of the smart home environment 100. In some implementations, some of the smart devices 120 in the smart home network 102 (e.g., in the mesh network) are "spokesman" nodes (e.g., 120-1) and others are "low-powered" nodes (e.g., 120-9). Some of the smart devices in the smart home environment 100 are battery powered, while others have a regular and reliable power source, such as by connecting to wiring (e.g., to 120 Volt line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, ZWave, 6LoWPAN, Thread, Bluetooth, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes. In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 102. In some implementations, the spokesman nodes in the smart home network 102, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 164 (using, e.g., the relatively high-power communication protocol). Thus, the low-powered nodes using low-power communication protocols are able to send and/or receive messages across the entire smart home network 102, as well as over the Internet 110 to the server system 164. In some implementations, the mesh network enables the server system 164 to regularly receive data from most or all of the smart devices in the home, make inferences based on the data, facilitate state synchronization across devices within and outside of the smart home network 102, and send commands to one or more of the smart devices to perform tasks in the smart home environment.

As described, the spokesman nodes and some of the low-powered nodes are capable of "listening." Accordingly, users, other devices, and/or the server system 164 may communicate control commands to the low-powered nodes. For example, a user may use the electronic device 104 (e.g., a smart phone) to send commands over the Internet to the server system 164, which then relays the commands to one or more spokesman nodes in the smart home network 102. The spokesman nodes may use a low-power protocol to communicate the commands to the low-power nodes throughout the smart home network 102, as well as to other spokesman nodes that did not receive the commands directly from the server system 164.

In some implementations, a smart nightlight 170 (FIG. 1), which is an example of a smart device 120, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 102 as well as over the Internet 110 to the server system 164.

Other examples of low-power nodes include battery-powered versions of the smart hazard detectors 124, cameras 132, doorbells 126, and the like. These battery-powered smart devices are often located in an area without access to constant and reliable power and optionally include any number and type of sensors, such as image sensor(s), occupancy/motion sensors, ambient light sensors, ambient temperature sensors, humidity sensors, smoke/fire/heat sensors (e.g., thermal radiation sensors), carbon monoxide/dioxide sensors, and the like. Furthermore, battery-powered smart devices may send messages that correspond to each of the respective sensors to the other devices and/or the server system 164, such as by using the mesh network as described above.

Examples of spokesman nodes include line-powered smart doorbells 126, smart thermostats 122, smart wall switches 136, and smart wall plugs 142. These devices are located near, and connected to, a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 110 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 110, but also converts information received from the network interface 160 or the network(s) 110 to meet the data format requirements of the respective communication protocol associated with a targeted smart device. In some implementations, in addition to data format conversion, the hub device 180 further processes the data received from the smart devices or information received from the network interface 160 or the network(s) 110 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 2A:
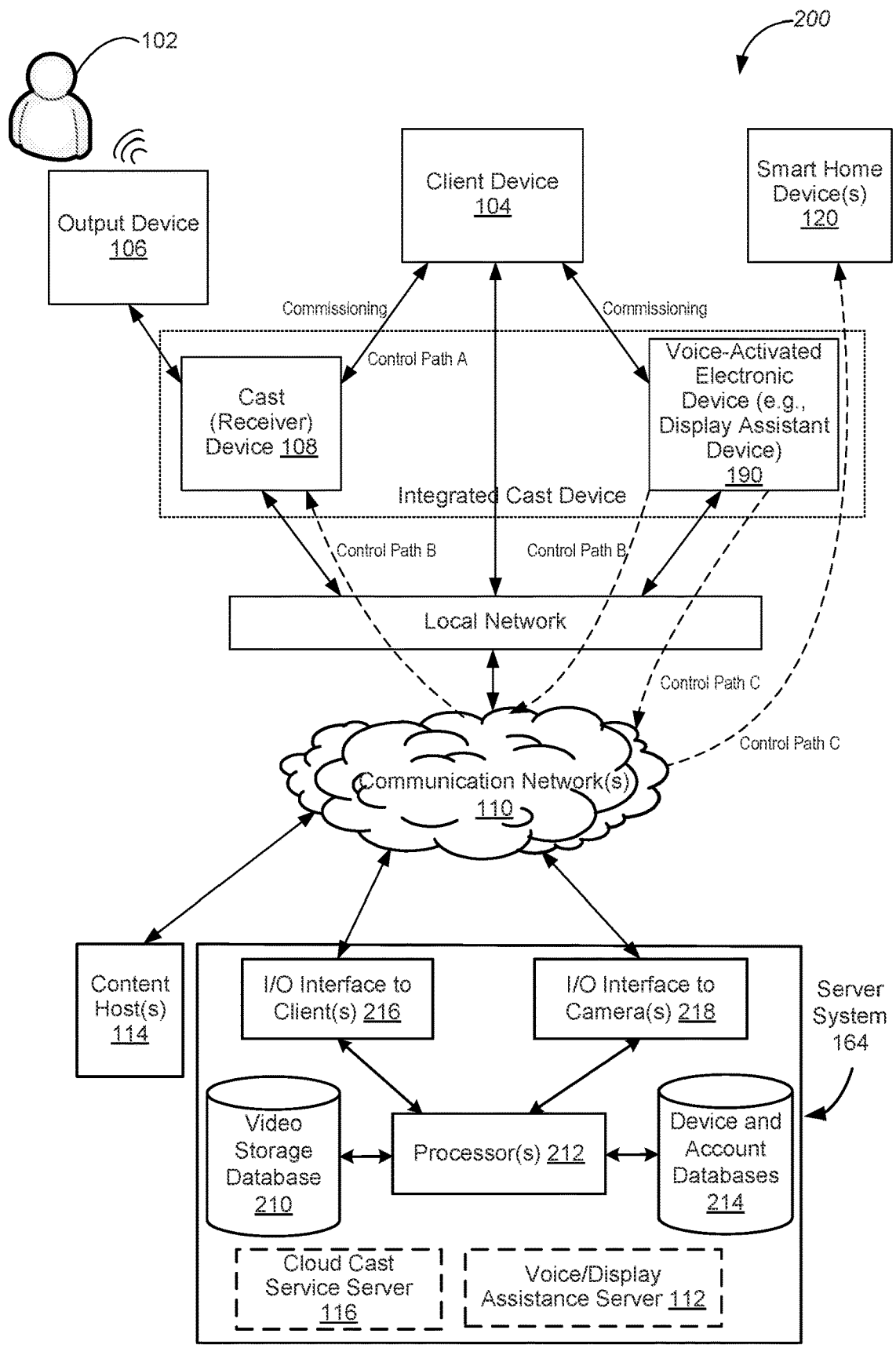
FIG. 2A is an example operating environment in which a voice-activated electronic device (e.g., a display assistant device) interacts with a cast device, a client device or a server system of a smart home environment in accordance with some implementations.

FIG. 2A is an example operating environment 200 in which a voice-activated electronic device 190 (e.g., a display assistant device) interacts with a cast device 108, a client device 104 or a server system 164 of a smart home environment 100 in accordance with some implementations. The voice-activated electronic device 190 is configured to receive audio inputs from an environment in proximity to the voice-activated electronic device 190. Optionally, the electronic device 190 stores the audio inputs and at least partially processes the audio inputs locally. Optionally, the electronic device 190 transmits the received audio inputs or the partially processed audio inputs to the server system 164 via the communication networks 110 for further processing. In some implementations, the cast device 108 is configured to obtain media content or Internet content from one or more content hosts 114 for display on an output device 106 coupled to the cast device 108. As explained above, the cast device 108 and the voice-activated electronic device 190 are linked to each other in a user domain, and more specifically, associated with each other via a user account in the user domain. Information of the cast device 108 and information of the electronic device 190 are stored in a device registry in association with the user account.

In some implementations, the cast device 108 does not include any display screen, and the voice-activated electronic device 190 includes a display assistant device that has a display screen. Both the cast device 108 and the display assistant device 190 have to rely on the client device 104 to provide a user interface during a commissioning process. Specifically, the client device 104 is installed with an application that enables a user interface to facilitate commissioning of a new cast device 108 or a new display assistant device 190 disposed in proximity to the client device 104. A user may send a request on the user interface of the client device 104 to initiate a commissioning process for the new cast device 108 or display assistant device 190 that needs to be commissioned. After receiving the commissioning request, the client device 104 establishes a short range communication link with the new cast device 108 or display assistant device 190 that needs to be commissioned. Optionally, the short range communication link is established based near field communication (NFC), Bluetooth, Bluetooth Low Energy (BLE) and the like. The client device 104 then conveys wireless configuration data associated with a wireless local area network (WLAN) to the new cast device 108 or display assistant device 190. The wireless configuration data includes at least a WLAN security code (i.e., service set identifier (SSID) password), and optionally includes an SSID, an Internet protocol (IP) address, proxy configuration and gateway configuration. After receiving the wireless configuration data via the short range communication link, the new cast device 108 or display assistant device 190 decodes and recovers the wireless configuration data, and joins the WLAN based on the wireless configuration data.

Additional user domain information is entered on the user interface displayed on the client device 104, and used to link the new cast device 108 or display assistant device 190 to an account in a user domain. Optionally, the additional user domain information is conveyed to the new cast device 108 or display assistant device 190 in conjunction with the wireless communication data via the short range communication link. Optionally, the additional user domain information is conveyed to the new cast device 108 or display assistant device 190 via the WLAN after the new device has joined the WLAN.

Once the cast device 108 and display assistant device 190 have been commissioned into the user domain, the cast device 108, the output device 106 and their associated media play activities could be controlled via two control paths (control path A and control path B). In accordance with control path A, a cast device application or one or more media play applications installed on the client device 104 are used to control the cast device 108 and its associated media play activities. Alternatively, in accordance with control path B, the display assistant device 190 is used to enable eyes-free and hands-free control of the cast device 108 and its associated media play activities (e.g., playback of media content play on the output device 106).

In some implementations, the cast device 108 and display assistant device 190 are two distinct and different devices that are configured to act as a cast receiver device and a cast transmitter device, respectively. The display assistant device 190 can provide information or content (which is generated locally or received from another source) to be projected onto the output device 106 via the cast device 108. Alternatively, in some implementations, the cast device 108 and display assistant device 190 are combined in an integrated cast device that is coupled to the output device 106.

In some implementations, the smart home environment 100 includes one or more smart home devices 120 (e.g., thermostats 122, hazard detectors 124, doorbells 126, door locks 128, alarm systems 130, camera systems 132, wall switches 136 and smart appliances 138 in FIG. 1). Regardless of whether a smart home device 120 has a display screen, it can rely on the client device 104 to provide a user interface during a commissioning process. Specifically, the client device 104 is installed with a smart device application that enables a user interface to facilitate commissioning of a new smart home device 120. Like a new cast device 108 or display assistant device 190, the new smart home device 120 can establish a short range communication link with the client device 104, and the wireless configuration data are communicated to the new smart home device 120 via the short range communication link, allowing the smart home device 120 to join the WLAN based on the wireless configuration data. Further, the smart home device 120 is optionally linked to the account of the user domain to which the cast device 108 and display assistant device 190 are linked as well. Once the smart home device 120 and the display assistant device 190 have been commissioned into the user domain, the smart home device 120 could be monitored and controlled via the display assistant device 190 in accordance with Control Path C as the cast device 108 is controlled via the display assistant device 190 in accordance with Control Path B. For example, voice commands can be inputted into the display assistant device 190 to review recording of an outdoor camera 132 mounted next to a door and control a door lock 128 based on security events detected in the recordings.

Referring to FIG. 2A, after the cast device 108 and the voice-activated electronic device 190 are both commissioned and linked to a common user domain, the voice-activated electronic device 190 can be used as a voice user interface to enable eyes-free and hands-free control of media content streaming to the cast device 108 involving no remote control, client device 104 or other second screen device. For example, the user may give voice commands such as "Play Lady Gaga on Living Room speakers." A Lady Gaga music track or video clip is streamed to a cast device 108 associated with the "Living Room speakers." In another example, the user gives voice commands such as "Show photos of Morgan and I on the Kitchen display." Accordingly, a photo or video clip is streamed to a cast device 108 and/or electronic device 190 associated with the "Kitchen display." The client device 104 is not involved, nor is any cast device application or media play application loaded on the client device 104.

In some implementations, the server system 164 includes cloud cast and display assistance functionalities. These functionalities may be implemented in individual servers within the server system 164, such as the cloud cast service server 116 and/or the voice/display assistance server 112, or may be integrated with the server system 164. The cloud cast service 116 is the proxy service that communicatively links the voice-activated electronic device 190 to the cast device 108 and makes casting to the cast device 108 possible without involving any applications on the client device 104. For example, a voice message is recorded by an electronic device 190, and the voice message is configured to request media play on a media output device 106. Optionally, the electronic device 190 partially processes the voice message locally. Optionally, the electronic device 190 transmits the voice message or the partially processed voice message to the server system 164 (the voice/display assistance server 112) via the communication networks 110 for further processing. The server system 164 (cloud cast service server 116) determines that the voice message includes a first media play request, and that the first media play request includes a user voice command to play media content on a media output device 106 and a user voice designation of the media output device 106. The user voice command further includes at least information of a first media play application (e.g., YouTube and Netflix) and the media content (e.g., Lady Gaga music, photos and/or videos that include Morgana as a subject matter) that needs to be played. Furthermore, in some implementations the user voice command further includes an instruction for the electronic device 190 to implement, such as a modification to a particular media content or to share media content with another user.

In accordance with the voice designation of the media output device, the cloud cast service server 116 identifies in a device registry (not shown) a cast device associated in the user domain with the electronic device 190 and coupled to the media output device 106. The cast device 108 is configured to execute one or more media play applications for controlling the media output device 106 to play media content received from one or more media content hosts 114. Then, the cloud cast service server 116 sends to the cast device 108 a second media play request including the information of the first media play application and the media content that needs to be played. Upon receiving the information sent by the cloud cast service server 116, the cast device 108 executes the first media play application and controls the media output device 106 to play the requested media content.

In some implementations, the user voice designation of the media output device 106 includes description of the destination media output device. The cloud cast service server 116 identifies in the registry the destination media output device among a plurality of media output devices according to the description of the destination media output device. In some implementations, the description of the destination media output device includes at least a brand ("Samsung TV") or a location of the media output device 106 ("my Living Room TV").

As further illustrated in FIG. 2A, the server system 164 includes one or more processors 212, a video storage database 210, a device and account database 214, an I/O interface to one or more client devices 216, and an I/O interface to one or more video sources 218, which will be described in greater detail in FIG. 2C.

Figure 2B:
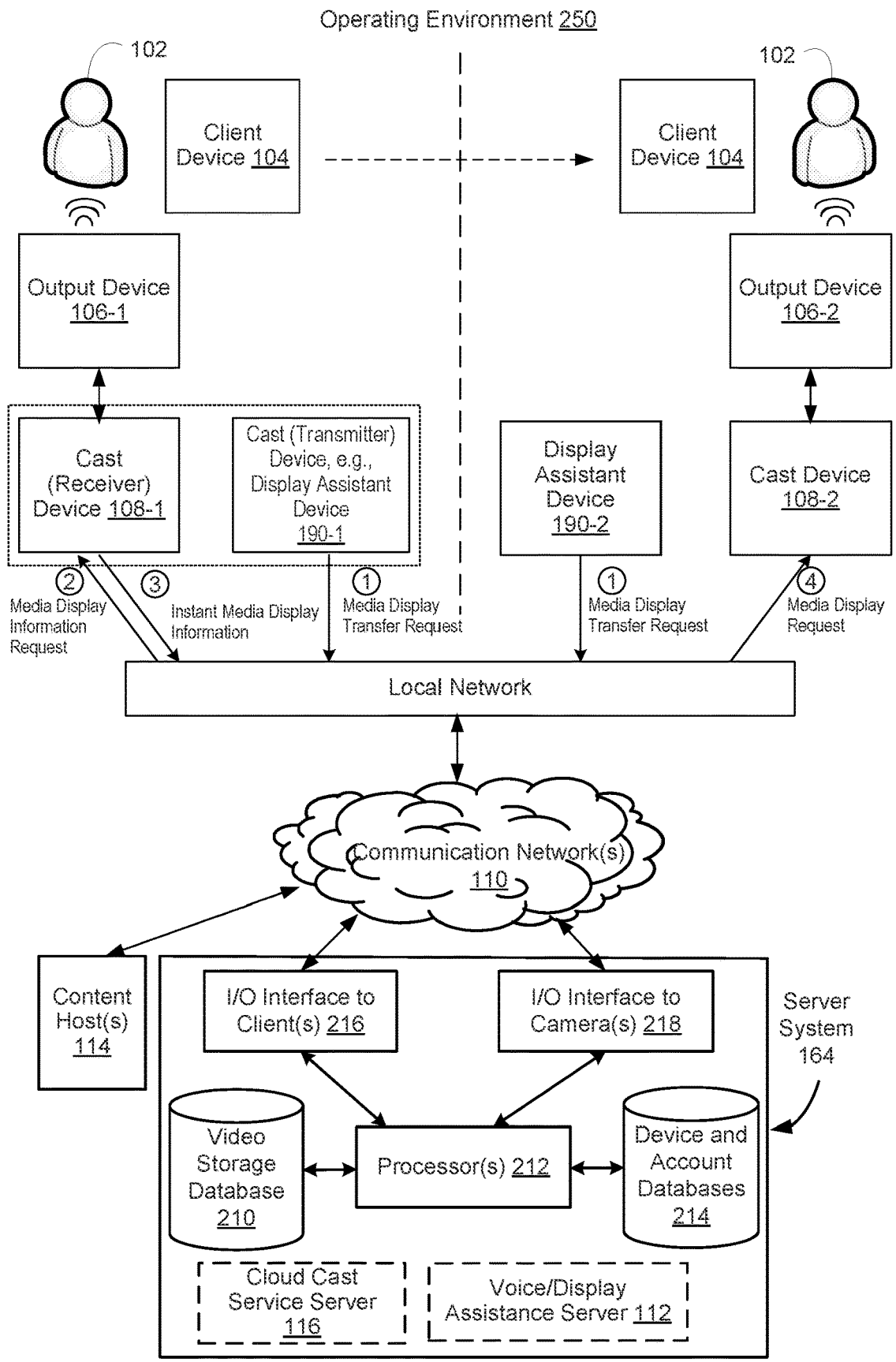
FIG. 2B is another example operating environment in which voice-activated electronic devices interact with cast devices, client devices or a server system of a smart home environment in accordance with some implementations.

FIG. 2B is another example operating environment 250 in which voice-activated electronic devices 190 interact with cast devices 106, client devices 104, other electronic devices 190, and/or a server system 164 of a smart home environment 100 in accordance with some implementations of the present disclosure. The smart home environment 100 includes a first cast device 108-1 and a first output device 106-1, or a first electronic device 192-1, coupled to the first cast device 108-1. The smart home environment 100 also includes a second cast device 108-2 and a second output device 106-2, or second electronic device 190-2, coupled to the second cast device 108-2. The cast devices 108-1 and 108-2, or electronic devices 190 and 192, are optionally located in the same location (e.g., the living room) or two distinct locations (e.g., two rooms) in the smart home environment 100. Each of the cast devices 108-1 and 108-2, or the electronic devices 190 and 192, is configured to obtain media or Internet content from media hosts 114 for display on the output device 106 coupled to the respective cast device 108-1 or 108-2 and/or the electronic devices 190. Both the first and second cast devices, or the electronic devices 190, are communicatively coupled to the cloud cast service server 116 and the content hosts 114.

The smart home environment 100 further includes one or more voice-activated electronic devices 190 that are communicatively coupled to the server system 164. In some implementations, the server system 164 includes separate servers for managing cloud cast (e.g., the cloud cast service server 116) or voice/display assistance (e.g., voice/display assistance server 112). The one or more voice-activated electronic devices 190 and 192 includes at least one display assistant device (e.g., display assistant device 190-1). In some implementations, the voice-activated electronic devices 190 are disposed independently of the cast devices 108 and the output devices 106. For example, as shown in FIG. 1, the electronic device 190-1 is disposed in a room where no cast device 108 or output device 106 is located. In some implementations, the first electronic device 192-1 is disposed in proximity to the first cast device 108-1 and the first output device 106-1, e.g., the first electronic device 192-1, the first cast device 108-1 and the first output device 106-1 are located in the same room. Optionally, the second electronic device 190-2 is disposed independently of or in proximity to the second cast device 108-2 and the second output device 106-2.

In some embodiments, when media content is being played on the first output device 106-1 or the electronic device 190, a user sends a voice command to any of the electronic devices 190 (e.g., 190-1 or 190-2 in FIG. 2B) to request play of the media content to be transferred to the second output device 106-2 or a second electronic device 190-2. The voice command includes a media play transfer request (e.g., a user instruction to transfer the media content). The voice command is transmitted to the cloud cast service server 116. The cloud cast service server 116 sends a media display information request to the first cast device 108-1 to request instant media play information of the media content that is currently being played on the first output device 106-1 coupled to the first cast device 108-1. The first cast device 108-1 then returns to the server system 164 (cloud cast service server 116) the requested instant play information including at least information the media content that is currently being played (e.g., "Lady Gaga—Half time show—Super Bowl 2017"), and a temporal position related to playing of the media content. The second cast device 108-2 or the second electronic device 190-2 then receives a media display request including the instant play information from the cloud cast service server 116, and in accordance with the instant play information, executes the first media play application that controls the second output device 106-2 or the second electronic device 190-2 to play the media content from the temporal location.

Figure 2C:
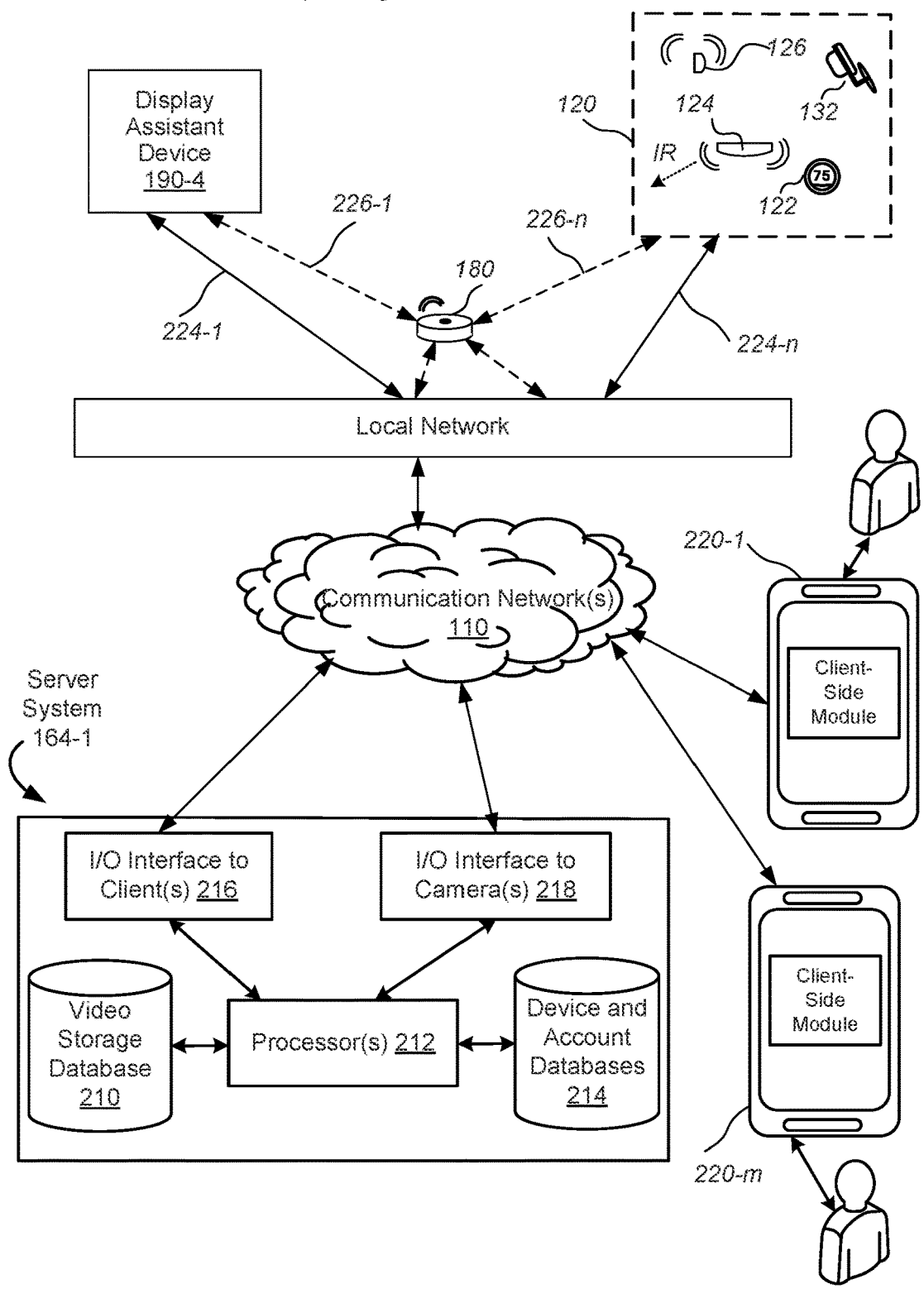
FIG. 2C is another example operating environment in which a voice-activated electronic device interacts with smart home devices, a hub device, and a server system of a smart home environment in accordance with some implementations

FIG. 2C is another example operating environment 260 in which a voice-activated electronic device 190 (e.g., a display assistant device) interacts with smart home devices 120 (e.g., smart thermostats 122, hazard sensing detectors 124, smart doorbells 126, and network connected camera systems 132), a hub device 180, and a server system 164 of a smart home environment 100 in accordance with some implementations.

In some implementations, the display assistant device 190 includes one or more built-in cameras (e.g., camera 362, FIG. 3A) and is configured to perform a remote monitoring function (e.g., home monitoring), in which video captured by the cameras is streamed to the remote server system 164 for monitoring uses by authorized users. The server system 164 provides data processing for monitoring and facilitating review of events (e.g., motion, audio, security, etc.) from data (e.g., video data) captured by electronic device(s) 190 and by the smart devices 120 in the smart home environment 100, such as smart doorbells 126, and network connected camera systems 132. In some implementations, the smart home devices 120 and the electronic devices 190 that are configured to capture video data are also referred to as video source(s). Typically, it is usually only the owner (e.g., a homeowner) of the display assistant device 190, who created the account associated with the device, that has access to live streaming video in the monitoring mode. In some implementations, the owner can also give access to "family" member accounts (e.g., to other members of the household) who can then access the streamed video in monitoring mode. "Family" accounts are generally a set of permissions between two or more accounts stored at a remote service (e.g., the server system 164). These permissions enable access to information, such as monitoring of video streams in this instance, and/or control for various things (e.g., control of a smart thermostat in the smart home environment). Family accounts are typically persistent and can be set by device and/or by device functions. In some implementations, access to video content in the monitoring mode is available only to authorized accounts (e.g., a master account and/or a family account).

As illustrated in FIG. 2C, the server system 164 receives data from the various smart home devices 120 and from the electronic devices 190 located at various physical locations (e.g., inside or in proximity to homes, restaurants, stores, streets, parking lots, and/or the smart home environments 100 of FIG. 1A). In some implementations, the smart home devices 120 and the electronic device 190 are linked to more than one reviewer account (e.g., multiple user accounts may be subscribed to a single smart home environment).

In some implementations, the server system 164 provides video monitoring data for the video sources to client devices 220 associated with the reviewer accounts. For example, the portable electronic device 104 is an example of the client device 220. In some implementations, the server system 164 comprises a video processing server that provides video processing services to the video sources and client devices 220. In some implementations, the server system 164 receives non-video data from one or more smart devices 120 (e.g., audio data, metadata, numerical data, etc.). In some implementations, the non-video data is analyzed to provide context for motion events detected by the video cameras 132 and/or doorbell cameras 126. In some implementations, the non-video data indicates that an audio event (e.g., detected by an audio device), security event (e.g., detected by a perimeter monitoring device), hazard event (e.g., detected by a hazard detector 124), medical event (e.g., detected by a health-monitoring device), or the like has occurred within a smart home environment 100.

In some implementations multiple reviewer accounts are linked to a single smart home environment 100. For example, multiple occupants of a smart home environment 100 may have accounts linked to the smart home environment. In some implementations, during a device commissioning process, the homeowner also creates reviewer accounts (e.g., "family" member accounts) for other members of the household, thereby authorizing them to access the home monitoring data. In some implementations, each reviewer account is associated with a particular level of access. In some implementations, each reviewer account has personalized notification settings. In some implementations, a single reviewer account is linked to multiple smart home environments 100. For example, a person may own or occupy, or be assigned to review and/or govern, multiple smart home environments 100. In some implementations, the reviewer account has distinct levels of access and/or notification settings for each smart home environment.

In some implementations, each of the video sources includes one or more voice-activated display assistant devices 190, video cameras 132 or doorbell cameras 126 that capture video and send the captured video to the server system 164 substantially in real-time. In some implementations, each of the video sources includes one or more electronic devices 190 that that capture video and send the captured video to the server system 164 in real-time (e.g., within 1 second, 10 seconds, 30 seconds, or 1 minute). In some implementations, each of the video sources includes one or more doorbell cameras 126 that capture video and send the captured video to the server system 164 in real-time (e.g., within 1 second, 10 seconds, 30 seconds, or 1 minute). In some implementations, each of the doorbells 126 include a video camera that captures video and sends the captured video to the server system 164 in real-time.

In some implementations, a video source includes a controller device (not shown) that serves as an intermediary between the one or more doorbells 126 and the server system 164. The controller device receives the video data from the one or more doorbells 106, optionally performs some preliminary processing on the video data, and sends the video data and/or the results of the preliminary processing to the server system 164 on behalf of the one or more doorbells 126 (e.g., in real-time). In some implementations, each camera has its own on-board processing capabilities to perform some preliminary processing on the captured video data before sending the video data (e.g., along with metadata obtained through the preliminary processing) to the controller device and/or the server system 164. In some implementations, one or more of the cameras is configured to optionally locally store the video data (e.g., for later transmission if requested by a user). In some implementations, a camera is configured to perform some processing of the captured video data, and, based on the processing, either send the video data in substantially real-time, store the video data locally, or disregard the video data.

Figure 6:
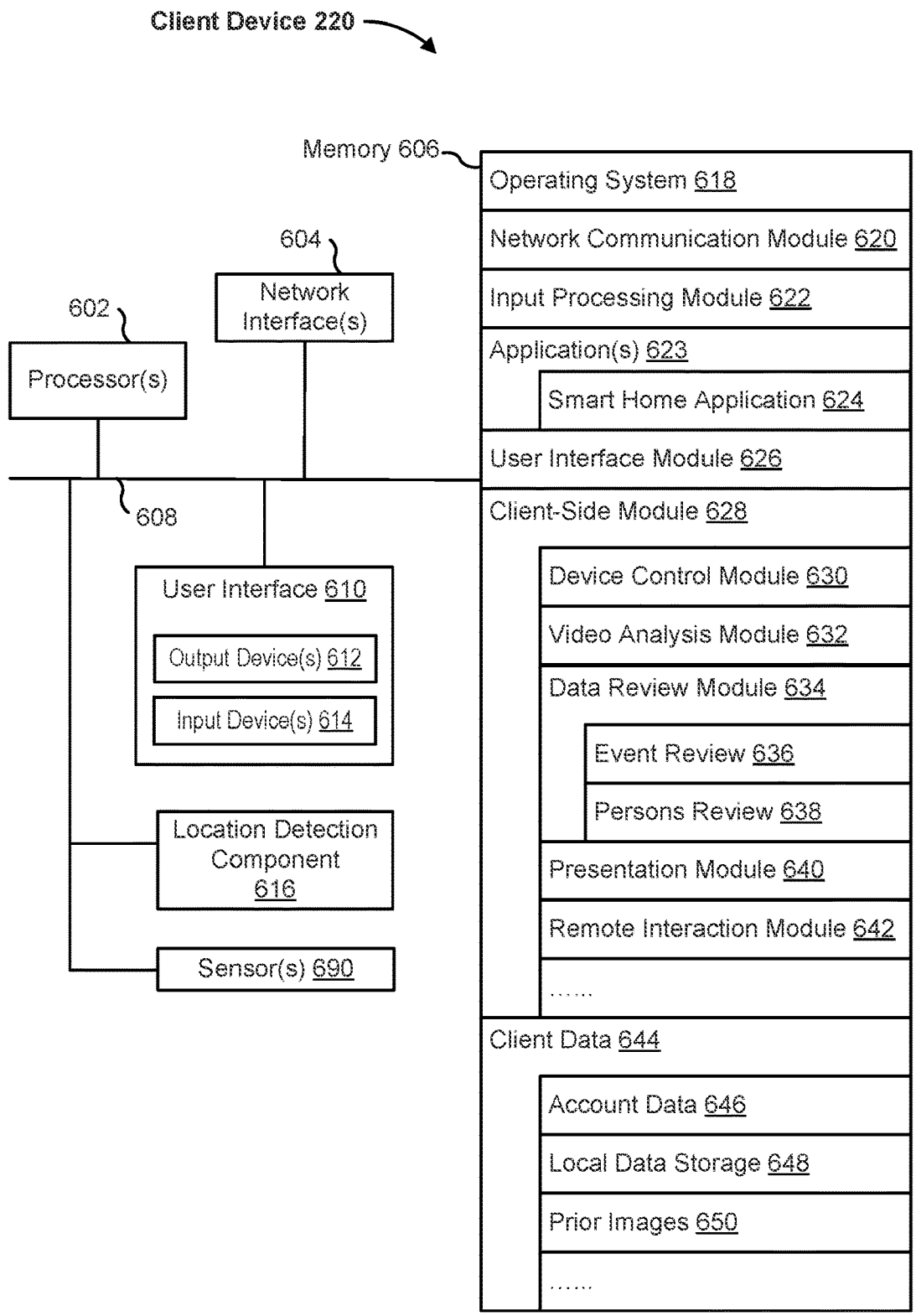
FIG. 6 is a block diagram illustrating a representative client device in accordance with some implementations.

In accordance with some implementations, a client device 220 includes a client-side module or smart home application, such as client-side module 628 in FIG. 6. In some implementations, the client-side module communicates with a server-side module executed on the server system 164 through the one or more networks 110. The client-side module provides client-side functionality for the event monitoring and review processing and communications with the server-side module. The server-side module provides server-side functionality for event monitoring and review processing for any number of client-side modules each residing on a respective client device 220. In some implementations, the server-side module also provides server-side functionality for video processing and camera control for any number of the video sources, including any number of control devices, electronic devices 190, cameras 132, and doorbells 126.

In some implementations, the server system 164 includes one or more processors 212, a video storage database 210, an account database 214, an I/O interface to one or more client devices 216, and an I/O interface to one or more video sources 218. The I/O interface to one or more clients 216 facilitates the client-facing input and output processing. The account database 214 stores a plurality of profiles for reviewer accounts registered with the video processing server, where a respective user profile includes account credentials for a respective reviewer account, and one or more video sources linked to the respective reviewer account. The I/O interface to one or more video sources 218 facilitates communications with one or more video sources. The video storage database 210 stores raw video data received from the video sources, as well as various types of metadata, such as motion events, event categories, event category models, event filters, and event masks, for use in data processing for event monitoring and review for each reviewer account. In some implementations, some of the video sources (e.g., the display assistant device 190) are configured to perform events based recording, whereby video and audio data are generally collected and streamed to the server system 164 for display on authorized client devices without recording (e.g., the video and audio data are not stored by the server). In this mode, the video sources are configured to start recording (e.g., the video and audio data are stored on the server system 164, e.g., on a video storage database 210, or locally on the devices) when persons and/or events are sensed by the video sources.

Examples of a representative client device 220 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 110 include local area networks (LAN) and wide area networks (WAN) such as the Internet. The one or more networks 110 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 is implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a server computer, a cloud server, a distributed cloud computing system, a handheld computer, a tablet computer, a laptop computer, a desktop computer, or a combination of any two or more of these data processing devices or other data processing devices.

In some implementations, a server-client environment includes both a client-side portion (e.g., the client-side module) and a server-side portion (e.g., the server-side module). The division of functionality between the client and server portions of operating environment can vary in different implementations. Similarly, the division of functionality between a video source and the server system 164 can vary in different implementations. For example, in some implementations, the client-side module is a thin-client that provides only user-facing input and output processing functions, and delegates all other data processing functionality to a backend server (e.g., the server system 164). Similarly, in some implementations, a respective one of the video sources is a simple video capturing device that continuously captures and streams video data to the server system 164 with limited or no local preliminary processing on the video data. Although many aspects of the present technology are described from the perspective of the server system 164, the corresponding actions performed by a client device 220 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects may be performed by the server system 164, a client device 220, and a video source 222 cooperatively.

In some implementations, the video source(s) transmits one or more streams 224 of video data to the server system 164 via communication network(s) 110. In some implementations, the one or more streams include multiple streams, of respective resolutions and/or frame rates, of the raw video captured by the image sensor. In some implementations, the multiple streams include a "primary" stream with a certain resolution and frame rate (e.g., corresponding to the raw video captured by the image sensor), and one or more additional streams. An additional stream is optionally the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream. In some implementations, the primary stream and/or the additional streams are dynamically encoded (e.g., based on network conditions, server operating conditions, camera operating conditions, characterization of data in the stream (e.g., whether motion is present), user preferences, and the like.

In some implementations, the video source(s) transmits one or more streams 224 of video data directly to a client device 220 (e.g., without being routed to, or processed by, the server system 164). In some implementations, the video sources transmit one or more streams 226 of video data to the server system 164 via the hub device 180. In some implementations, one or more of the streams is stored at the electronic device 190 (e.g., in memory 306, FIG. 3A) and/or a local storage device (e.g., a dedicated recording device, not shown), such as a digital video recorder (DVR). For example, in accordance with some implementations, the voice-activated electronic device 190 stores the most recent 24 hours of video footage recorded by the camera. As another example, in accordance with some implementations, the voice-activated electronic device 190 stores up to 24 hours of video footage recorded by the camera (e.g., up to 24 hours of motion event data). In some implementations, portions of the one or more streams are stored at the voice-activated electronic device 190 and/or the local storage device (e.g., portions corresponding to particular events or times of interest).

In some implementations, the server system 164 transmits one or more streams of video data to a client device 220 to facilitate event monitoring by a user. In some implementations, the one or more streams may include multiple streams, of respective resolutions and/or frame rates, of the same video feed. In some implementations, the multiple streams include a "primary" stream with a certain resolution and frame rate, corresponding to the video feed, and one or more additional streams. An additional stream may be the same video stream as the "primary" stream but at a different resolution and/or frame rate, or a stream that shows a portion of the "primary" stream (e.g., cropped to include portion of the field of view or pixels of the primary stream) at the same or different resolution and/or frame rate as the "primary" stream.

Figure 2D:
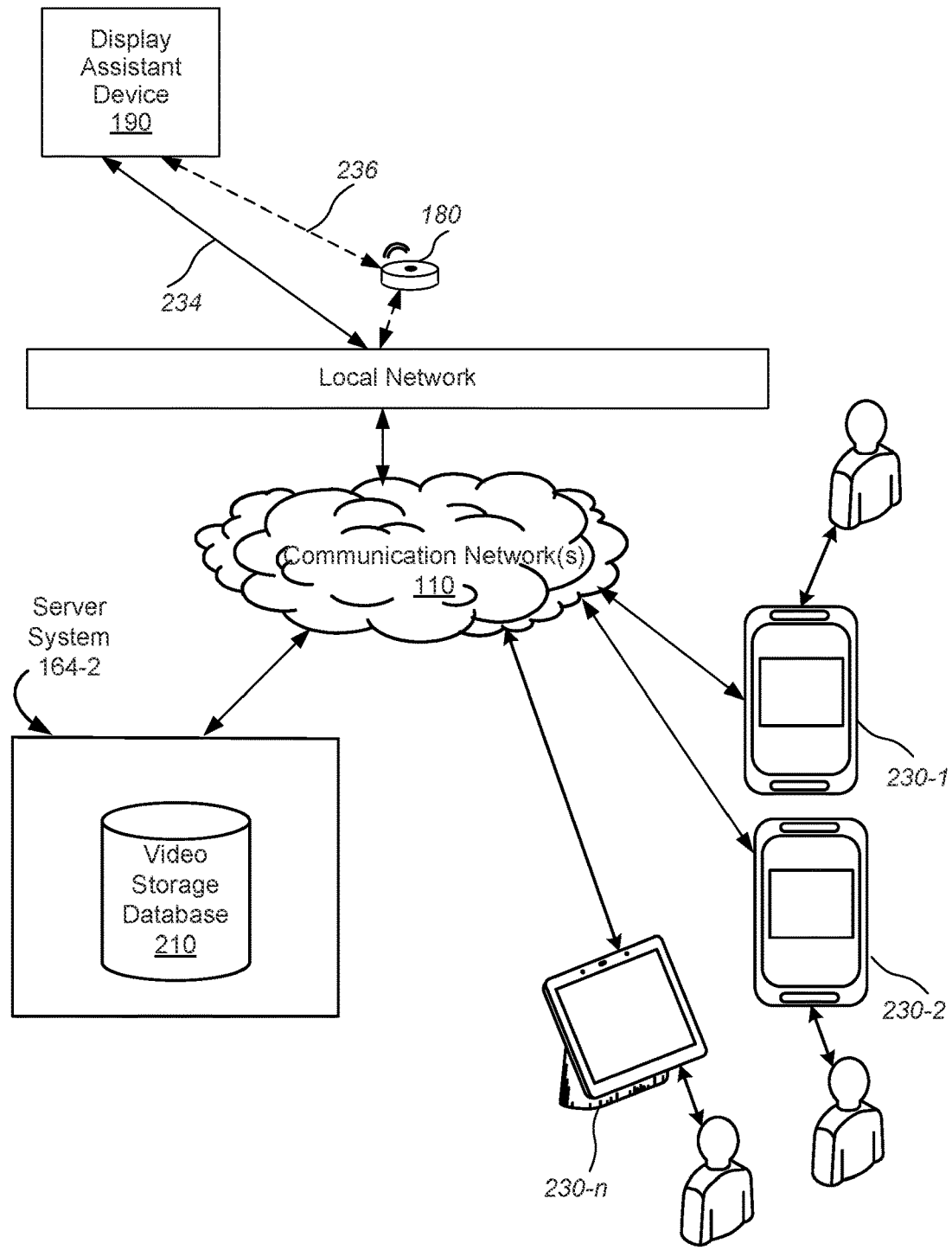
FIG. 2D is another example operating environment in which a voice-activated electronic device interacts with a hub device, a server system of a smart home environment, and second devices in accordance with some implementations.

FIG. 2D is another example operating environment 270 in which a voice-activated electronic device 190 (e.g., a display assistant device) interacts with a hub device 180, a server system 164 of a smart home environment 100, and second devices 230 in accordance with some implementations.

In some implementations, the voice-activated electronic device 190 (display assistant device) includes one or more built-in cameras and is configured to perform a video (and audio) communication function, in which video and audio are captured by the built-in camera(s) and microphone(s) of the device 190 (e.g., using camera 362 and microphones 342, FIG. 3) and are transmitted to one or more second devices 230 participating in the video communication via the remote server system 164. Typically, the video communication function may be enabled by a user who is in proximity to (and logged into) the display assistant device. Unlike the monitoring uses described in FIG. 2C, users of second devices 230 who are participating in a video communication with a user of the device 190 need not be "family" account members. In other words, the one or more second devices 230 and/or accounts associated with the second devices 230 may not be related to the authorized user account associated with the display assistant device. In case of a video communication, access to the video stream by the other party (e.g., the second devices 230) is only a temporary permission that lasts for the duration of the call.

Examples of representative second devices 230 include a handheld computer, a wearable computing device, a personal digital assistant (PDA), a tablet computer, a laptop computer, a desktop computer, a cellular telephone, a smart phone, an enhanced general packet radio service (EGPRS) mobile phone, an ebook reader, another display assistant device (e.g., 230-n, FIG. 2D) or a combination of any two or more of these data processing devices or other data processing devices.

In some implementations, one or more of the streams is stored at the electronic device 190 (e.g., in memory 306, FIG. 3A) and/or a local storage device (e.g., a dedicated recording device, not shown), such as a digital video recorder (DVR). In some implementations, one or more of the streams is stored at the server system (e.g., in memory 306, FIG. 3A) and/or in a database (e.g., the video storage database 210).

Figure 2E:
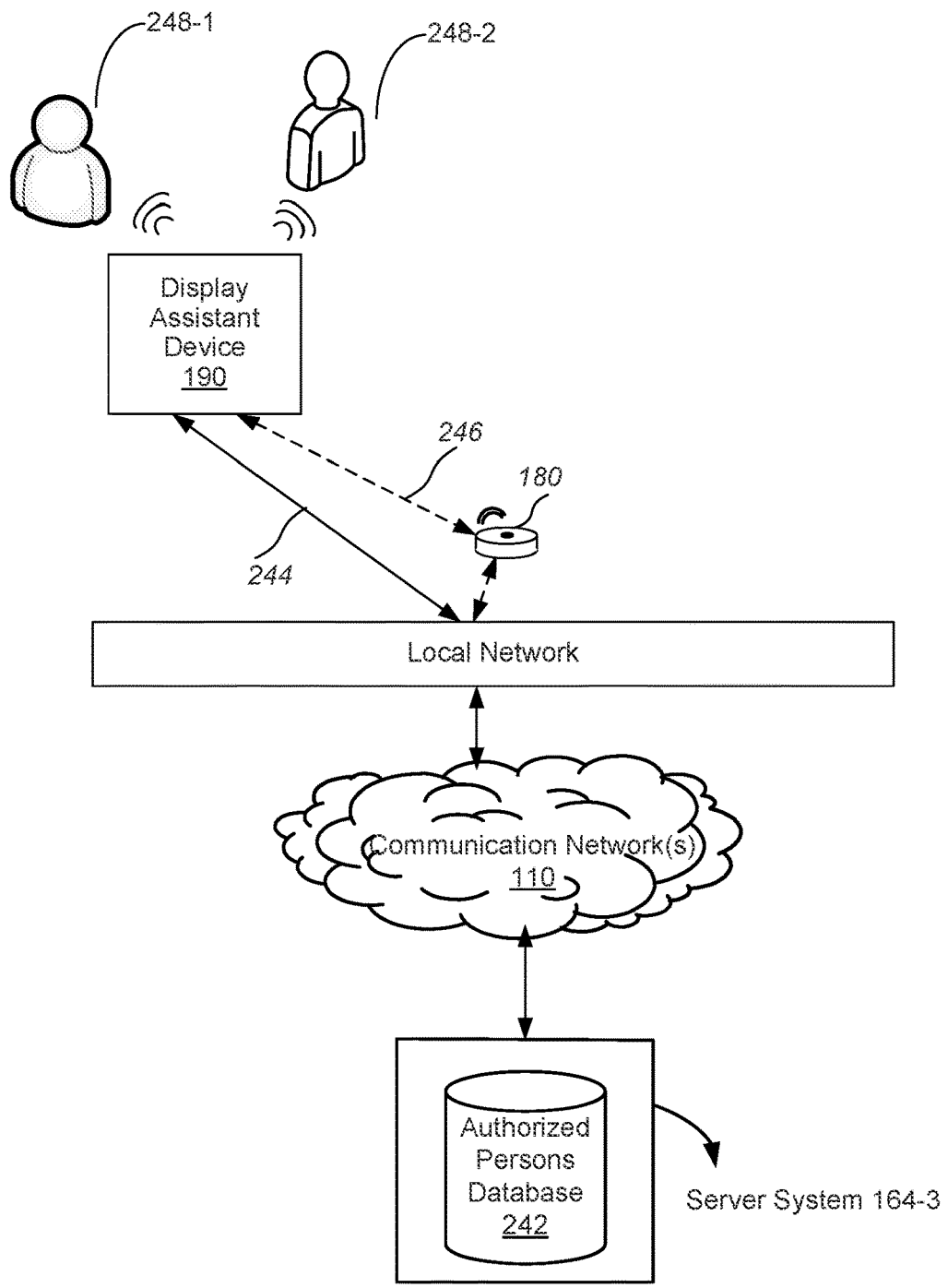
FIG. 2E is another example operating environment in which a voice-activated electronic device interacts with a hub device, a server system of a smart home environment, and persons in the smart home environment, in accordance with some implementations.

FIG. 2E is another example operating environment 280 in which a voice-activated electronic device 190 (e.g., a display assistant device) interacts with a hub device 180, a server system 164 of a smart home environment 100, and persons 248 in the smart home environment 100, in accordance with some implementations.

In some implementations, the voice-activated electronic device 190 (display assistant device) is configured for use by authorized users. In some implementations, after a period of inactivity, the electronic device 190 goes into a locked state and a user is prompted to input a password to unlock the device 190 before the user can further interact with the device 190. In some implementations, the electronic device 190 is configured to detect one or more persons 248 standing in proximity (e.g., in front of) to the electronic device 190 (e.g., using a presence sensor 365, FIG. 3A). In some implementations, the electronic device 190 has technology that enables the device to distinguish between persons and other objects in the room. The electronic device 190 performs a face match function (e.g., face recognition or face unlock function), whereby one or more images of the persons are captured (e.g., using the camera 362, FIG. 3A) and compared against a database of authorized persons 242 in the server system 164. In accordance with a match between the captured images and the images in the authorized persons database 242, the electronic device 164 unlocks itself to enable further interactions with the authorized user. In some implementations, images of authorized users are stored locally on the electronic device 190 (e.g., authorized users data 340, FIG. 3A) and the comparison between the captured images and the images of authorized users is performed locally on the device.

In some implementations, after the electronic device 190 has been unlocked, the electronic device 190 further interacts with the user by selecting or moderating content based on the user identification. For example, as discussed in PCT Application No. PCT/US18/54861, filed Oct. 8, 2018, entitled "Systems and Methods for Displaying Media Files," which is incorporated by reference herein in its entirety, the electronic device 190 automatically curates content such as media files based on the user identification and displays a selection of the curated content for further user interaction. In some implementations, this user identification can be performed using the camera 362 of an electronic device 190. Similarly, device functionality of the electronic device 190 can be enabled or disabled based on results of a facial match operation.

Figure 3A:
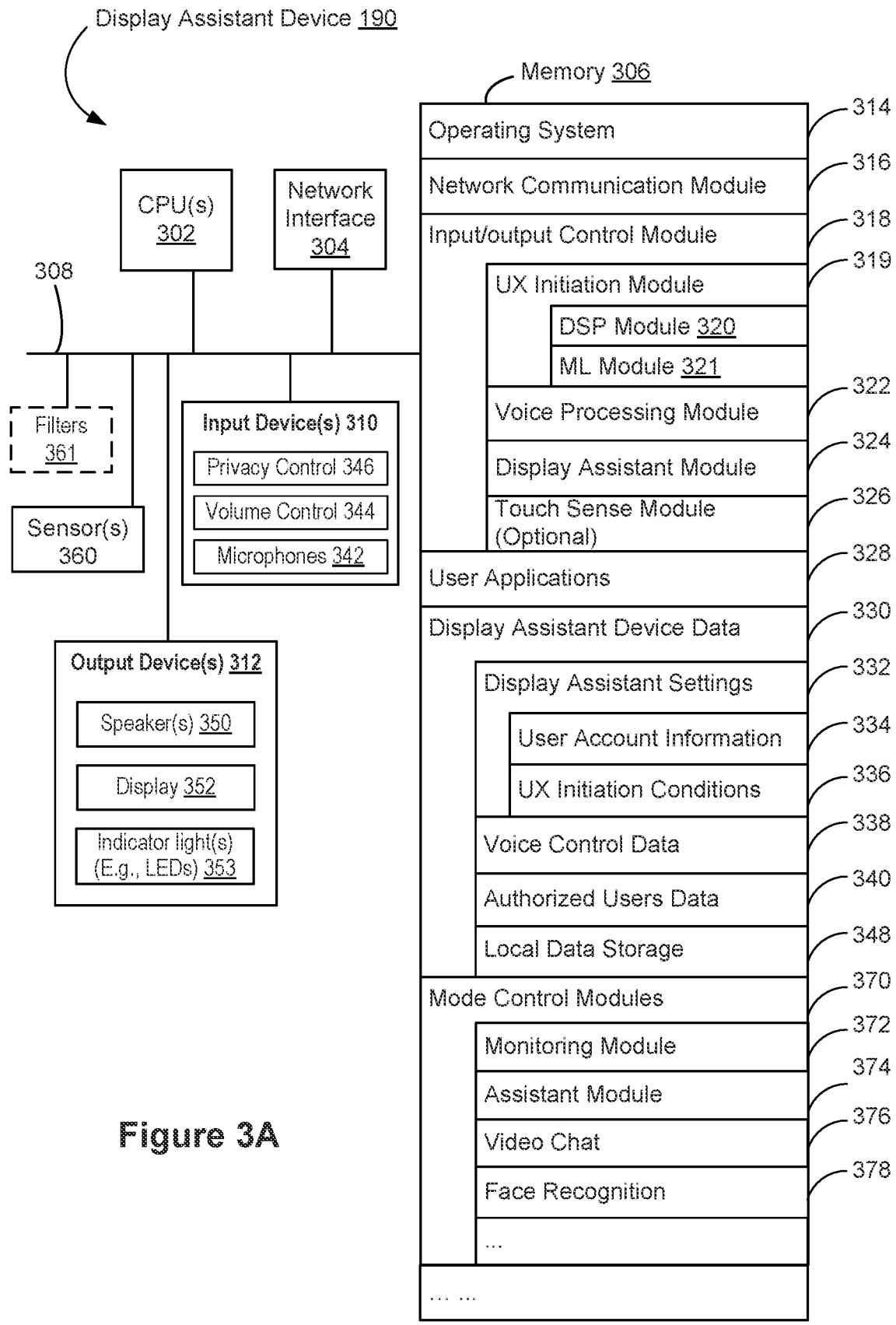
FIG. 3A is a block diagram illustrating an example display assistant device in accordance with some implementations.

FIG. 3A is a block diagram illustrating an example display assistant device 190 that is applied as a voice interface to collect user voice commands in a smart home environment 100 in accordance with some implementations. The display assistant device 190 typically includes one or more processing units (CPUs) 302, one or more network interfaces 304, memory 306, and one or more communication buses 308 for interconnecting these components (sometimes called a chipset). The display assistant device 190 includes one or more camera(s) that are configured to capture images and video. The display assistant device 190 includes one or more output devices 312, including one or more speakers 350, a display 352, and one or more indicator light(s) (e.g., LEDs) 353 that are configured to display a visual indication of the status of the camera(s) 362, including an operating mode of the display assistant device 190. In some implementations, the display assistant device 190 also includes filters 361. In some implementations, the filters 361 are software affordances that are selectively engaged to adjust a field of view (e.g., an angle) of the camera(s) 362 (e.g., at particular modes of the display assistant device 190). In some implementations, the display assistant device 190 also includes sensor(s) 363 that detect events or changes.

As further illustrated in FIG. 3A, the display assistant device 190 also includes one or more input devices 310 that facilitate user input, including one or more microphones 342, a volume control 344 and a privacy control 346. The volume control 344 is configured to receive a user action (e.g., a press on a volume up button or a volume down button, a press on both volumes up and down buttons for an extended length of time) that controls a volume level of the speakers 350 or resets the display assistant device 300. The privacy control 346 is configured to receive a user action that controls privacy settings of the display assistant device (e.g., whether to deactivate the microphones 342 and/or the cameras 362). In some implementations, the privacy control 346 is a physical button located on the display assistant device 190. In some implementations, the input devices 310 of the display assistant device 190 include a touch detection module (not shown in FIG. 3A) that is integrated on the display panel 352 and configured to detect touch inputs on its surface. In some implementations, the input devices 310 of the display assistant device 300 include a camera module configured to capture images and/or a video stream of a field of view. Additionally, and/or alternatively, in some implementations, the display assistant device 190 includes a mode control module 370 that is configured to control the camera functions. Alternatively, the input devices 310 of the display assistant device 190 does not include any camera or touch detection module, and the camera-related functionalities are included in the mode control modules 370 of the because they relatively expensive and can compromise the goal of offering the display assistant device 190 as a low cost user interface solution.

In some implementations, the display assistant device 190 further includes a presence sensor 365 configured to detect a presence of a user in a predetermined area surrounding the display assistant device 190. Under some circumstances, the display assistant device 190 operates at a sleep or hibernation mode that deactivates detection and processing of audio inputs, and does not wake up from the sleep or hibernation mode or listen to the ambient (i.e., processing audio signals collected from the ambient) until the presence sensor 365 detects a presence of a user in the predetermined area. An example of the presence sensor 365 is an ultrasonic sensor configured to detect a presence of a user.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302 (or CPU(s)). Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- Operating system 314 including procedures for handling various basic system services and for performing hardware dependent tasks;
- Network communication module 316 for connecting the display assistant device 190 to other devices (e.g., the server system 164, the cast device 108, the client device 104, client devices 220, second devices 230, the smart home devices 120, the hub device 180, and the other voice-activated electronic device(s) 190) via one or more network interfaces 304 (wired or wireless) and one or more networks 110, such as the Internet, other wide area networks, local area networks, metropolitan area networks, and so on;
- Input/output control module 318 for receiving inputs via one or more input devices 310 enabling presentation of information at the display assistant device 190 via one or more output devices 312, including:
  - User experience (UX) initiation module 319 for controlling touchless UX operations associated with a plurality of user applications according to respective confidence-based initiation conditions, including determining a proximity and/or a gesture of a presence using sensor signals, monitoring a confidence level of the determination, and initiating one of the touchless UX operations in accordance with a determination that a corresponding initiation condition has been satisfied;
  - Voice processing module 322 for processing audio inputs or voice messages collected in an environment surrounding the display assistant device 190, or preparing the collected audio inputs or voice messages for processing at the server system 164 (a voice/display assistance server 112 or a cloud cast service server 118);
  - Display assistant module 324 for displaying additional visual information including but not limited to a media content item (e.g., a YouTube video clip), news post, social media message, weather information, personal picture, a state of audio input processing, and readings of smart home devices; and
  - Touch sense module 326 for sensing touch events on a top surface of the display assistant device 190; and
- One or more user applications 328 for responding to user commands extracted from audio inputs or voice messages collected in an environment surrounding the display assistant device 190, including but not limited to, a media play application, an Internet search application, a social network application and a smart device application;
- Display assistant device data 330 storing at least data associated with the display assistant device 190, including:
  - Display assistant settings 332 for storing information associated with the display assistant device 190 itself, including common device settings (e.g., service tier, device model, storage capacity, processing capabilities, communication capabilities, etc.), information of a user account 334 in a virtual user domain to which the display assistant device 190 is linked, and a plurality of UX initiation conditions 336 corresponding to a plurality of touchless UX operations of a plurality of applications;
  - Voice control data 338 for storing audio signals, voice messages, response messages and other data related to voice interface functions of the display assistant device 190;
  - Authorized users data 340 for storing information of users authorized to use the display assistant device, including images, voice information, fingerprint information of the authorized users; and
  - Local data storage 348 for selectively storing raw or processed data associated with the display assistant device 190, such as event data and/or video data captured by the camera(s) 362;
- Mode control modules 370 for enabling various modes of operation of the display assistant device 190 and for the interactions between the modes (e.g., mode switching), including:
  - Monitoring module 372 for transmitting video captured by the cameras 362 to the server system 164 for monitoring uses. The monitoring uses include transmission of the video to one or more remote clients (e.g., client device 104 and client devices 220) that are authorized to access the video;
  - Assistant module 374 for processing and responding to voice commands and touch screen commands directed to the display assistant device 190, including displaying media files;
  - Video chat 376 for enabling video-telephony (e.g., videoconference calls) between a user of the display assistant device 190 and users of second devices 230 (FIG. 2D); and
  - Face recognition 378 for enabling access of the display assistant device 190 to authorized users, in which one or more images of persons (e.g., persons 248, FIG. 2E) captured by the cameras 362 (*i*) are transmitted to the server system 164 for comparison against an authorized persons database 242 and/or (ii) are compared locally against the authorized users data 340.

The UX initiation module 319 includes a digital signal processing (DSP) module 320 and a machine learning (ML) module 321. The DSP module 320 is configured to analyze sensor signals to detect a proximity of a presence or an associated gesture using digital signal processing algorithms. The ML module 320 is configured to analyze sensor signals to detect a proximity of a presence or an associated gesture using machine learning algorithms (e.g., by generating feature vectors and applying one or more classifiers).

In some implementations, the plurality of UX initiation conditions 336 are stored in a lookup table in the memory 306. The lookup table associates each of the UX initiation conditions 336 with a respective one of a plurality of touchless UX operations of a plurality of applications. Each application is associated with one or more of the plurality of touchless UX operations each of which is further associated with one of the UX initiation conditions 336. For example, a media play application is associated with two touchless UX operations of displaying two distinct media play user interfaces according to a proximity of a user to the display assistance device 190 in two distinct proximity ranges.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 3B:
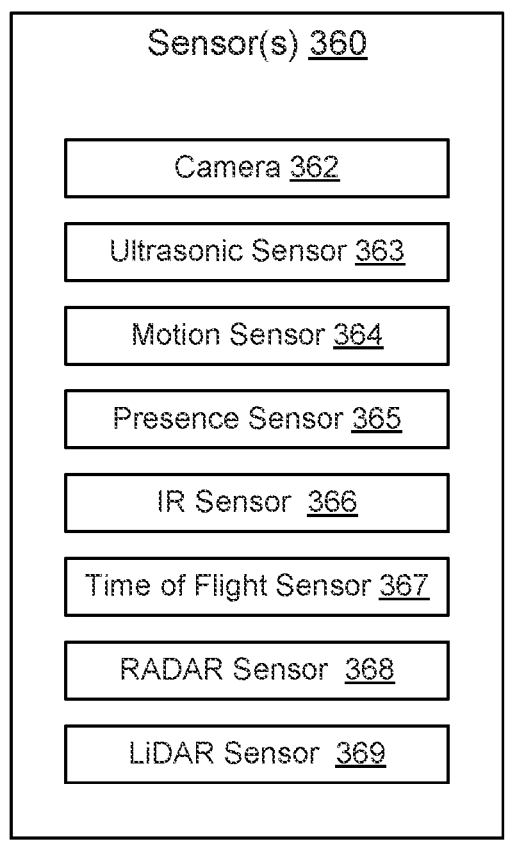
FIG. 3B is a list of sensors of the display assistant device shown in FIG. 3A in accordance with some implementations.

FIG. 3B is a list of sensors 360 of the display assistant device 190 shown in FIG. 3A in accordance with some implementations. The display assistant device 190 includes one or more of a camera 362, ultrasonic sensor 363, motion sensor 364, presence sensor 365, infrared sensor 366, time of flight sensor 367, a radio detection and ranging (RADAR) sensor 368 and a light detection and ranging (LiDAR) sensor 369. Each of the sensors 360 is configured to detect a presence, a gesture or both in the smart home environment 100. The detection of the presence and/or gesture is associated with a proximity or a proximity range with a confidence value. This confidence value is optionally a quantitative index or one of a plurality of predetermined confidence levels (e.g., highest, high, medium and low). More details on the ultrasonic sensor 363 and the RADAR sensor 368 are discussed with reference to U.S. Provisional Patent Application No. 62/680,982, filed Jun. 5, 2018, titled "Systems and Methods of Ultrasonic Sensing in Smart Devices," and U.S. patent application Ser. No. 15/481,289, filed Apr. 6, 2017, titled "Systems, Methods, and Devices for Utilizing Radar-Based Touch Interfaces," each of which is incorporated by reference by its entirety.

Figure 4:
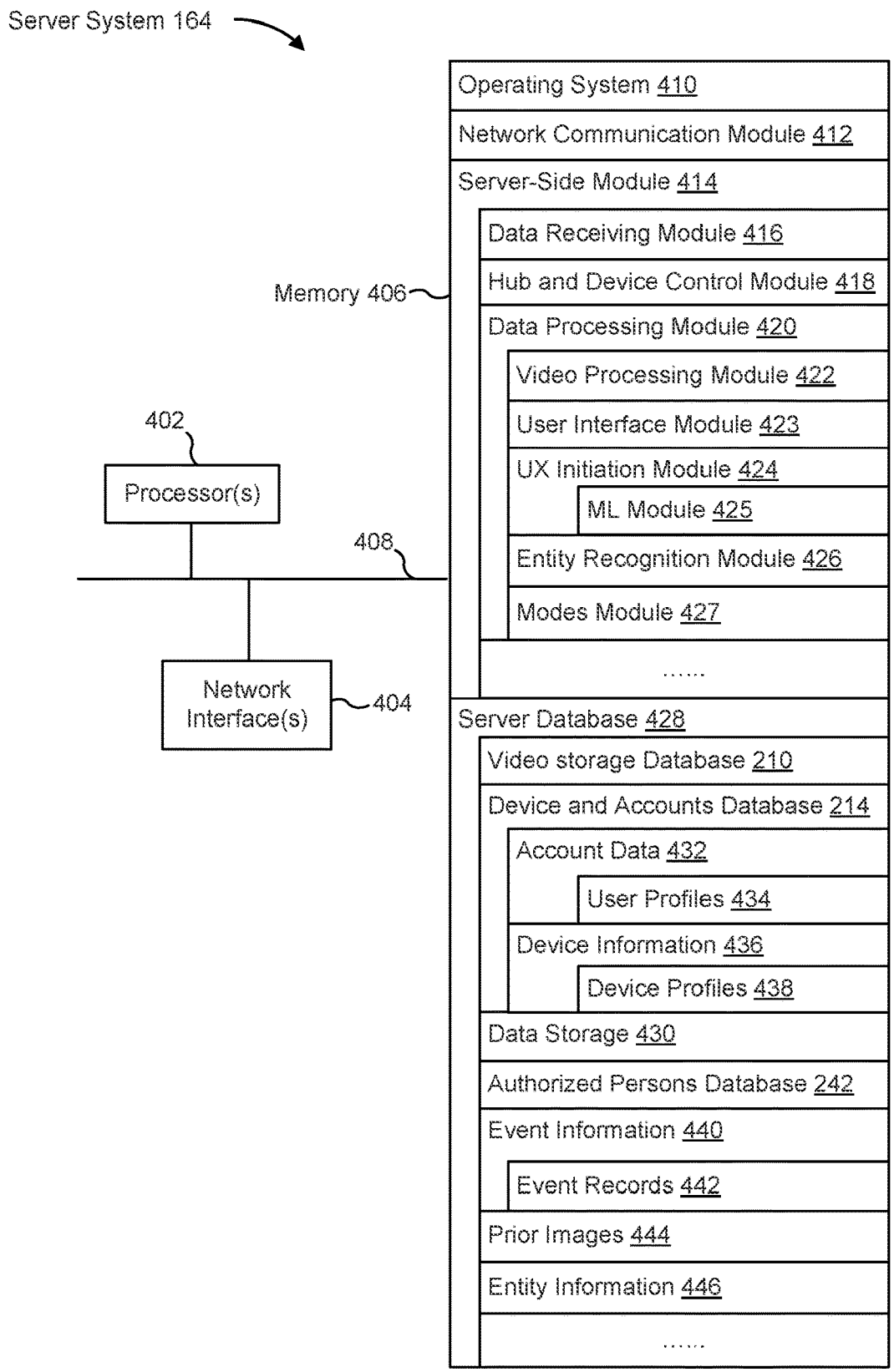
FIG. 4 is a block diagram illustrating a representative server system in accordance with some implementations.

FIG. 4 is a block diagram illustrating the server system 164 in accordance with some implementations. The server system 164 includes one or more processor(s) (e.g., CPUs) 402, one or more network interfaces 404 (e.g., including an I/O interface to one or more client devices and an I/O interface to one or more electronic devices, such as the I/O interface client(s) 216 and the I/O interface to camera(s) 218 in FIG. 2), memory 406, and one or more communication buses 408 for interconnecting these components (sometimes called a chipset). The memory 406 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 406, optionally, includes one or more storage devices remotely located from one or more processor(s) 402. The memory 406, or alternatively the non-volatile memory within memory 406, includes a non-transitory computer-readable storage medium. In some implementations, the memory 406, or the non-transitory computer-readable storage medium of the memory 406, stores the following programs, modules, and data structures, or a subset or superset thereof:

an operating system 410 including procedures for handling various basic system services and for performing hardware dependent tasks;
a network communication module 412 for connecting the server system 164 to other systems and devices (e.g., client devices, electronic devices, and systems connected to one or more networks 110) via one or more network interfaces 404 (wired or wireless);
a server-side module 414, which provides server-side functionalities for device control, data processing, and data review, including, but not limited to:
  a data receiving module 416 for receiving data from electronic devices (e.g., video data and audio data from display assistant device 190, FIG. 2C), and preparing the received data for further processing and storage in the server database 428;
  a device control module 418 for generating and sending server-initiated control commands to modify operation modes of electronic devices (e.g., the display assistant device 190 and the smart devices 120 of the smart home environment 100), and/or receiving (e.g., from client devices 220 and client device 104) and forwarding user-initiated control commands to modify operation modes of the electronic devices;
  a data processing module 420 for processing the data provided by the electronic devices, and/or preparing and sending processed data to a device for review (e.g., client devices 220 for review by a user), including, but not limited to:
    a video processing module 422 for processing (e.g., categorizing and/or recognizing) detected entities and/or event candidates within a received video stream (e.g., a video stream from the display assistant device 190 or from the smart doorbell 126);
    a user interface module 423 for communicating with a user (e.g., sending alerts, timeline events, etc. and receiving user edits and zone definitions and the like);
    a User experience (UX) initiation module 424 for controlling touchless UX operations associated with a plurality of applications according to respective confidence-based initiation conditions, wherein the UX initiation module 424 includes at least a machine learning (ML) module 425 configured to receive gesture recognition requests from client devices and determine a gesture of a presence using a machining learning model;
    an entity recognition module 426 for analyzing and/or identifying persons detected within smart home environments; and
    a modes module 427 for communicating information about the operating modes of the display assistant device 190 to the server system 164 and/or client devices; and
a server database 428, including but not limited to:
  a video storage database 210 (see FIG. 2) for storing raw video data received from the video sources (including the display assistant devices, cameras 132 and the smart doorbells 126), as well as various types of metadata, such as motion events, event categories, event category models, event filters, and event masks, for use in data processing for event monitoring and review for each reviewer account.

- a devices and accounts database 214 for storing devices and accounts data including:
  - account data 432 for user accounts, including user account information such as user profiles 434, information and settings for linked hub devices and electronic devices (e.g., hub device identifications), hub device specific secrets, relevant user and hardware characteristics (e.g., service tier, subscriptions, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;
  - user profiles 434 including profiles for reviewer accounts registered with the video processing server, where a respective user profile includes account credentials for a respective reviewer account, and one or more video sources linked to the respective reviewer account;
  - device information 436 related to one or more devices such as device profiles 438, e.g., device identifiers and hub device specific secrets, independently of whether the corresponding hub devices have been associated with any user account;
- a data storage 430 for storing data associated with each electronic device (e.g., each display assistant device 190) of each user account, as well as data processing models, processed data results, and other relevant metadata (e.g., names of data results, location of electronic device, creation time, duration, settings of the electronic device, etc.) associated with the data, where (optionally) all or a portion of the data and/or processing associated with the hub device 180 or smart devices are stored securely;
- an authorized persons database 242 (FIG. 2E) for storing information of authorized users for electronic devices (e.g., the display assistant device 190), including images, voiceprints, fingerprints, confidence levels and the like;
- event information 440 such as event records 442 and context information, e.g., contextual data describing circumstances surrounding an approaching visitor;
- prior images 444 such as prior background images and/or entity images captured by camera(s) in various lighting conditions; and
- entity information 446 such as information identifying and/or characterizing entities (e.g., in the smart home environment 100).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above (e.g., an account management module for linking client devices, smart devices, and smart home environments).

In some implementations, the memory 406 includes a voice/display assistant application (not shown) that is executed to arrange voice processing of a voice message received from a voice-activated electronic device 190, directly process the voice message to extract a user voice command and a designation of a cast device 108 or another voice-activated electronic device 190, and/or enable a voice-activated electronic device 190 to play media content (audio or video)

In some implementations, the server system 164 includes cloud cast service (e.g., the cloud cast server 116, FIGS. 1A and 2A). The memory 406 further includes a cast device application 422 that is executed to provide server-side functionalities for device provisioning, device control, and user account management associated with cast device(s) 108. Further details of the cloud cast functionalities are found in PCT Application No. PCT/US15/64449, filed Dec. 7, 2019, entitled "Display Assistant Device," which is incorporated herein by reference in its entirety.

FIGS. 5A-5E are a perspective view, a front view, a rear view, a side view, a top view and a bottom view of a display assistant device 190 in accordance with some implementations, respectively. The display assistant device 190 includes a base 502 and a screen 504 (e.g., display 352, FIG. 3A). The base 502 is configured for sitting on a surface. The screen 504 has a rear surface 506 at which the screen 504 is supported by the base.

The base 502 acts a speaker box. A speaker (e.g., speaker 350, FIG. 3A) is concealed inside the base and configured to project sound substantially towards the front view of the display assistant device.

In some implementations, a bezel area includes one or more microphone holes 512. One or more microphones 342 are placed behind the microphone holes 512 and configured to collect sound from the ambient of the display assistant device 190.

In some implementations, the display assistant device 190 further includes a camera opening 520 that holds a camera (e.g., camera 362 of FIG. 3A) that is configured to capture a field of view of the device. For instance, in some implementations, media content that is displayed on the device includes subject matter that was captured by the camera of the device. In some implementations, the camera is configured to detect a light condition in the smart home environment 100 where the display assistant device 190 sits. In some implementations, the display assistant device 190 is configured to adjust a brightness level of its screen 504 according to the light condition. The camera 362 is disposed behind the bezel area and exposed to light via a transparent part of the bezel area, e.g., the sensor opening 520. In some implementations, the display assistant device includes multiple camera openings 520 each configured to hold a camera. In some implementations, the camera openings 520 (and the cameras 362) may be positioned on both the screen side and the rear side of the display assistant device 190. In some implementations, the display assistant device 190 interacts with the smart home environment and, in some implementations, an on-board ambient light sensor (ALS), by using the screen 504 (e.g., display 352, FIG. 3A) to project illumination when the scene (e.g., room in which the display assistant device 190 is located) is poorly lit.

In some implementations, the display assistant device 190 includes a status indicator light 516 (indicator light(s) 353 of FIG. 3A), e.g., LED lights, that are configured to display a visual indication of the status of the camera, including an operation mode of the display assistant device 190.

Figure 5A:
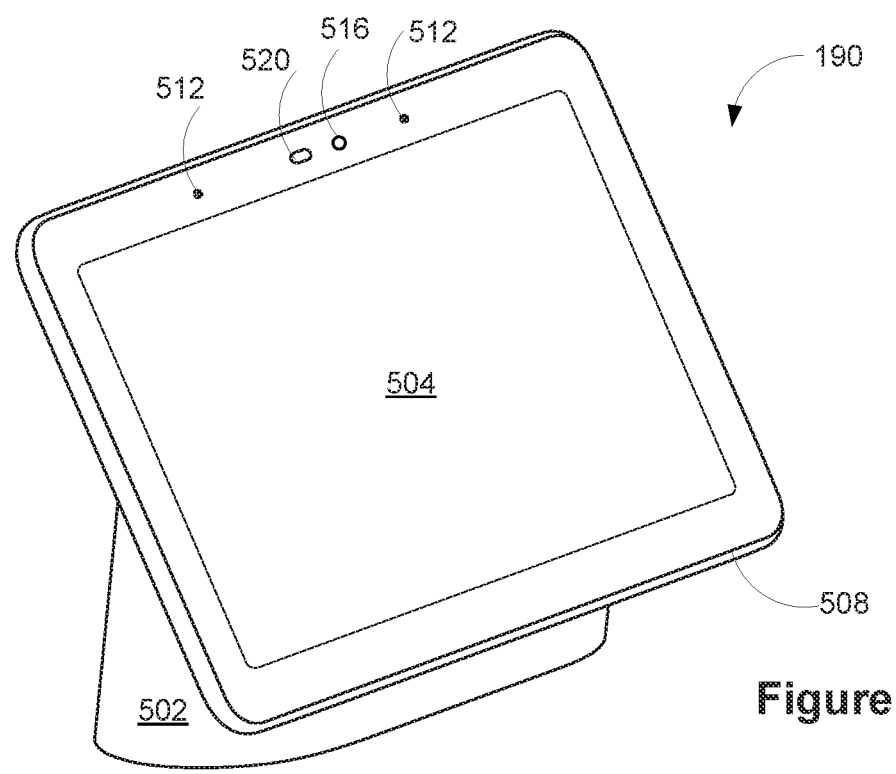
FIGS. 5A-5F are a perspective view, a front view, a rear view, a side view, a top view and a bottom view of a display assistant device in accordance with some implementations, respectively.
Figure 5B:
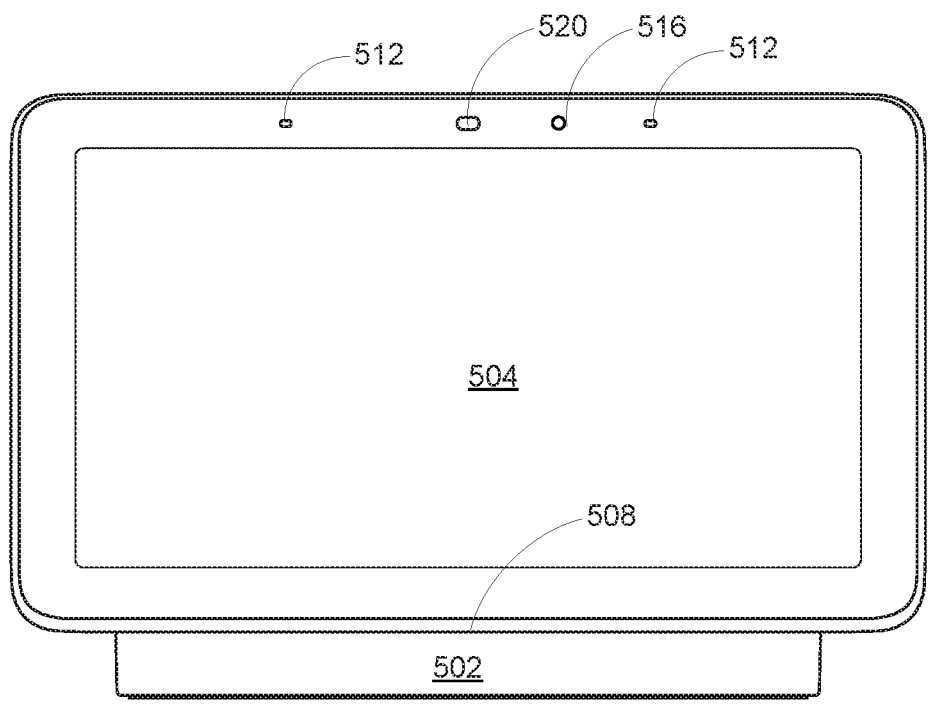
Figure 5C:
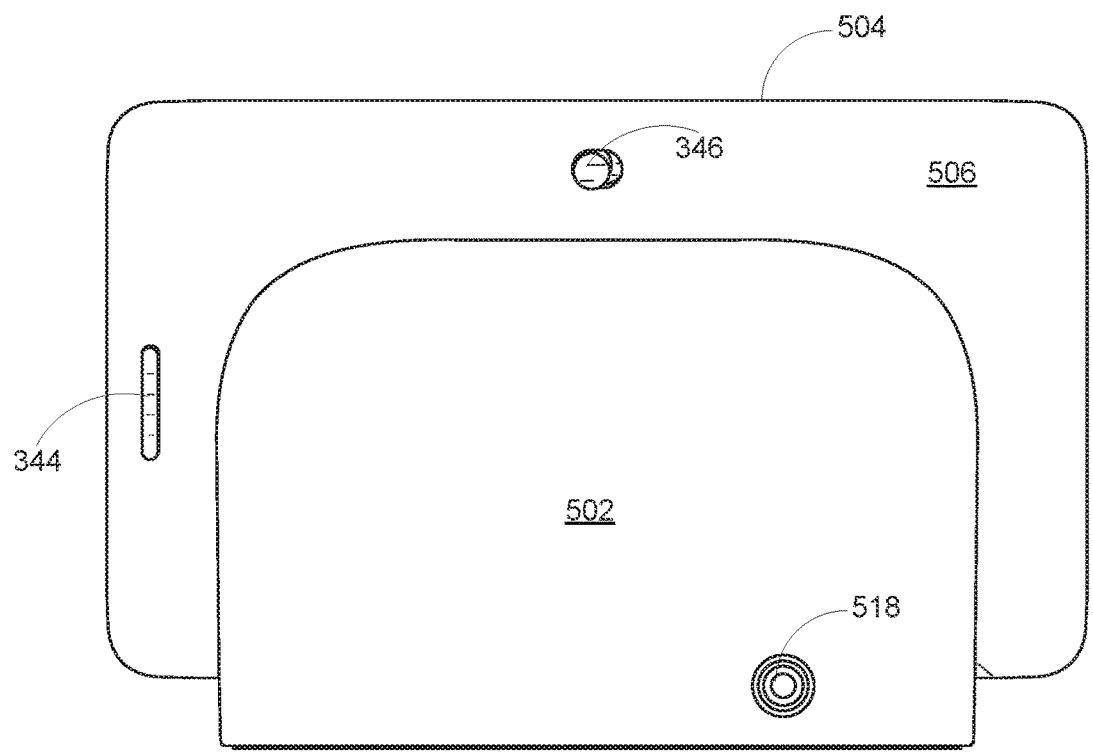

Referring to FIG. 5C, the display assistant device 190 further includes a volume control 344, a privacy control 346 and a power adaptor interface 518. In this example, the volume control button 514 and privacy control 346 are disposed on the rear surface 506 of the screen 504, and the power adaptor interface 518 is disposed on the rear surface 502B of the base 502. The volume control 344 includes a mechanical assembly (e.g., a button, a knob, a switch) configured to receive a user input for adjusting a volume level of the speaker in the display assistant device 190. In an example, the volume control 344 includes two buttons (separated or connected) configured to initiate an increase or decrease of the volume level of the speaker, respectively. In some implementations, the two buttons of the volume control 344 can be pressed concurrently to reset the display assistant device 190, independently of controlling the volume level of the speaker. It is noted that the volume control 344 is not disposed on any edge of the screen 504 of the display assistant device 190. Rather, the volume control 344 is arranged on the rear surface 506 of the screen 504 and has a predefined distance from a short edge of the screen 504, such that when a user grabs the display assistant device 190 by the short edge of the screen 504, the volume control 344 is readily accessible for fingers of the user.

Further, the privacy control 346 disposed on the rear surface 506 is configured to provide privacy protection to a user of the display assistant device 190. For example, the privacy control 346 can mute one or more microphones 342 of the display assistant device 190, and disable the camera(s) 362. In some implementations, activation of the privacy control 346 also disconnects the display assistant device 190 from the Internet while keeping the display assistant device coupled in a local area network, and/or disconnects the display assistant device from all communication networks available to the display assistant device 190. The type of privacy protection enabled by the privacy control 346 could change according to an identity of a person associated with the display assistant device 190 and/or or a time of a specific moment.

In this example of FIG. 5C, the power adaptor interface 518 of the display assistant device 190 is disposed on the rear surface 502B of the base 502. The power adaptor interface 518 includes a female connector to receive a male connector configured to connect the display assistant device 190 to an external power source (e.g., a direct current power source). The display assistant device 190 includes a power board hidden in the base 502. The power board is electrically coupled to the power adaptor interface 518 and configured to drive the display assistant device 190 with the external power source. In some implementations, the display assistant device 190 has to be constantly connected to the external power source, and is powered off when the external power source is disconnected. Alternatively, in some implementations, the power board includes a rechargeable battery. The rechargeable battery is configured to be charged with the external power source, and drive the display assistant device 190 temporarily when the external power source is disconnected from the display assistant device 190.

Figure 5D:
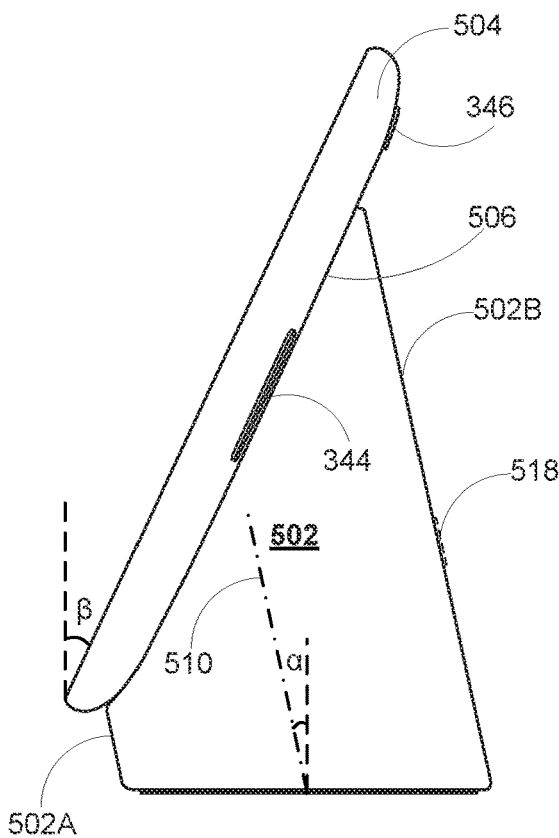
Figure 5E:
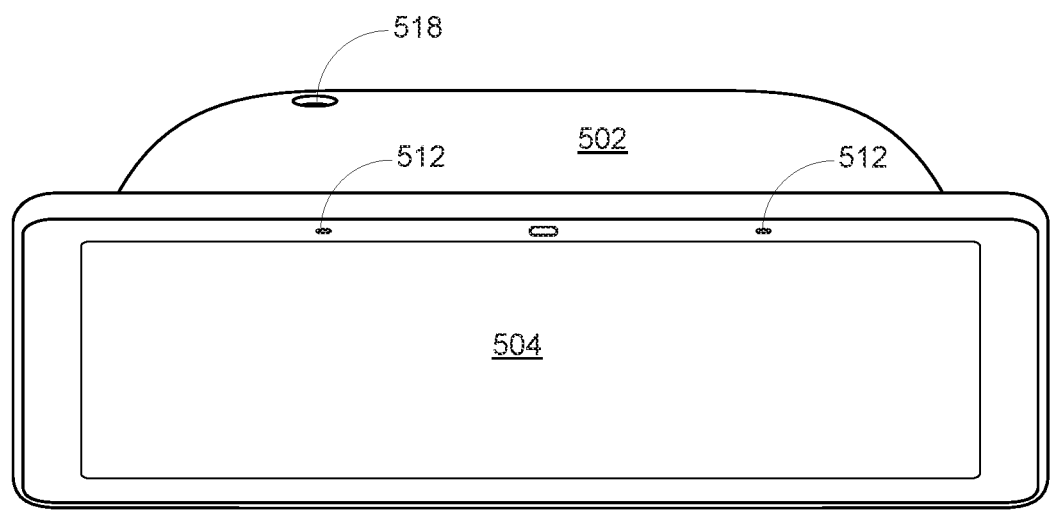
Figure 5F:
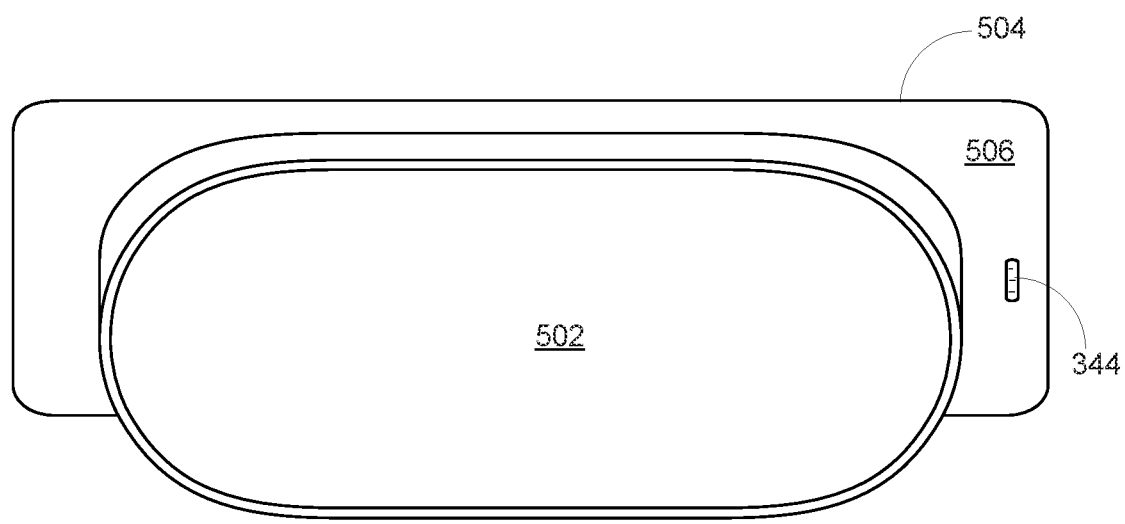

Referring to FIG. 5D, in some implementations, the base 502 extends along a central axis 510, and the central axis 510 of the base 502 is not perpendicular to the surface when the base 502 sits on the surface. Optionally. the base 502 has a front surface 502A and a rear surface 502B both of which are parallel with the central axis 510. The central axis 510, front surface 502A and rear surface 502B of the base 502 lean forward by a base angle α when the base sits on the surface. It is noted that the front surface 502A of the base is shorter than the rear surface 502B of the base, e.g., a height of the front surface 502A is only 20% of that of the rear surface 502B. When the screen 504 is supported by the base 502 at its rear surface 506, the screen 504 is not perpendicular to the surface, but faces substantially forward and leans slightly backward by a screen angle β for the purposes of providing a desirable viewing angle for an average user. In an example, both the base angle α and the screen angle β are equal to 15 degrees, except that the base leans forward by the base angle α of 15 degrees and the screen leans backward by the screen angle β of 15 degrees. By these means, the display assistant device 190 does not tip over (forward or backward) easily when a blunt force F hits a top edge of the display assistant device 190 or a user touch occurs to the screen 202 of the display assistant device 190.

It is noted that FIGS. 5A-5D are focused on an overall look and mechanical features of the display assistant device 190. More details on functions of the display assistant device 190 are described above with reference to FIGS. 1-4.

FIG. 6 is a block diagram illustrating a representative client device 220 (client devices 220 in FIG. 2 and the client device 104 in FIG. 1) associated with a user account in accordance with some implementations. The client device 220, typically, includes one or more processor(s) (e.g., CPUs) 602, one or more network interfaces 604, memory 606, and one or more communication buses 608 for interconnecting these components (sometimes called a chipset). Optionally, the client device also includes a user interface 610 and one or more sensors 690 (e.g., accelerometer and gyroscope). The user interface 610 includes one or more output devices 612 that enable presentation of media content, including one or more speakers and/or one or more visual displays. The user interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection component 616, such as a GPS (global positioning satellite) sensor or other geo-location receiver, for determining the location of the client device.

The memory 606 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 606, optionally, includes one or more storage devices remotely located from one or more processing units 602. The memory 606, or alternatively the non-volatile memory within the memory 606, includes a non-transitory computer readable storage medium. In some implementations, the memory 606, or the non-transitory computer readable storage medium of the memory 606, stores the following programs, modules, and data structures, or a subset or superset thereof:

- an operating system 618 including procedures for handling various basic system services and for performing hardware dependent tasks;
- a network communication module 620 for connecting the client device 220 to other systems and devices (e.g., client devices, electronic devices, and systems connected to one or more networks 110) via one or more network interfaces 604 (wired or wireless);

an input processing module 622 for detecting one or more user inputs or interactions from one of the one or more input devices 614 and interpreting the detected input or interaction;

one or more applications 623 for execution by the client device (e.g., games, social network applications, smart home application 624, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices). In some implementations, the user is able to configure settings for the display assistant device 190 using the smart home application 624, including settings for Monitoring (e.g., Live View, Event History, Notifications) on/off Mode, Home/Away Assist, and activity zones. In some implementations, the smart home application 624 enables the user to schedule times that the camera 362 would be activated for home monitoring. In some implementations, the user is enabled to configure the quality of the images and/or video feed, bandwidth to be used, and settings for the microphones 342 via the smart home application 624. In some implementations, the smart home application 624 provides user education (e.g., training videos, manuals, popup message notifications) that moving the display assistant device 190 will distort what does and does not get recorded with activity zones. In some implementations, the smart home application 624 disables zones or adjusts them when the display assistant device 190 is moved around. In some implementations, the display assistant device 190 is configured to send notifications to the cloud (e.g., to the server system 164) when it is moved;

a user interface module 626 for providing and displaying a user interface in which settings, captured data, and/or other data for one or more devices (e.g., smart devices 120, voice-activated display assistant devices 190 in smart home environment 100) can be configured and/or viewed;

a client-side module 628, which provides client-side functionalities for device control, data processing and data review, including but not limited to:

a device control module 630 for generating control commands for modifying an operating mode of smart devices (e.g., smart devices 120 and display assistant devices 190 and optionally other electronic devices) in accordance with user inputs;

a video analysis module 632 for analyzing captured video data, e.g., to detect and/or recognize persons, objects, animals, and events;

a data review module 634 for providing user interfaces for reviewing data from the server system 164 or video sources 222, including but not limited to:

an event review module 636 for reviewing events (e.g., motion and/or audio events), and optionally enabling user edits and/or updates to the events; and a persons review module 638 for reviewing data and/or images regarding detected persons and other entities, and optionally enabling user edits and/or updates to the persons data;

a presentation module 640 for presenting user interfaces and response options for interacting with the smart devices 120 and/or the server system 164; and a remote interaction module 642 for interacting with a remote person (e.g., a visitor to the smart home environment 100), e.g., via a smart device 120 and/or display assistant device 190 and/or the server system 164; and client data 644 storing data associated with the user account and electronic devices, including, but not limited to:

account data 646 storing information related to both user accounts loaded on the client device and electronic devices (e.g., of the video sources 501) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.;

a local data storage 648 for selectively storing raw or processed data associated with electronic devices (e.g., of the video sources 501, such as a doorbell 106), optionally including entity data described previously; and prior images 650 such as prior background images and/or entity images captured by camera(s) in various lighting conditions.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in various implementations. In some implementations, the memory 606, optionally, stores a subset of the modules and data structures identified above. Furthermore, the memory 606, optionally, stores additional modules and data structures not described above.

FIG. 7 is a presentative operating environment 700 in which an electronic device 190 controls a first touchless UX operation based on detection of a presence and/or a gesture in a required proximity range 702 with a required confidence level in accordance with some implementations. The electronic device 190 executes a first application (e.g., a media play application, a security alarm application) that corresponds to a plurality of touchless UX operations including the first touchless UX operation. The first touchless UX operation is initialized when an initiation condition is satisfied, e.g., when the electronic device 190 detects a presence and a gesture in the required proximity range 702 with the required confidence level. The gesture includes a predefined gesture associated with the first touchless UX operation. Optionally, both the presence and the gesture are detected with the required confidence level. Optionally, the required confidence level applies to the detection of the gesture, while the presence is detected independently of the required confidence level, because the presence can be easily detected with a sufficiently high confidence (e.g., using a conventional presence sensor 365). That said, in some implementations, the first touchless UX operation is initialized when the electronic device 190 sequentially detects a presence in a required proximity range and determines whether a gesture including the predefined gesture can be detected with the required confidence level.

The proximity of the presence of a user is detected with respect to the electronic device based on a first sensor signal. In some situations, the electronic device 190 includes a first sensor (e.g., an ultrasonic sensor 363) configured to collect the first sensor signal and detect the proximity of the presence of the user locally at the electronic device 190. Alternatively, in some situations, the first sensor is distinct from the electronic device 190, and is configured to collect the first sensor signal, detect the proximity of the presence of the user and provide information of the proximity of the presence to the electronic device 190 via one of the communication networks 110. The first sensor is optionally integrated in a smart home device 120, including but not limited to a personal client device 104, a display device 106, a media casting or streaming device 108, a WiFi communication device 160, a hub device 180, a thermostat 122, a home protection devices 124 (e.g., a smoke, fire and carbon dioxide detector), a home security device (e.g., a surveillance camera, a motion detector, a window and door sensor) or the like.

The gesture associated with the proximity of the presence is detected with respect to the electronic device 190 based on a second sensor signal. In some situations, the electronic device includes a second sensor (e.g., a camera 362) configured to collect the second sensor signal and detect the gesture associated with the proximity of the presence locally at the electronic device 190. For example, the second sensor is a visible light or infrared camera integrated in the electronic device 190. Alternatively, in some situations, the second sensor is distinct from the electronic device 190, and is configured to collect the second sensor signal, detect gesture associated with the proximity of the presence and provide information of the gesture to the electronic device via one of the communication network 110. Optionally, the second sensor is a standalone camera 132. Optionally, the second sensor is integrated in a smart home device 120, including but not limited to a personal client device 104, a display device 106, a media casting or streaming device 108, a WiFi communication device 160, a hub device 180, a thermostat 122, a home protection devices 124 (e.g., a smoke, fire and carbon dioxide detector), a home security device (e.g., a surveillance camera, a motion detector, a window and door sensor) or the like. Optionally, the first and second sensors are distinct from each other. Optionally, the first and second sensors are not distinct from each other, and a single sensor is configured to provide both the first and second sensor signals, e.g., using two distinct sensor settings.

Further, in some implementations, the first sensor signal and the second sensor signal are distinct from each other. Optionally, the first and second sensor signals are received sequentially for the purposes of detecting the proximity and gesture of the presence, respectively. Optionally, the first and second sensor signals are received concurrently. Alternatively, in some implementations, the first sensor signal is not distinct from the second sensor signal, i.e., a single signal is received and used to detect both the proximity and the gesture of the presence. For example, video data is captured by the camera 362 of the electronic device 190, and used to detect both the proximity and gesture associated with the presence. In some implementations, the second sensor signal is processed to detect the gesture under the condition that the proximity of the presence is detected as being in the required proximity range 702, thereby reserving computational resources (specifically, the limited local computation resources in the electronic device 190) from unnecessary gesture detection which can be complicated in some situations.

In some implementations, the first sensor (e.g., ultrasonic sensor 363) is configured to detect the proximity of the presence by emitting the first sensor signal and collecting the first sensor signal when it is reflected from objects in its sensing range. In some implementations, the first sensor signal is not originated from the first sensor (e.g., camera 362), but is collected thereby to allow the electronic device 190 to detect the proximity of the presence. Similarly, in some implementations, the second sensor (e.g., ultrasonic sensor 363) is configured to detect the gesture associated with the proximity of the presence by emitting the second sensor signal and collecting the second sensor signal when it is reflected from objects in its sensing range. In some implementations, the second sensor signal is not originated from the second sensor (e.g., camera 362), but is collected thereby to allow the electronic device 190 to detect the gesture associated with the proximity of the presence.

Figure 8A:
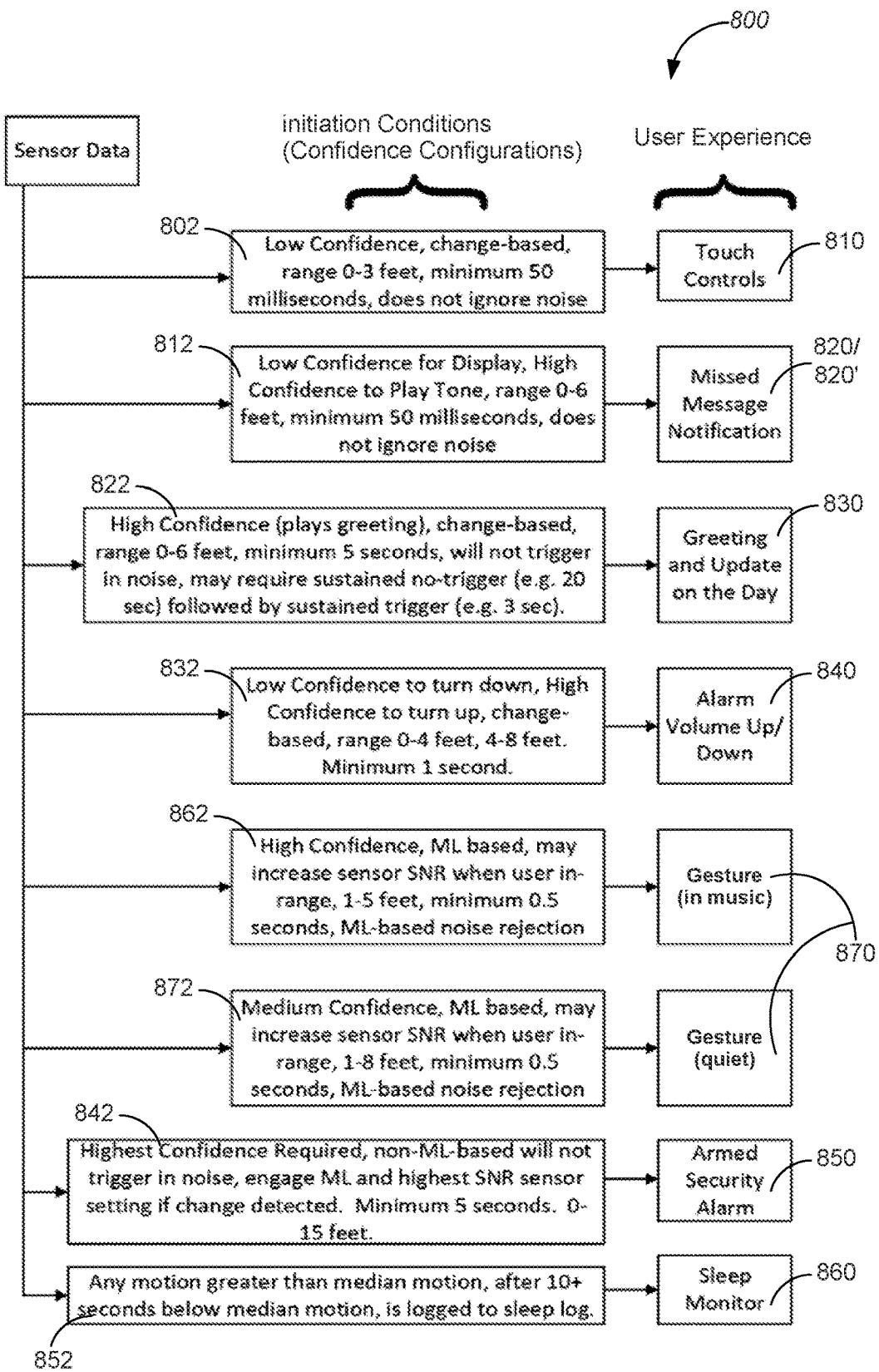
FIG. 8A is a list of UX operations and associated initiation conditions in accordance with some implementations.

FIG. 8A is a list 800 of UX operations and associated initiation conditions in accordance with some implementations, and FIG. 8B is a table 880 summarizing the initiation conditions for the UX operations listed in FIG. 8A in accordance with some implementations. FIGS. 9A-9F illustrate graphics user interfaces (GUIs) displayed according to UX operations of six distinct applications in accordance with some implementations. Each of the GUIs is displayed as a result of initiation of a UX operation of a corresponding application. In some implementations, a UX operation of an application is initialized in accordance with a determination that a proximity of a presence satisfies an initiation condition with a predefined confidence level. In some implementations, a UX operation of an application is initialized in accordance with a determination that both a proximity of a presence and an associated gesture satisfy an initiation condition with a predefined confidence level. In some implementations, a user setting is defined concerning whether a UX operation is triggered in response to detection of only a proximity with a predefined confidence level or the UX operation is triggered in response to detection of both the proximity and gesture with the predefined confidence level.

Figure 9A:
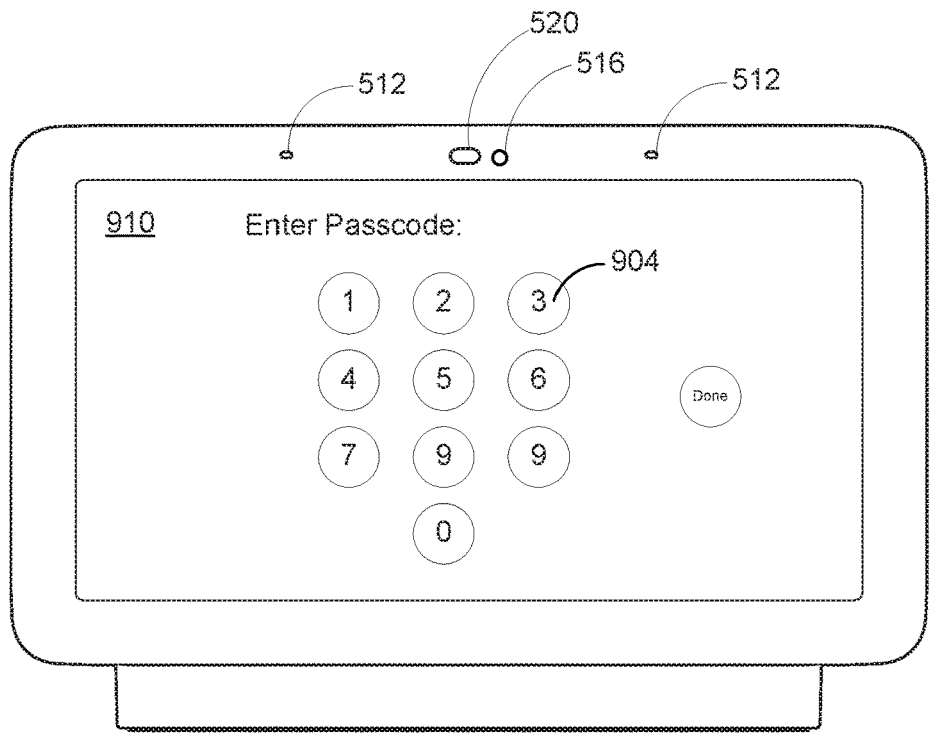
FIGS. 9A-9F illustrate graphics user interfaces displayed according to UX operations of six distinct applications in accordance with some implementations.

Referring to FIG. 9A, in some implementation, a UX operation 810 is initialized to display one or more affordances 904 (i.e., actionable items) on a GUI 910 such that a user can interact with the one or more affordances 904 and control the electronic device 190. In this example, ten digit icons and a confirmation icon are displayed on the GUI 910 to receive user inputs of a security code, and the electronic device 190 is unlocked when the user inputs are consistent with the security code stored in the memory of the electronic 190. Before the UX operation 810 is initialized, the electronic device 190 had a dark screen or was presenting information (e.g., displaying daily updates or static images). When the UX operation 810 is initialized according to a corresponding initiation condition 802, the GUI 910 is automatically displayed in place of what was presented on the electronic device 190 (if any), requiring no physical touch by the user to control the electronic device 190.

In accordance with the initiation condition 802, the UX operation 810 is initialized to display the GUI 910 when the electronic device 190 detects a proximity of a presence within a distance of 3 feet, and detection of the proximity of the presence only needs to be at a low confidence level to initialize the UX operation 810. In some implementations, the proximity of the presence is detected with noise suppression, and a first sensor signal used for proximity detection is filtered to suppress noise. In some implementations, the electronic device 190 monitors the proximity of the presence for at least 50 milliseconds (ms) prior to initializing the UX operation 810, i.e., the first sensor signal lasts for at least 50 ms. In some implementations, the initiation condition 802 is based on a change of the proximity of the presence. For example, the initiation condition 802 requires that the UX operation 810 be initialized and the affordances 904 be displayed in response to a determination that the user is approaching the electronic device 190, i.e., the proximity of the presence decreases with time. Thus, the proximity of the presence includes a proximity change of the presence. The electronic device 190 determines an initial proximity of the presence at a first time and an updated proximity of the presence at a second time subsequent to the first time. The proximity change of the updated proximity of the presence is determined with respect to the initial proximity of the presence.

Figure 9B:
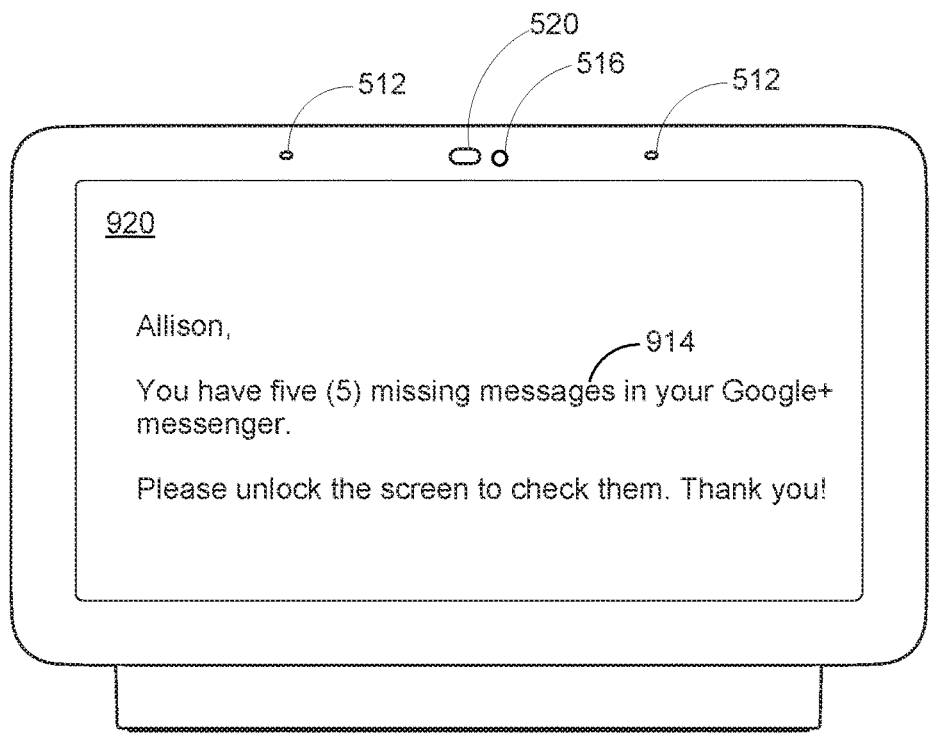

Referring to FIG. 9B, in some implementation, a UX operation 820 is initialized to display a missed message notification 914 on a GUI 920. For example, the missed message notification 914 indicates how many missing messages are available in one or more predefined social media applications since last update. Before the UX operation 820 is initialized, the electronic device 190 had a dark screen or was presenting some other information (e.g., displaying daily updates or static images). The one or more social media applications are being executed in the background of the electronic device. When the UX operation 820 is initialized according to a corresponding initiation condition 812, the missed message notification 914 is automatically displayed on the GUI 920, requiring no physical touch by the user to control the electronic device 190.

In accordance with the initiation condition 812, the UX operation 820 is initialized to display the GUI 920 when the electronic device 190 detects a proximity of a presence within a distance of 6 feet, and detection of the proximity of the presence only needs to be at a low confidence level to initialize the UX operation 820. In some implementations, the proximity of the presence is detected with noise suppression, and the first sensor signal used for proximity detection is filtered to suppress noise. In some implementations, the electronic device 190 monitors the proximity of the presence for at least 50 ms prior to initializing the UX operation 820, i.e., the first sensor signal lasts for at least 50 ms. In some implementations, the initiation condition 812 is based on a change of the proximity of the presence. For example, the initiation condition 802 requires that the UX operation 820 be initialized in response to a determination that the user is approaching the electronic device 190, i.e., the proximity of the presence decreases with time. The proximity of the presence includes a proximity change of the presence. The electronic device determines an initial proximity of the presence at a first time and an updated proximity of the presence at a second time subsequent to the first time. The proximity change of the updated proximity of the presence is determined with respect to the initial proximity of the presence. Alternatively, in some implementations, the initiation condition 812 is independent of a change of the proximity of the presence, i.e., the initiation condition 802 requires that the missed message notification 914 be displayed on the GUI 920 regardless of whether the user is approaching or leaving the electronic device 190.

In some implementations, the UX operation 820' is initiated to play the missed message notification 914 via a speaker of the electronic device 190, which is more intrusive to daily life than displaying the notification on the GUI 920. In accordance with the initiation condition 812, the UX operation 820' is initialized to play the missed message notification 914 via the speaker, when the electronic device 190 detects a proximity of a presence within a distance of 6 feet and detection of the proximity of the presence needs to be at a high confidence level.

Figure 9C:
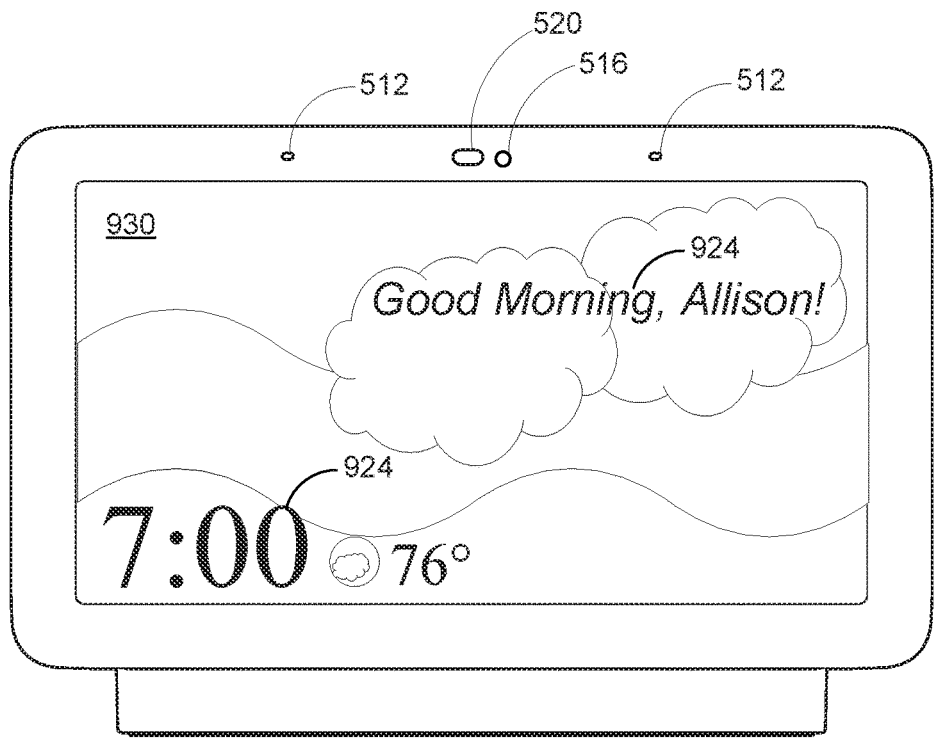

Referring to FIG. 9C, in some implementation, a UX operation 830 is initialized to display a greeting and daily update message 924 on a GUI 930 and/or play information of the message 924 via a speaker of the electronic device 190. For example, the greeting and daily update message 924 indicates a time of day, a weather icon and a temperature. Before the UX operation 830 is initialized, the electronic device 190 optionally had a dark screen, and an application managing greetings and daily updates is executed in the background of the electronic device. When the UX operation 830 is initialized according to a corresponding initiation condition 822, the greeting and daily update message 924 is automatically displayed on the GUI 930 or played via the speaker, requiring no physical touch by the user to control the electronic device 190.

In accordance with the initiation condition 822, the UX operation 830 is initialized to display the GUI 930 because the electronic device 190 detects a proximity of a presence within a distance of 6 feet, and detection of the proximity of the presence only needs to be at a low confidence level to initialize the UX operation 830. However, when the message 924 is played via the speaker of the electronic device 190 (regardless of whether the message 924 is displayed or not), detection of the proximity of the presence is raised to a high confidence level to initialize the UX operation 830. In some implementations, the proximity of the presence is detected with noise suppression, and the first sensor signal used for proximity detection is filtered to suppress noise. In some implementations, the electronic device 190 monitors the proximity of the presence for an extended duration of time (e.g., at least 5 seconds) prior to initializing the UX operation 830, i.e., the first sensor signal lasts for at least 5 seconds. Further, in some implementations, the electronic device 190 monitors a non-proximity of the presence for an extended duration of time in addition to the proximity of the presence prior to initializing the UX operation 830. In an example, the initiation condition 822 requires that the UX operation 830 be initialized only when a proximity of a presence lasts for at least 3 seconds within a distance of 6 feet from the electronic device 190 and when no proximity of any presence is detected within the same distance for 20 seconds prior to detection of the proximity of the presence.

In some implementations, the electronic device 190 is configured to determine a noise level in a corresponding smart home environment where the electronic device 190 is located. In accordance with a determination that the noise level is not greater than a threshold noise level (e.g., the environment is quiet and the user just wakes up), the electronic device 190 initializes the UX operation 830 to display the greeting and daily update message 924 and/or play via the speaker the greeting and daily update message 924. Alternatively, in accordance with a determination that the noise level is greater than the threshold noise level (e.g., the environment is noisy and the user is active), the electronic device 190 does not initialize the UX operation 830 to display, or play via the speaker, the greeting and daily update message 924.

Figure 9D:
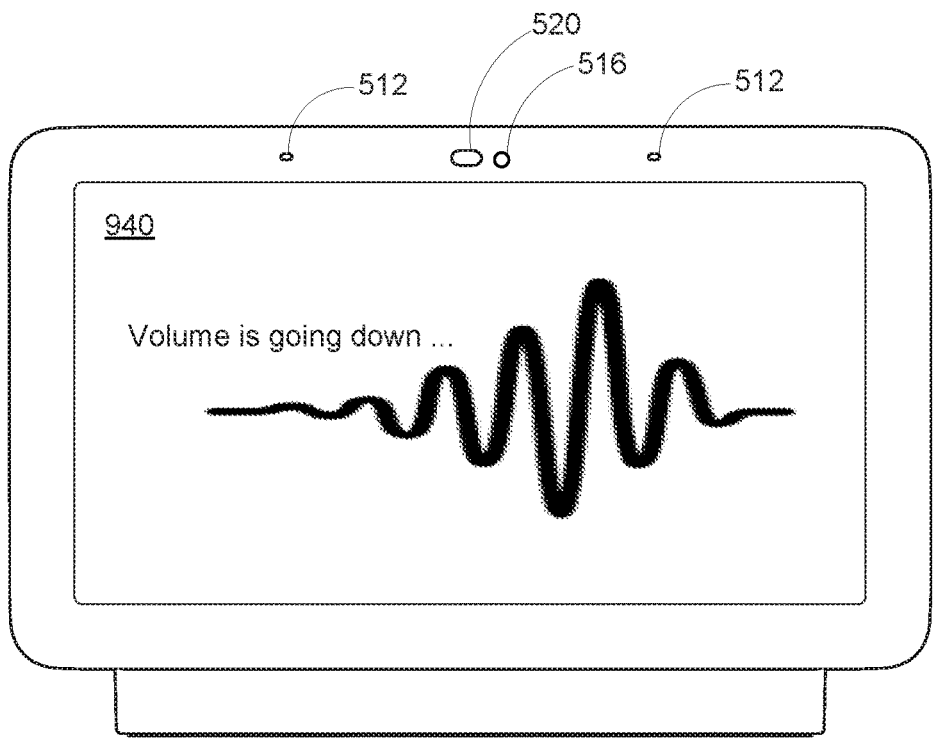

Referring to FIG. 9D, in some implementation, a UX operation 840 is initialized to increase or decrease a volume of sound played on the electronic device 190. The GUI 940 is optionally displayed, indicating execution of the UX operation 840. When the UX operation 840 is initialized according to a corresponding initiation condition 832, the volume of sound is automatically adjusted, requiring no physical touch by the user to control the electronic device 190. In some implementations, in accordance with the initiation condition 832, the UX operation 840 is initialized to adjust the volume of sound when the electronic device 190 detects a proximity of a presence within a distance of 4 feet from the electronic device 190. Alternatively, in some implementations, the UX operation 840 is initialized to adjust the volume of sound when the electronic device 190 detects a proximity of a presence within a range of 4-8 feet away from the electronic device. Optionally, detection of the proximity of the presence needs to be at a low confidence level to reduce the volume of sound, and must be at a high confidence level to increase the volume of sound. In some implementations, the electronic device 190 monitors the proximity of the presence for an extended duration of time (e.g., at least 1 second) prior to initializing the UX operation 840 to adjust the volume of sound.

It is noted that in some implementations, any of the initiation conditions 810, 820, 820', 830 and 840 could include detection of a respective gesture with the respective required proximity range with the required confidence level. For example, the initiation condition 810 includes detection of two or more times of hand waving, and the initiation condition 830 includes detection of hand clapping. The initiation conditions 840 for increasing and decreasing a volume of sound include detections of raising a hand and lowering down a hand, respectively. For any of the initiation conditions 810, 820, 820', 830 and 840, a second sensor signal is identified to detect the respective gesture concurrently with or subsequently with a first sensor signal that is identified to detect the proximity of the presence. The second sensor signal is optionally the same as or distinct from the first sensor signal. In an example, an ultrasonic sensor emits the first sensor signal and the second sensor signal at two signal-to-noise ratios sequentially for the purposes of detecting the proximity and gesture, respectively. In another example, the electronic devices relies on an ultrasonic sensor signal and a video signal to detect the proximity of the presence and gesture, respectively.

Further, for any of the initiation conditions 810, 820, 820', 830 and 840, the electronic device 190 may monitor the gesture for an extended duration of time prior to initializing the corresponding UX operation. In some implementations, the electronic device 190 applies a machine learning model to determine the gesture associated with the proximity of the presence in view of the required confidence level.

Figure 9E:
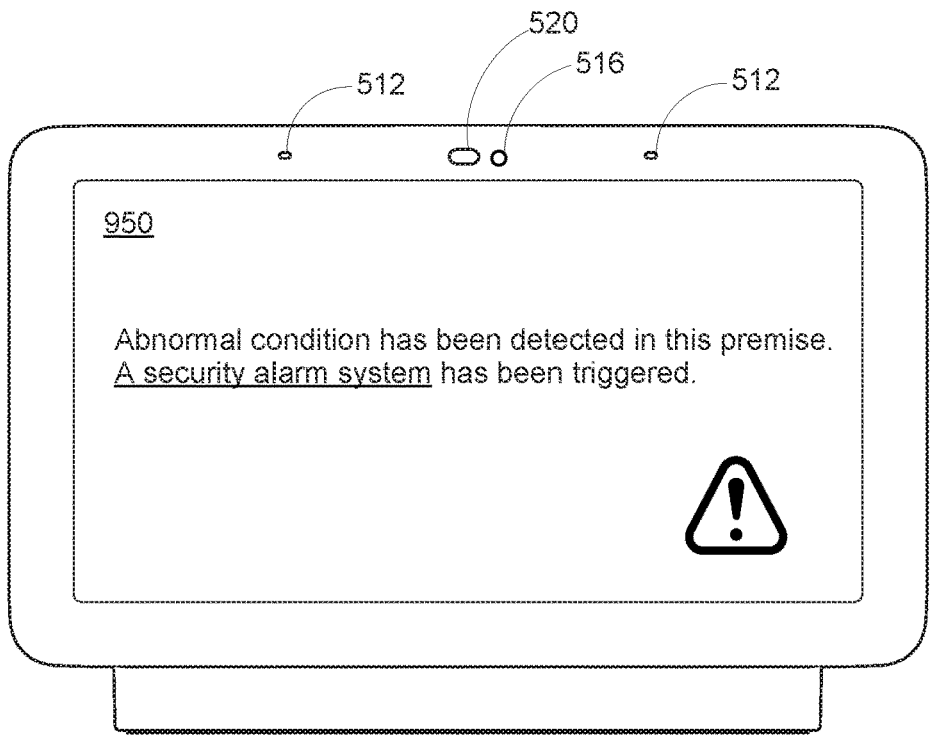

Referring to FIG. 9E, in some implementation, a UX operation 850 is initialized to trigger a security alarm system via the electronic device 190. The GUI 950 is optionally displayed, indicating execution of the UX operation 850. When the UX operation 850 is initialized according to a corresponding initiation condition 842, the security alarm system is enabled to detect emergency situations (e.g., fire, intrusion), requiring no physical touch by the user to control the electronic device 190. In some implementations, in accordance with the initiation condition 832, the UX operation 850 is initialized to enable the security alarm system when the electronic device 190 detects a proximity of a presence and/or a gesture associated with the proximity within a distance of 15 feet from the electronic device 190. Under some circumstances, given an involvement of possible emergency responses (e.g., a 911 call), detection of the proximity and/or gesture requires a highest confidence level. In some implementations, the electronic device 190 monitors the proximity of the presence for an extended duration of time (e.g., at least 5 second) prior to initializing the UX operation 850 to adjust the volume of sound.

In some implementations, the initiation condition 842 is based on a change of the proximity of the presence (e.g., whether a user is approaching or leaving the electronic device, a speed of approaching the electronic device). The electronic device applies a first sensor setting (e.g., a first signal-to-noise ratio) to determine an initial proximity of the presence at a first time and an updated proximity of the presence at a second time subsequent to the first time. A proximity change of the updated proximity of the presence is determined with respect to the initial proximity of the presence. In accordance with the determination that the change of the proximity of the presence is greater than a threshold change (e.g., 0.3 yards within 1 second), the electronic device 190 applies a second sensor setting (e.g., a second signal-to-noise ratio) to continue to monitor the proximity of the presence and/or the gesture associated with the proximity of the presence. In some implementations, in accordance with the determination that the change of the proximity of the presence is greater than the threshold change, the electronic device 190 applies a machine learning model to monitor the proximity of the presence and/or the gesture associated with the proximity of the presence. In some implementations, the electronic device 190 is configured to determine a noise level in a corresponding smart home environment where the electronic device 190 is located. In accordance with a determination that the noise level is greater than the threshold noise level (e.g., the environment is noisy), the electronic device 190 applies a machine learning model to monitor the proximity of the presence and/or the gesture associated with the proximity of the presence.

In some implementations, the machine learning model includes at least a first classifier and a second classifier. The second classifier has a higher complexity level than the first classifier, and demands more computational and caching resources from the electronic device. When the machine learning model is used to determine the proximity of the presence or the gesture associated with the presence, an intermediate proximity/gesture data is determined from a sensor signal (e.g., a first sensor signal for detecting the proximity of the presence, a second signal for detecting the gesture) using the first classifier, and a first confidence level is determined in association with the determination of the intermediate proximity/gesture data. The electronic device 190 then determines whether the first confidence level satisfies the required confidence level. In accordance with the first confidence level satisfies the required confidence level, the electronic device 190 determines the proximity or gesture from the intermediate proximity/gesture data using the second classifier. In contrast, in accordance with the first confidence level does not satisfy the required confidence level, the electronic device 190 aborts determining the proximity or gesture from the intermediate gesture data using the second classifier, thereby reserving the computational and caching resources of the electronic device 190.

Figure 9F:
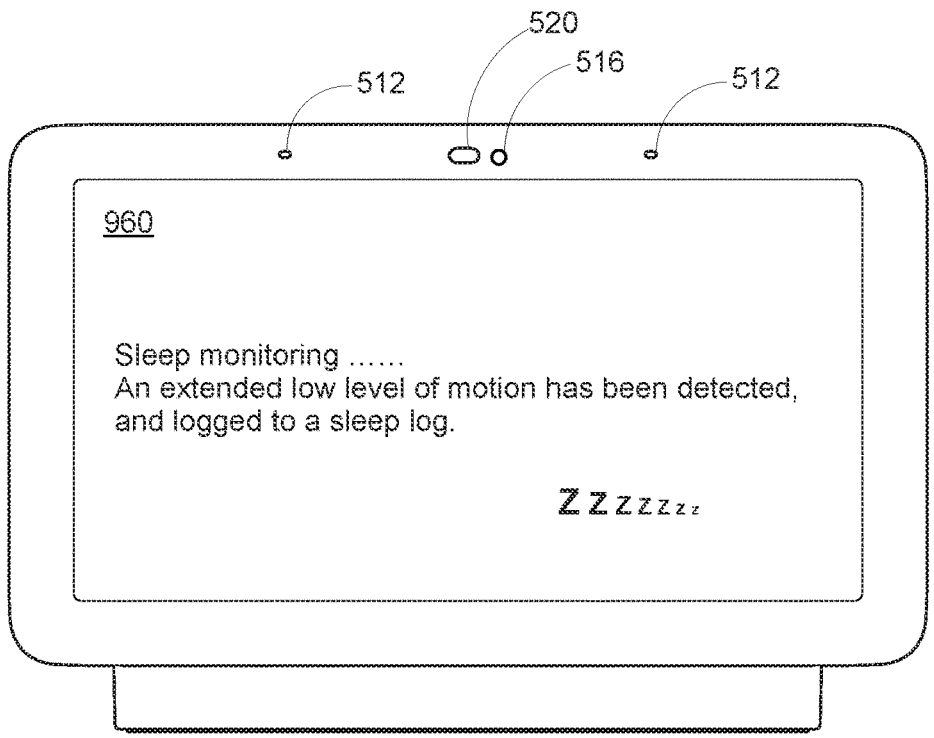

Referring to FIG. 9F, in some implementation, a UX operation 860 is initialized to record a sleep condition (e.g., deep sleep, shallow sleep, awake) via the electronic device 190. The GUI 960 is optionally displayed, indicating execution of the UX operation 860. Before the UX operation 860 is initialized, the electronic device 190 may have a dark screen, and a sleep monitoring application is executed in the background of the electronic device 190. When the UX operation 860 is initialized according to a corresponding initiation condition 852, the sleep monitoring application records the sleep condition automatically, requiring no physical touch by the user to control the electronic device 190. In some implementations, in accordance with the initiation condition 852, the UX operation 860 is initialized to record the sleep condition when the electronic device 190 detects a proximity of a presence within a predefined distance (e.g., 10 feet) from the electronic device 190, and detection of the proximity of the presence requires a low confidence level.

The electronic device 190 monitors the proximity of the presence continuously, and determines an instant motion level based on the proximity of the presence. In accordance with a determination that the instant motion level is not greater than a median motion level for an extended duration of time (e.g., at least 10 seconds), the electronic device 190 enables the UX operation 860 to record the sleep condition as a deep sleep state. In contrast, in accordance with a determination that the instant motion level is greater than an active motion level for another extended duration of time (e.g., at least 4 seconds), the electronic device 190 enables the UX operation 860 to record the sleep condition as an awake state. Further, in accordance with a determination that the instant motion level is greater than the median motion but less than the active motion level, the electronic device 190 enables the UX operation 860 to record the sleep condition as a shallow sleep state.

Referring to FIG. 8A, in addition to detecting the proximity of the presence using a first sensor signal, the UX operation 870 involve determining a gesture in the required proximity range with a required confidence level using a second sensor signal. The required confidence level varies with a noise level of the smart home environment where the electronic device 190 is located. For example, when music is being played in the smart home environment, the required confidence level for determining the gesture is a high confidence level, while in a quiet smart home environment, the required confidence level is reduced to a medium confidence level. The UX operation 870 is associated with an application (e.g., a media play application). Examples of the UX operation 870 includes adjusting the volume 840, forwarding or pausing play of a video clip and turning off the application.

More specifically, when music is being played in the smart home environment, in accordance with an initiation condition 862, the UX operation 870 is initialized in association with the application (e.g., a media play application) when the electronic device 190 detects a proximity of a presence within a range of 1-5 feet from the electronic device 190. Due to play of the music, detection of the proximity of the presence and the gesture associated with the presence needs to be at the high confidence level. In contrast, when music is not played and the smart home environment is quiet, in accordance with an initiation condition 872, the same UX operation 870 is initialized when the electronic device 190 detects the proximity of the presence within a range of 1-8 feet from the electronic device 190, and detection of the proximity of the presence and the gesture associated with the presence needs to be at the medium confidence level. Thus, the required confidence level and the detection range are compromised for detection of the proximity of the presence and the associated gesture when the electronic device 190 is disposed in a noisy environment (e.g., a noise level surrounding the electronic device 190 exceeds a threshold noise level).

In some implementations, the electronic device 190 monitors the proximity of the presence and/or the gesture for an extended duration of time (e.g., at least 0.5 second) prior to initializing the UX operation 870. In some implementations, the electronic device 190 applies a machine learning model to monitor the proximity of the presence and/or the gesture associated with the proximity of the presence. Optionally, the machine learning model includes a set of classifiers (e.g., a first classifier and a second classifier) implemented in a sequence, such that the determination of the proximity or gesture can be aborted when one of the classifiers cannot provide the required confidence level. It is noted that in some implementations, the machine learning model is applied when the noise level surrounding the electronic device 190 exceeds the threshold noise level, i.e., not applied when no music is played.

In some implementations, a first sensor signal and a second sensor signal are originated from an ultrasonic sensor of the electronic device, and used to detect the proximity of the presence and the associated gesture for the purposes of initializing the UX operation 870, respectively. The electronic device 190 applies a first setting and a second setting to the ultrasonic sensor to render the first sensor signal and the second signal, respectively. The second sensor signal is associated with a higher signal-to-noise ratio than the first sensor signal. Under some circumstances, the first and second sensor signals are applied sequentially to detect the proximity of the presence and the associated gesture sequentially. The first and second settings are applied to the ultrasonic sensors sequentially to obtain the second sensor signal subsequently to the first sensor signal. That said, in some implementations, the second setting (e.g., having the higher signal-to-noise ratio) is applied only when it is determined that the proximity of the presence is within the required proximity range.

Alternatively, in some implementations, the first sensor signal is generated from an ultrasonic sensor of the electronic device and used to detect the proximity of the presence. The second sensor signal includes a video signal captured by camera of the electronic device, and used to detect the gesture that initializes the UX operation 870. In some situations, the electronic device 190 turns on a display of the electronic device 190 to illuminate a field of view of the camera of the electronic device.

Referring to FIG. 8B, a touchless UX operation of an application is initialized under an initiation condition defined according to one or more of a confidence level, a proximity range, a duration of detection, a proximity change, whether a noise level is controlled and whether a machine learning model is applied. In accordance with the initiation condition, the UX operation (e.g., displaying affordances) is initialized in response to detection of a proximity of a presence, an associated gesture or both the proximity and gesture. When both the proximity of the presence and the associated gesture are required for initializing the UX operation, detection of the associated gesture optionally depends on or operates independently from detection of the proximity of the presence.

In some implementations, two distinct applications are executed on the electronic device 190, and two of the UX operations are associated with the two distinct applications, respectively. A first UX operation of a first application has a first initiation condition including detection of a presence and/or gesture in a required proximity range with a first required confidence level. A second UX operation of a second application has a second initiation condition including at least detection of a presence and/or gesture in the required proximity range with a second required confidence level. A sensor signal is identified to detect the proximity of the presence or gesture for both the first and second UX operations. In some implementations, the sensor signal is identified according to a higher confidence level of the first required confidence level of the first touchless UX operation and the second required confidence level of the second touchless UX operation.

In some implementations, for a touchless UX operation, a plurality of first sensors have different types and are capable of detecting the proximity of the presence in the required proximity range with the required confidence level. One of the plurality of first sensors is selected to provide a sensor signal used to detect the proximity of the presence according to its detection latency. Similarly, in some implementations, a plurality of second sensors have different types and are capable of detecting the gesture in the required proximity range with the required confidence level. One of the plurality of second sensors is selected to provide a sensor signal used to detect the gesture according to its detection latency. For example, another unselected second sensors can provide a high accuracy and a higher confidence level of recognizing the gesture than the selected second sensor, but is not selected because its detection latency is not as good as that of the selected second sensor.

For each touchless UX operation in the list 880, the respective confidence level is selected from a plurality of predetermined confidence levels. Optionally, the plurality of predetermined confidence levels includes a hierarchy of four confidence levels defined according to three or more thresholds of confidence values. The hierarchy of four confidence levels includes a low confidence level, a medium confidence level, a high confidence level and a highest confidence level.

A user application (e.g., a media play application) is optionally associated with one or more touchless UX operations, and each touchless UX operation is associated with a respective initiation condition. In some implementations, the imitation condition is predefined and stored in the memory of the electronic device 190. In some implementations, the UX initiation module 319 in FIG. 3A is configured to receive user inputs to customize the predefined initiation condition. In some implementations, the UX initiation module 319 allows a user to select a user setting that bypasses the initiation condition, thereby disabling the corresponding touchless UX operation.

Figure 10A:
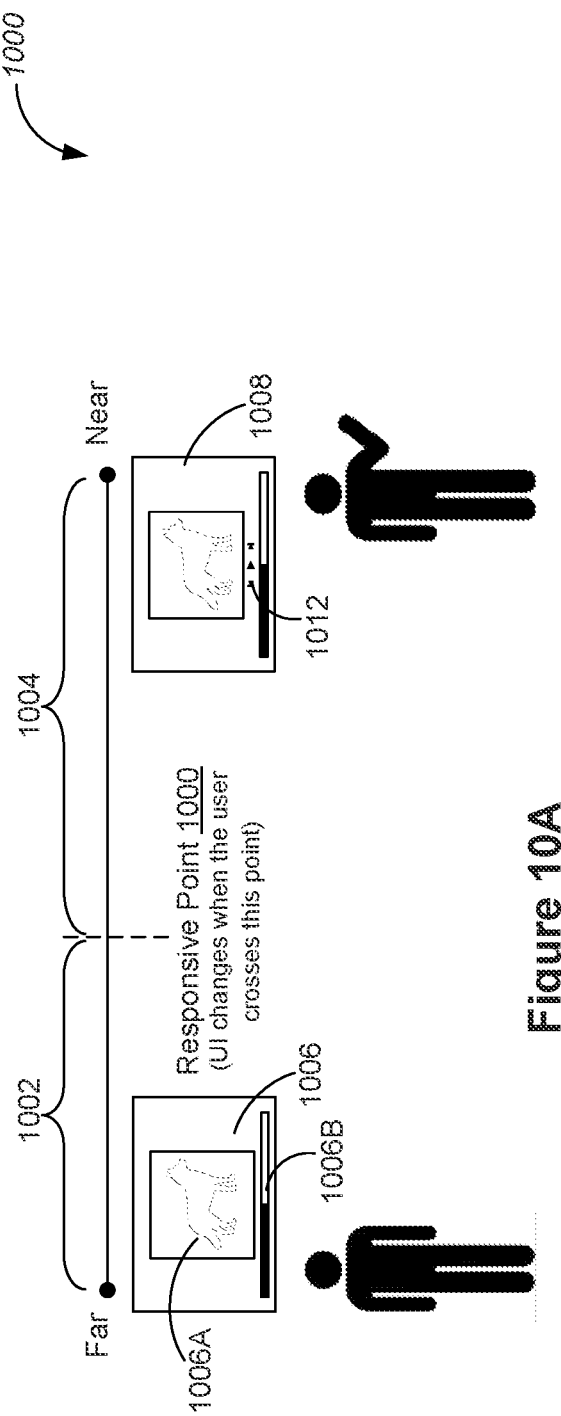
FIG. 10A is another presentative operating environment in which an electronic device controls UX operations of an application based on a proximity of a presence with respect to the electronic device in accordance with some implementations.

FIG. 10A is another presentative operating environment 1000 in which an electronic device 190 controls UX operations of an application based on a proximity of a presence with respect to the electronic device 190 in accordance with some implementations. The application has two distinct touchless UX operations, a first UX operation and a second UX operation. The first UX operation corresponds to a first initiation condition including at least detection of the proximity of the presence in a first required proximity range 1002 with a first required confidence level. The second UX operation corresponds to a second initiation condition including at least detection of the proximity of the presence in a second required proximity range 1004 with a second required confidence level. The second required proximity range 1004 is distinct from the first required proximity range 1002. In some implementations, the second required proximity range 1004 partially overlaps the first required proximity range 1002. In an overlapping proximity range of the first and second required proximity ranges, one of the first and second UX operations is initialized based on which one is most recently initialized or a direction of a motion (i.e., a change of the proximity of the presence). Alternatively, in some implementations, the second required proximity range 1004 does not overlap the first required proximity range 1002, and is separated therefrom by a distance. In some implementations, the second required proximity 1004 range is adjacent to the first required proximity range 1002, and is separated therefrom by a responsive point 1010 having a threshold distance from the electronic device 190. The UX operations are initialized on two sides of the responsive point 1010.

In an example, the first required proximity range 1002 is further away from the electronic device 190 than the second required proximity range 1004. The first UX operation is enabled to display a first user interface 1006 in the first required proximity range 1002, and the second UX operation is enabled to display a second user interface 1008 in the second required proximity range 1004. In some implementations, after the first user interface 1006 is displayed, the electronic device 190 determines that the second initiation condition is satisfied and aborts the first UX operation to initialize the second UX operation and replace the first user interface 1006 with the second user interface 1008. Likewise, in some implementations, after the second user interface 1008 is displayed, the electronic device 190 determines that the first initiation condition is satisfied and aborts the second UX operation to initialize the first UX operation and replace the second user interface 1008 with the first user interface 1006.

The second user interface 1008 is more complicated than the first user interface 1006, because a user is closer to the electronic device 190 and can see and reach the screen of the electronic device 190 better. The second user interface 1008 is configured to display more information than the first user interface 1006, and optionally includes one or more affordances (i.e., actionable items). In some implementations, the second user interface 1008 has a different focus area from the first user interface 1006. In some implementations, the second user interface 1008 has a different format (e.g., is scrollable, displays more content in a smaller font size) from the first user interface 1006. In an example media display application, the first user interface 1006 includes a static image or a video clip 1006A displayed with a progress bar 1006B. As the user approaches the electronic device 190, e.g., passes the responsive point 1010, the second user interface 1008 is displayed to present three additional affordances 1012 for fast-forwarding, rewinding and playing/pausing the displayed media content.

Figure 10B:
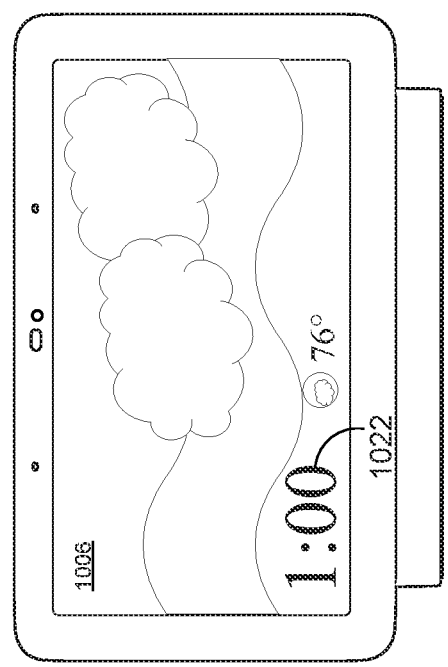
FIGS. 10B and 10C illustrate two user interfaces displayed according to two distinct UX operations of an application corresponding to the two distinct proximity ranges in accordance with some implementations.
Figure 10C:
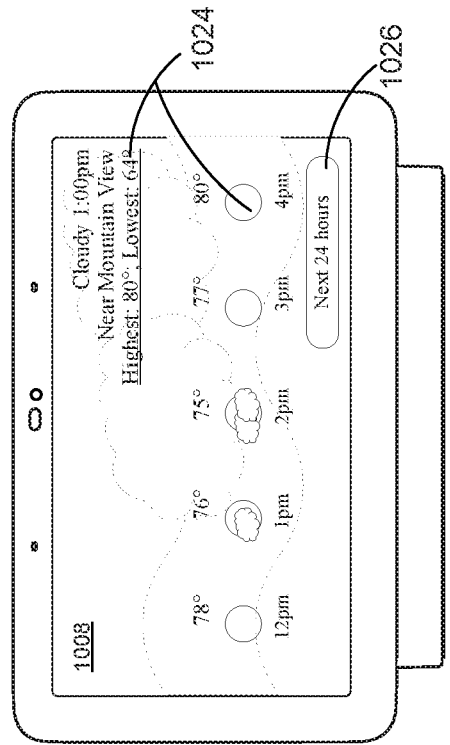

FIGS. 10B and 10C illustrate two user interfaces 1006 and 1008 displayed according to the first and second UX operations of the application (e.g., a daily update application) corresponding to the two distinct proximity ranges 1002 and 1004 in accordance with some implementations. The first user interface 1006 displays primary information 1022 including a time, a weather icon and a temperature on a background. The second user interface 1006 displays secondary information 1024 and one or more affordances 1026 in addition to the primary information 1022. The secondary information 1024 includes temperatures in the next few hours, the highest temperature and the lowest temperature of the day and a location. Each of the one or more affordances 1026 can be selected to control the electronic device 190 or display supplemental information. In this example, the displayed affordance 1026 is configured to enable display of weather information for the next 24 hours.

In some implementations, an UX operation 830 is enabled concurrently with the second UX operation that initializes the second user interface 1008. Although the second user interface 1008 does not show an increase of the volume of sound, the volume of sound is optionally raised if the proximity of the presence and gesture have been determined to satisfy the initiation condition 840. Stated another way, a plurality of touchless UX operations can be initialized concurrently when their respective initiation conditions are satisfied by the proximity of the presence, the associated gesture and the determined confidence level. Before the plurality of touchless UX operations are initialized, one or more sensor signals are selected based on the initiation conditions of these UX operations to detect the proximity of the presence and/or the associated gesture with the required confidence levels and a desirable latency.

Figure 11:
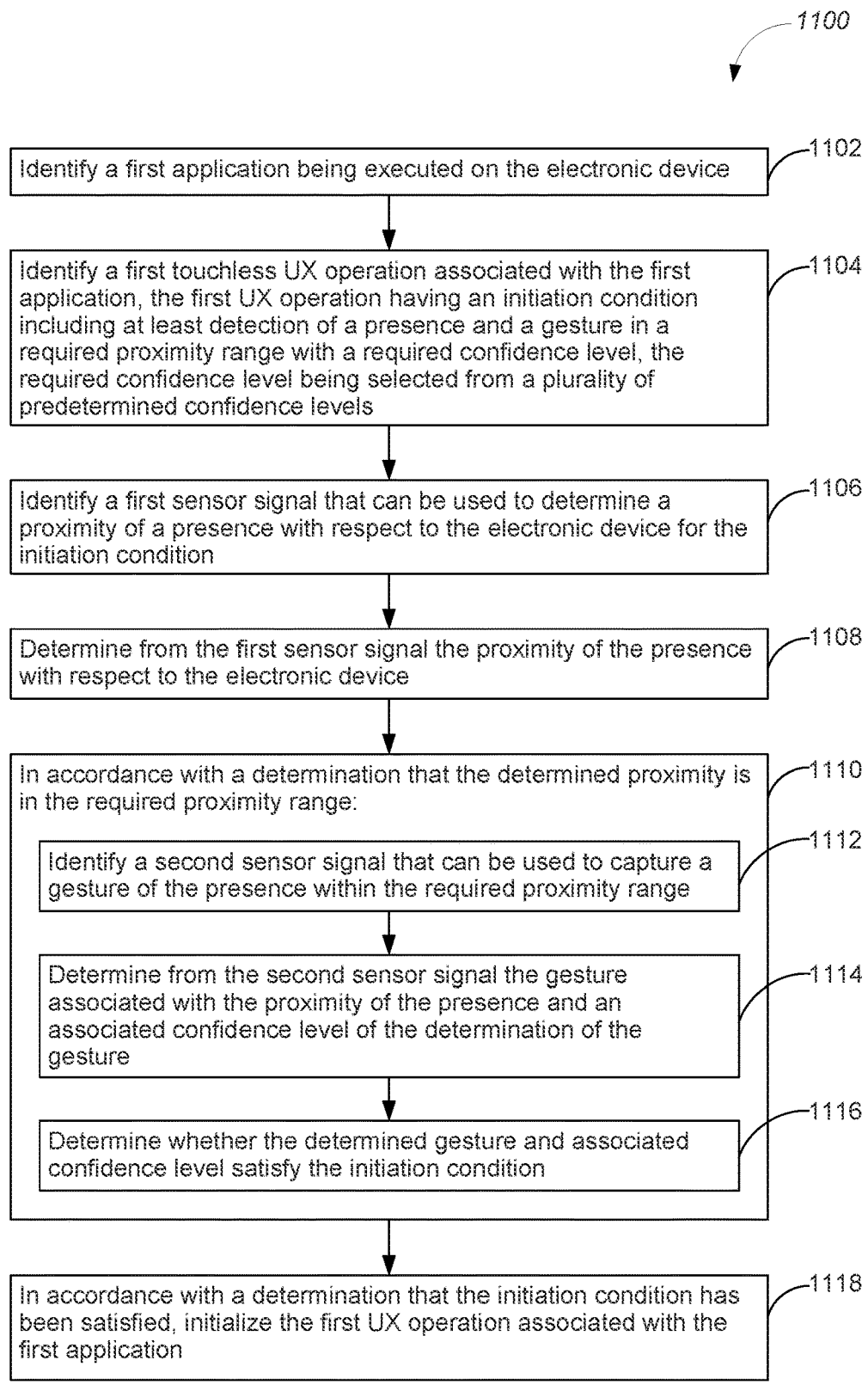
FIG. 11 is a flow chart of a representative method of controlling UX operations in accordance with some implementations.
Figure 12A:
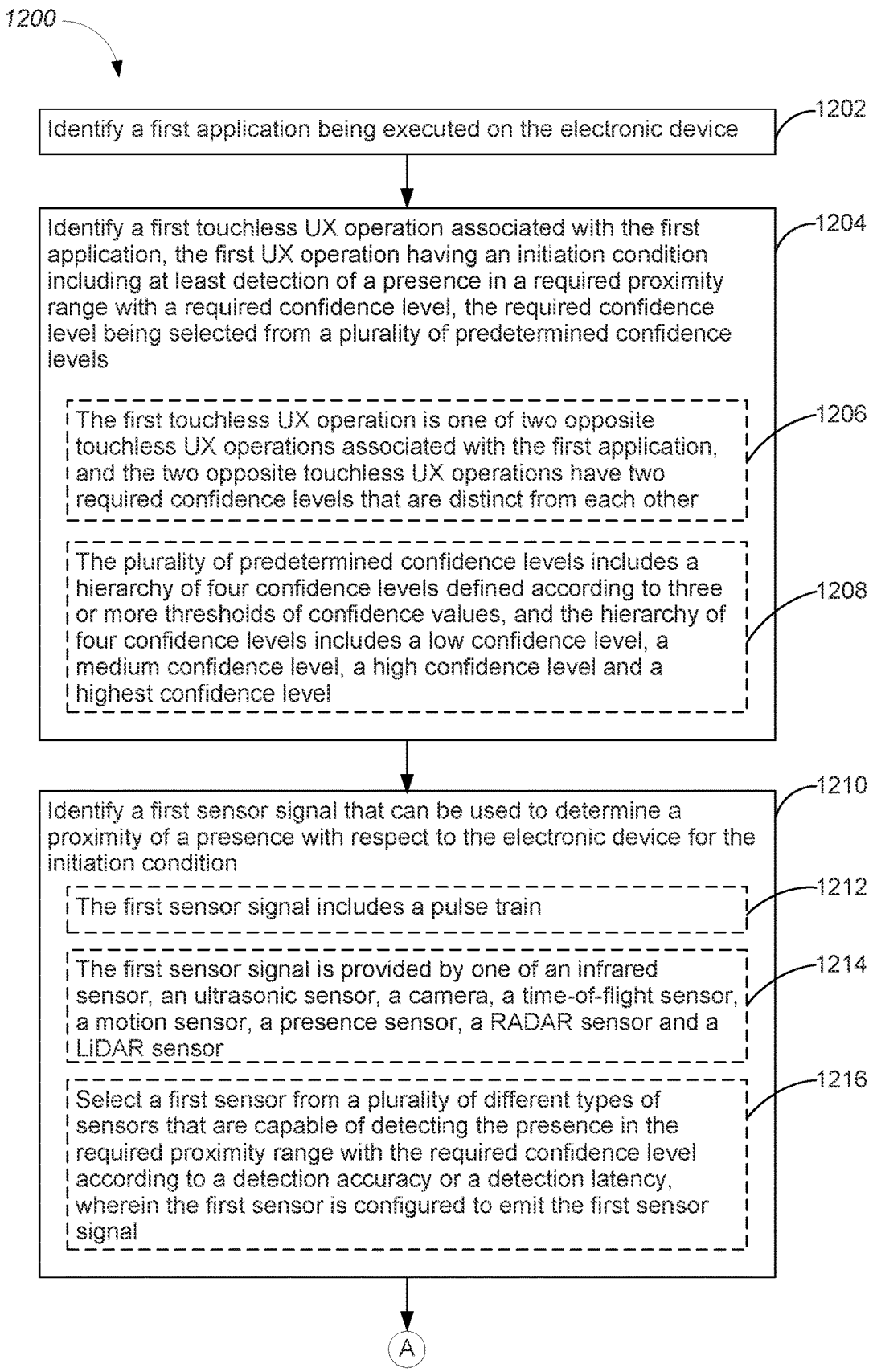
FIGS. 12A-12D are a flow chart of another representative method of controlling UX operations in accordance with some implementations.
Figure 12B:
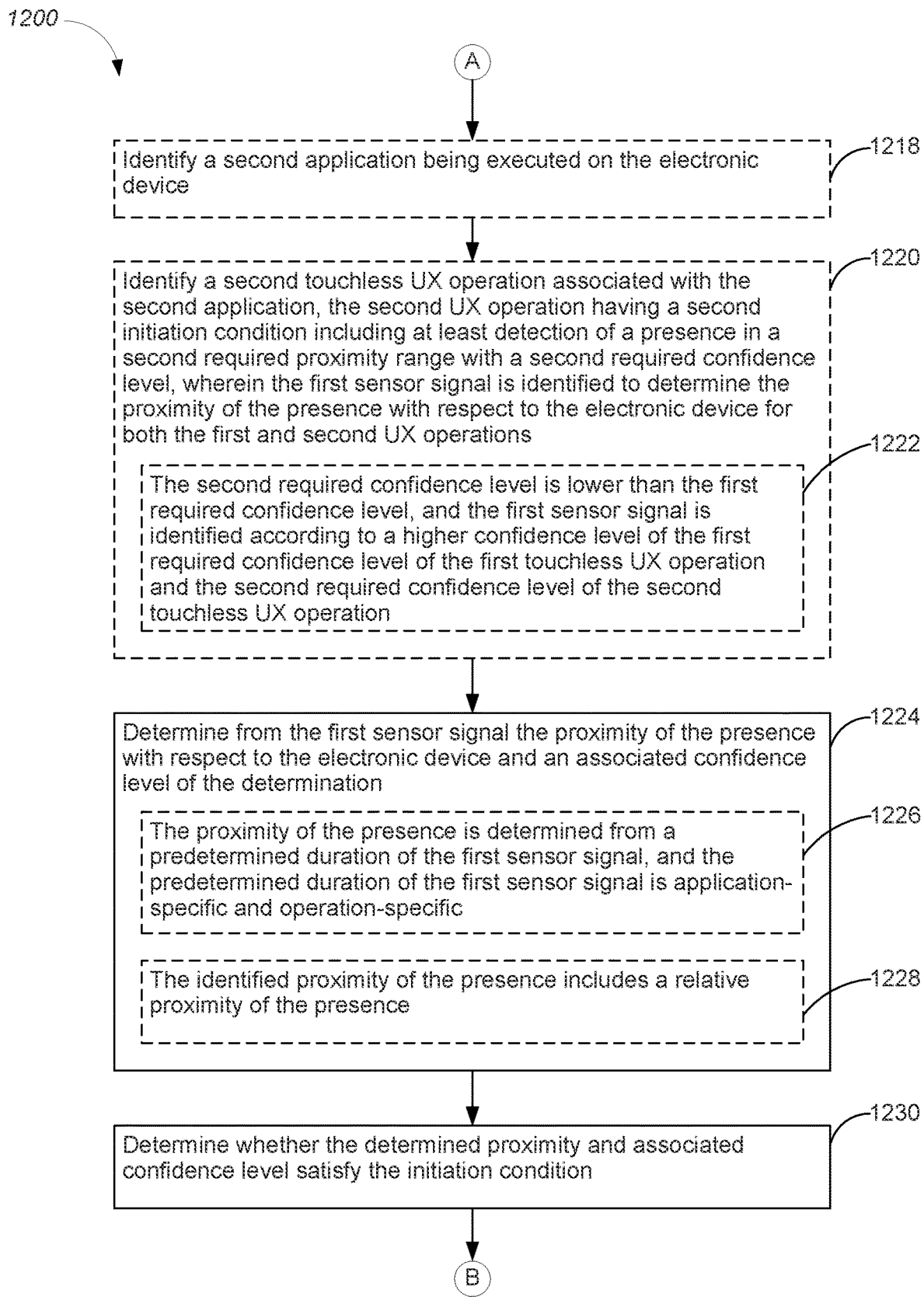
Figure 12C:
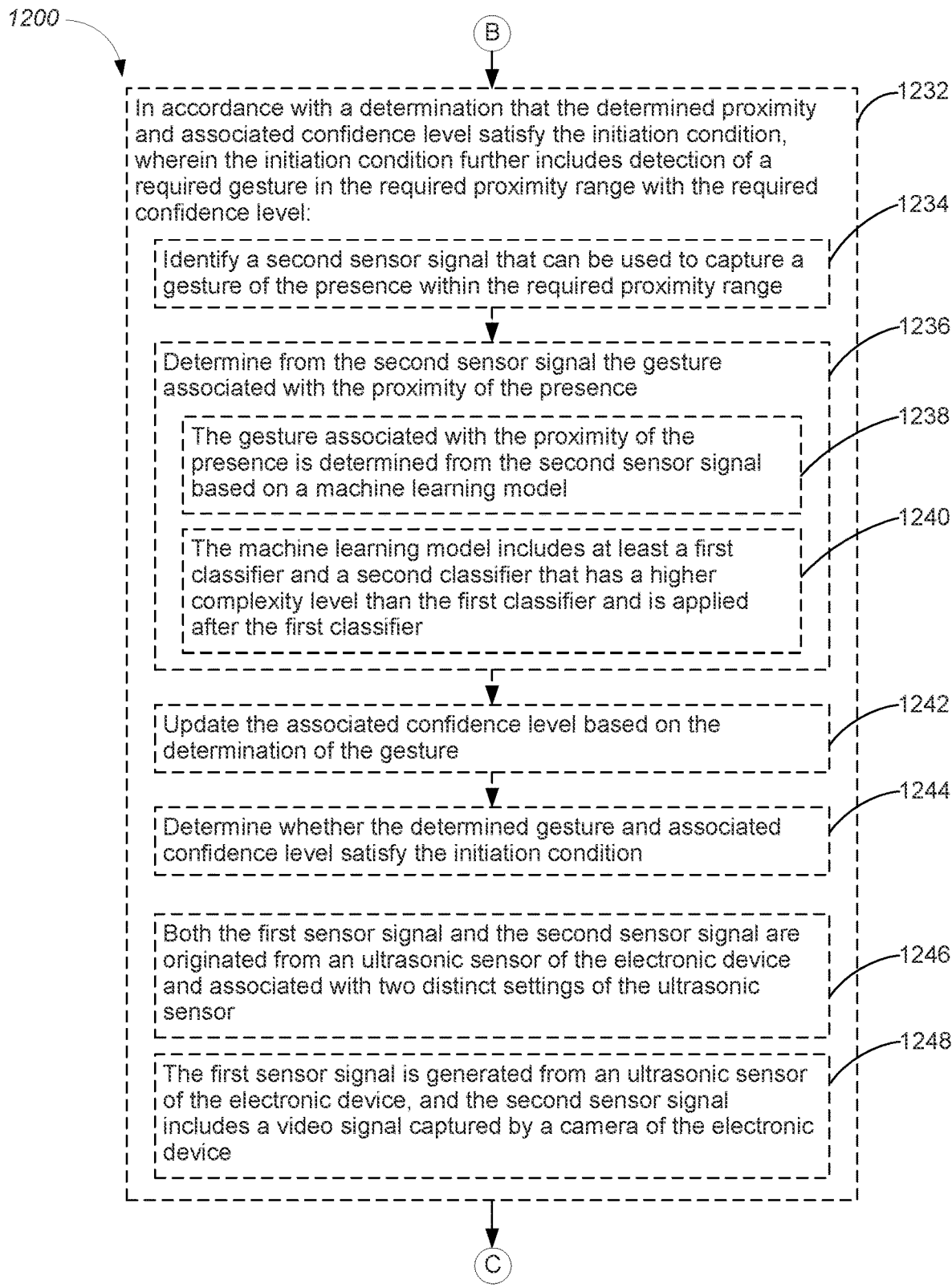
Figure 12D:
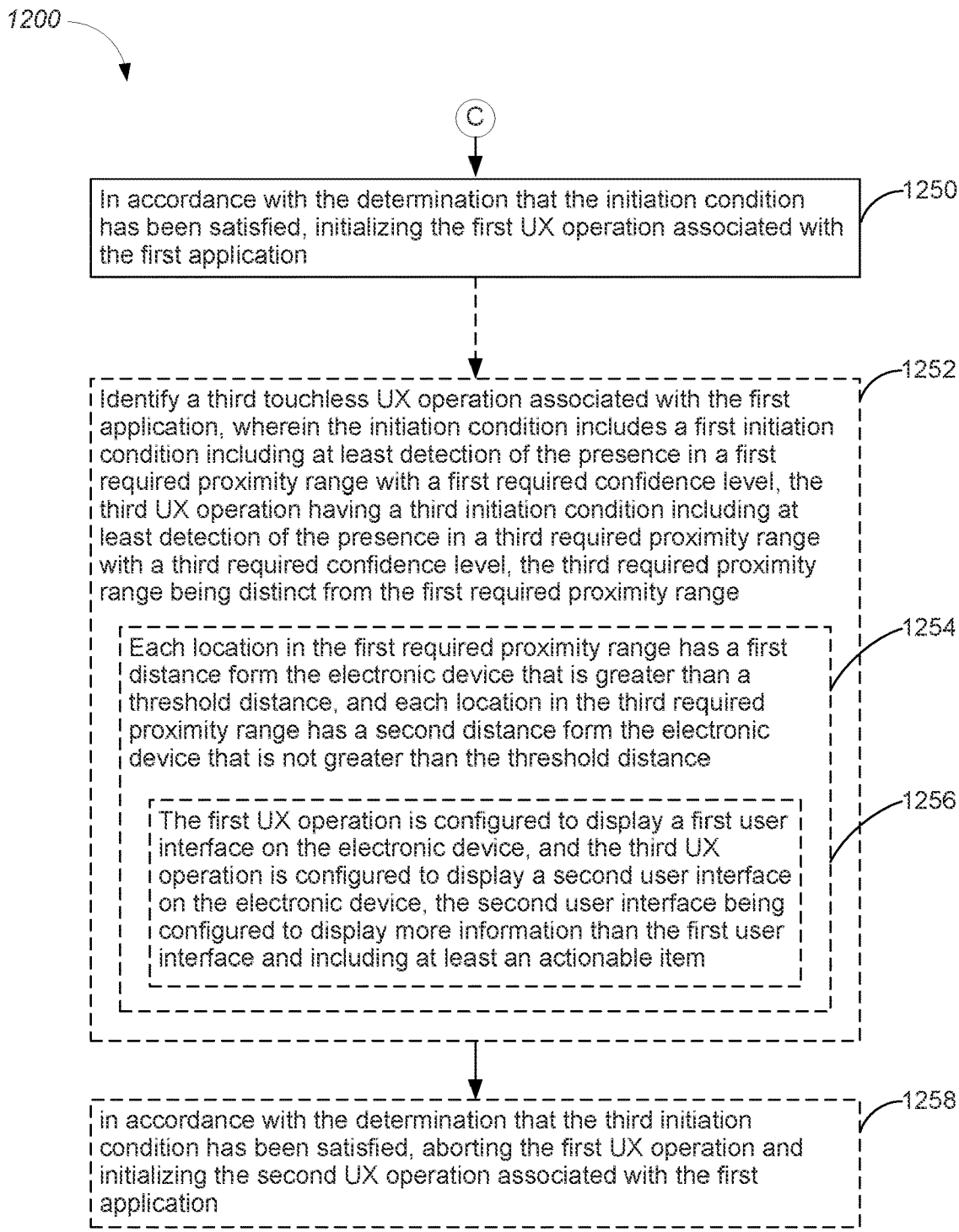

FIG. 11 is a flow chart of a representative method 1100 of controlling UX operations in accordance with some implementations. Method 1100 is performed by an electronic device (e.g., display assistant device 190), and is, optionally, governed by instructions that are stored in a non-transitory computer readable storage medium and that are executed by one or more processors of the electronic device. Each of the operations shown in FIG. 11 may correspond to instructions stored in a computer memory or non-transitory computer readable storage medium (e.g., memory 306 of device 190 in FIG. 3A). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1100 may be combined and/or the order of some operations may be changed.

The electronic device identifies a first application (1102) being executed on the electronic device and a first touchless UX operation (1104) associated with the first application. The first UX operation has an initiation condition including at least detection of a presence and a gesture in a required proximity range with a required confidence level. Optionally, the required confidence level is selected from a plurality of predetermined confidence levels (e.g., highest, high, medium, low).

The electronic device then identifies (1106) a first sensor signal that can be used to determine a proximity of a presence with respect to the electronic device for the initiation condition, and determines (1108) from the first sensor signal the proximity of the presence with respect to the electronic device and whether the determined proximity is in the required proximity range. In some implementations, the initiation condition includes a first initiation condition. A second application is executed on the electronic device. A second touchless UX operation associated with the second application is identified, and has a second initiation condition including at least detection of the presence and the gesture in the required proximity range with a second required confidence level. The first sensor signal is identified to determine the proximity of the presence with respect to the electronic device for both the first and second UX operations, and the second sensor signal is identified to determine the gesture associated with the presence for both the first and second UX operations. The first and second sensor signals are identified according to a higher confidence level of the first required confidence level of the first touchless UX operation and the second required confidence level of the second touchless UX operation. In this example, the second required confidence level is lower than the first required confidence level.

In accordance with a determination (1110) that the determined proximity is in the required proximity range, the electronic device identifies (1112) a second sensor signal that can be used to capture a gesture of the presence within the required proximity range. The second sensor signal is used to determine (1114) the second sensor signal the gesture associated with the proximity of the presence and an associated confidence level of the determination of the gesture. In some implementations, the electronic device 190 also determines a first confidence level associated with the determination of the proximity of the presence and whether the first confidence level satisfies the initiation condition. The second sensor signal is identified and used to determine the gesture in accordance with a determination that the first confidence level satisfies the initiation condition. In some implementations, the gesture associated with the proximity of the presence is determined from the second sensor signal based on a machine learning model including at least a first classifier and a second classifier. The second classifier has a higher complexity level than the first classifier and is applied only if the first classifier is applied and results in an intermediate confidence level that satisfies the required confidence level.

In some implementations, both the first sensor signal and the second sensor signal are originated from an ultrasonic sensor of the electronic device. A first setting is applied to the ultrasonic sensor to render the first sensor signal, and a second setting to the ultrasonic sensor is applied to render the second sensor signal. The second sensor signal is associated with a higher signal-to-noise ratio than the first sensor signal. Alternatively, in some implementations, the first sensor signal is generated from an ultrasonic sensor of the electronic device, and the second sensor signal includes a video signal captured by a camera of the electronic device.

The electronic device determines (1116) whether the determined gesture and associated confidence level satisfy the initiation condition, and initializes (1118) the first UX operation associated with the first application in accordance with a determination that the initiation condition has been satisfied. In some implementations, the first application is associated with a third touchless UX operation having a third initiation condition. The third initiation condition includes at least detection of the presence and the gesture in a third required proximity range with a third required confidence level, and the third required proximity range is distinct from the first required proximity range. In accordance with the determination that the third initiation condition has been satisfied, the electronic device 190 aborts the first UX operation and initializes the third UX operation associated with the first application. One or two sensor signals are identified to detect the presence and the gesture in the third required proximity range. The one or two sensor signals are optionally the same as or distinct from those applied to detect the presence and the gesture in the first required proximity range.

It should be understood that the particular order in which the operations in FIG. 11 have been described are merely exemplary and are not intended to indicate that the described order is the only order in which the operations could be performed. One of ordinary skill in the art would recognize various ways to control UX operations as described herein. Additionally, it should be noted that details of other processes described herein with respect to method 1200 (e.g., FIGS. 12A-12D) are also applicable in an analogous manner to method 1100 described above with respect to FIG. 11. For brevity, these details are not repeated here.

FIGS. 12A-12D are a flow chart of another representative method 1200 of controlling UX operations in accordance with some implementations. Method 1200 is performed by an electronic device (e.g., display assistant device 190), and is, optionally, governed by instructions that are stored in a non-transitory computer readable storage medium and that are executed by one or more processors of the electronic device. Each of the operations shown in FIG. 12A-12D may correspond to instructions stored in a computer memory or non-transitory computer readable storage medium (e.g., memory 306 of device 190 in FIG. 3A). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1100 may be combined and/or the order of some operations may be changed.

The electronic device identifies a first application (1202) being executed on the electronic device and a first touchless UX operation (1204) associated with the first application. The first UX operation has an initiation condition including at least detection of a presence in a required proximity range with a required confidence level. Optionally, the required confidence level is selected from a plurality of predetermined confidence levels. Examples of the first UX touchless UX operation include, but are not limited to, displaying a touch control interface 810, displaying a message or notification 820, playing a message or notification via a speaker 820', playing a greeting and update via the speaker 830, increasing a volume of sound 840, reducing a volume of sound 640 and enabling a security alarm system 850.

In some implementations, the first touchless UX operation is (1206) one of two opposite touchless UX operations (e.g., volume up and volume down) associated with the first application, and the two opposite touchless UX operations have two required confidence levels that are distinct from each other. In some implementations, the first touchless UX operation (e.g., operation 870 in FIG. 8A) associated with the first application corresponds to one of two required confidence levels. The two required confidence levels correspond to a quiet smart home environment and a noisy smart home environment. A first required confidence level corresponding to the quiet smart home environment is lower than a second required confidence level corresponding to the noisy smart home environment. In some implementations, the plurality of predetermined confidence levels includes (1208) a hierarchy of four confidence levels defined according to three or more thresholds of confidence values, and the hierarchy of four confidence levels includes a low confidence level, a medium confidence level, a high confidence level and a highest confidence level.

The electronic device identifies (1210) a first sensor signal that can be used to determine a proximity of a presence with respect to the electronic device for the initiation condition. In some implementations, the electronic device receives an instruction to monitor the first touchless UX operation associated with the first application, and obtains the first sensor signal including (1212) a pulse train. In some implementations, the first sensor signal is provided (1214) by one of an infrared sensor, an ultrasonic sensor, a camera, a time-of-flight sensor, a motion sensor, a presence sensor, a RADAR sensor and a LiDAR sensor. In some implementations; the electronic device selects (1216) a first sensor from a plurality of different types of sensors that are capable of detecting the presence in the required proximity range with the required confidence level according to a detection accuracy or a detection latency. The first sensor is configured to provide the first sensor signal.

In some implementations, the initiation condition includes a first initiation condition. The electronic device identifies a second application (1218) being executed on the electronic device and a second touchless UX operation (1220) associated with the second application. The second UX operation has a second initiation condition including at least detection of a presence in the required proximity range with a second required confidence level. The first sensor signal is identified to determine the proximity of the presence with respect to the electronic device for both the first and second UX operations. Further, in some implementations, the second required confidence level is lower than (1222) the first required confidence level, and the first sensor signal is identified according to a higher confidence level of the first required confidence level of the first touchless UX operation and the second required confidence level of the second touchless UX operation.

The electronic device determines (1224) from the first sensor signal the proximity of the presence with respect to the electronic device and an associated confidence level of the determination. Optionally, the first sensor signal is filtered to at least partially suppress noise of the first sensor signal. In some implementations, the proximity of the presence is determined (1226) from a predetermined duration of the first sensor signal, and the predetermined duration of the first sensor signal is application-specific and operation-specific. In some implementations, the identified proximity of the presence includes (1228) a proximity change of the presence (e.g., to indicate whether a user is approaching or leaving the electronic device). To determine the proximity change of the presence, the electronic device determines an initial proximity of the presence at a first time and an updated proximity of the presence at a second time subsequent to the first time, and identifies the proximity change of the updated proximity of the presence with respect to the initial proximity of the presence.

The electronic device determines (1230) whether the determined proximity and associated confidence level satisfy the initiation condition. In accordance with the determination that the initiation condition has been satisfied, the electronic device initializes (1250) the first UX operation associated with the first application.

In some implementations, the initiation condition further includes detection of a required gesture in the required proximity range with the required confidence level. In accordance with a determination that the determined proximity and associated confidence level satisfy the initiation condition, the electronic device further identifies (1232) a second sensor signal that can be used to capture a gesture of the presence within the required proximity range, and determines (1236) from the second sensor signal a gesture associated with the proximity of the presence. Optionally, the second sensor signal is filtered to at least partially suppress noise of the second sensor signal. The associated confidence level is updated (1242) based on the determination of the gesture. The electronic device further determines (1244) whether the determined gesture and updated confidence level satisfy the initiation condition. The first UX operation associated with the first application is initialized in accordance with the determination that the initiation condition has been satisfied for the proximity of the presence and the gesture. In some implementations, the second sensor signal is provided by one of an infrared sensor, an ultrasonic sensor, a camera, a time-of-flight sensor, a motion sensor, a presence sensor, a RADAR sensor and a LiDAR sensor.

In some implementations, the gesture associated with the proximity of the presence is determined (1238) from the second sensor signal based on a machine learning model. The machine learning model optionally includes (1240) at least a first classifier and a second classifier that has a higher complexity level than the first classifier. Specifically, the electronic device determines from the second sensor signal an intermediate gesture data using the first classifier and a first confidence level, and whether the first confidence level satisfy the required confidence level. In accordance with the first confidence level satisfies the required confidence level, the electronic device continues to determine the gesture from the intermediate gesture data using the second classifier. Alternatively, in accordance with the first confidence level does not satisfy the required confidence level, the electronic device aborts determining the gesture from the intermediate gesture data using the second classifier. It is noted that in some implementations, the second classifier is implemented at the server system 164, i.e., the electronic device provides the intermediate gesture data to the server system 164 that is remote from the electronic device, and receives final gesture data from the server system 164. Under some circumstances, a user of the electronic device may select a privacy setting to disable any involvement of the server system 164 in gesture determination to avoid a security concern, and to comply with the privacy setting, the electronic device implements the entire machining learning model including the second classifier locally.

In some implementations, both the first sensor signal and the second sensor signal are originated (1246) from an ultrasonic sensor of the electronic device. A first setting is applied to the ultrasonic sensor to render the first sensor signal, and a second setting is applied to the ultrasonic sensor to render the second sensor signal. The second sensor signal is associated with a higher signal-to-noise ratio than the first sensor signal. Alternatively, in some implementations, the first sensor signal is generated (1248) from an ultrasonic sensor of the electronic device, and the second sensor signal includes a video signal captured by a camera of the electronic device. Further, in some situations, initiation of the first UX operation associated with the first application includes turning on a display of the electronic device to illuminate a field of view of the camera of the electronic device.

In some implementations, each of the first and second sensor signals includes a train of pulses. Optionally, the train of pulses lasts for an extended duration required to detect the presence and gesture associated with the first UX operation, e.g., 1 second for adjustment of a volume of sound 840. Optionally, the train of pulses lasts until an instruction is received to stop initializing the first UX operation.

In some implementations, the initiation condition includes (1252) a first initiation condition including at least detection of the presence in a first required proximity range with a first required confidence level. The electronic device identifies (1252) a third touchless UX operation associated with the first application. The third UX operation has a third initiation condition including at least detection of the presence in a third required proximity range with a third required confidence level. The third required proximity range is distinct from the first required proximity range. In accordance with the determination that the third initiation condition has been satisfied, the electronic device aborts (1258) the first UX operation and initiates the third UX operation associated with the first application.

In some implementations, each location in the first required proximity range has (1254) a first distance from the electronic device that is greater than a threshold distance, and each location in the third required proximity range has a second distance from the electronic device that is not greater than the threshold distance. Further, in some implementations, the first UX operation is configured to display (1256) a first user interface on the electronic device. The third UX operation is configured to display a second user interface on the electronic device, and the second user interface is configured to display more information than the first user interface and including at least an actionable item (e.g., a touch control). That said, as a user approaches an electronic device, e.g., moves within the threshold distance, the second user interface replaces the first user interface to provide additional information and actionable item(s) to the user. More details on transitioning between two touchless UX operations of the same application are discussed above with reference to FIGS. 10A-10C.

It should be understood that the particular order in which the operations in FIGS. 12A-12D have been described are merely exemplary and are not intended to indicate that the described order is the only order in which the operations could be performed. One of ordinary skill in the art would recognize various ways to control UX operations as described herein. Additionally, it should be noted that details of other processes described herein with respect to method 1100 (e.g., FIG. 11) are also applicable in an analogous manner to method 1200 described above with respect to FIGS. 12A-12D. For brevity, these details are not repeated here.

In accordance with some implementations of this application, an electronic device (e.g., a display assistant device) is configured to implement contextual and touchless user experience (UX) operations associated with one or more applications executed thereon. The electronic device is configured to initiate touchless UX operations (e.g., enabling display of user interfaces) according to a proximity of a presence and/or a gesture associated with the presence, showing right amount of information and/or touch control options at a right distance. For example, most useful information is provided in a far view based on common user intents, and additional information and controls are provided in a near view when a user is sufficiently close to the electronic device. That said, each touchless UX operation is initiated based on an initiation condition involving a confidence level associated with a determination of the proximity of the presence and associated gesture.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for controlling user experience (UX) operations, comprising:
    on an electronic device having one or more processors and memory:
        detecting, from a first sensor signal, while a first application and a second application are being executed on the electronic device, a proximity of a presence with respect to the electronic device,
        wherein the first application corresponds to at least a first UX operation having a first initiation condition, the second application corresponds to at least a second UX operation having a second initiation condition, and the first and second initiation conditions include at least a required proximity range and a required confidence level;
        detecting, from a second sensor signal, a gesture associated with the proximity of the presence;
        determining whether the first and second initiation conditions have been satisfied by determining whether the proximity is detected in the required proximity range and by determining whether the gesture is a predefined gesture associated with both the first UX operation and the second UX operation with at least the required confidence level; and
        in accordance with a determination that the initiation condition has been satisfied, initializing the first UX operation associated with the first application and initializing the second UX operation associated with the second application.

2. The method of claim 1, further comprising identifying the first application being executed on the electronic device.

3. The method of claim 1, further comprising identifying the first UX operation associated with the first application.

4. The method of claim 1, wherein the determining whether the initiation condition has been satisfied is further by determining whether the proximity is detected in the required proximity range with at least the required confidence level.

5. The method of claim 1, wherein both the first sensor signal and the second sensor signal are originated from an ultrasonic sensor of the electronic device, further comprising:
    applying a first setting to the ultrasonic sensor to render the first sensor signal;
    applying a second setting to the ultrasonic sensor to render the second sensor signal, wherein the second sensor signal is associated with a higher signal-to-noise ratio than the first sensor signal.

6. The method of claim 1, wherein the first sensor signal is generated from an ultrasonic sensor of the electronic device, and the second sensor signal includes a video signal captured by a camera of the electronic device.

7. The method of claim 1, wherein the determining whether the gesture is a predefined gesture associated with the first UX operation is based on a machine learning model including at least a first classifier and a second classifier, and the second classifier has a higher complexity level than the first classifier and is applied after the first classifier is applied and results in an intermediate confidence level that satisfies the required confidence level.

8. The method of claim 1, wherein the initiation condition includes a first initiation condition including at least detection of the presence and the gesture in a first required proximity range with a first required confidence level, further comprising:
    identifying a third UX operation associated with the first application, the third UX operation having a third initiation condition including at least detection of the presence and the gesture in the required proximity range with a third required confidence level, the third required proximity range being distinct from the first required proximity range; and
    in accordance with the determination that the third initiation condition has been satisfied, aborting the first UX operation and initializing the third UX operation associated with the first application.

9. The method of claim 1, wherein:
    the first initiation condition is associated with a first required confidence level; and
    the second initiation condition is associated with second required confidence level that is lower than the first required confidence level.

10. An electronic device, comprising:
one or more processors; and
memory having instructions stored thereon, which when executed by the one or more processors cause the one or more processors to:
- detect, from a first sensor signal, while a first application and a second application are being executed on the electronic device, a proximity of a presence with respect to the electronic device,
- wherein the first application corresponds to at least a first UX operation having a first initiation condition, the second application corresponds to at least a second UX operation having a second initiation condition, and the first and second initiation conditions include at least a required proximity range and a required confidence level;
- detect, from a second sensor signal, a gesture associated with the proximity of the presence;
- determine whether the first and second initiation conditions have been satisfied by determining whether the proximity is detected in the required proximity range and by determining whether the gesture is a predefined gesture associated with both the first UX operation and the second UX operation with at least the required confidence level; and
- in accordance with a determination that the initiation condition has been satisfied, initialize the first UX operation associated with the first application and initializing the second UX operation associated with the second application.

11. The electronic device of claim 10, wherein the instructions, when executed, further cause the one or more processors to identify the first application being executed on the electronic device.

12. The electronic device of claim 10, wherein the instructions, when executed, further cause the one or more processors to identify the first UX operation associated with the first application.

13. The electronic device of claim 10, wherein the instructions, when executed, cause the one or more processors to determine whether the initiation condition has been satisfied is further by determining whether the proximity is detected in the required proximity range with at least the required confidence level.

14. The electronic device of claim 10, wherein both the first sensor signal and the second sensor signal are originated from an ultrasonic sensor of the electronic device, and wherein the instructions, when executed, further cause the one or more processors to:
- apply a first setting to the ultrasonic sensor to render the first sensor signal;
- apply a second setting to the ultrasonic sensor to render the second sensor signal, wherein the second sensor signal is associated with a higher signal-to-noise ratio than the first sensor signal.

15. The electronic device of claim 10, wherein the first sensor signal is generated from an ultrasonic sensor of the electronic device, and the second sensor signal includes a video signal captured by a camera of the electronic device.

16. The electronic device of claim 10, wherein the instructions, when executed, cause the one or more processors to determine whether the gesture is a predefined gesture associated with the first UX operation based on a machine learning model including at least a first classifier and a second classifier, and the second classifier has a higher complexity level than the first classifier and is applied after the first classifier is applied and results in an intermediate confidence level that satisfies the required confidence level.

17. The electronic device of claim 10, wherein the initiation condition includes a first initiation condition including at least detection of the presence and the gesture in a first required proximity range with a first required confidence level, and wherein the instructions, when executed, further cause the one or more processors to:
- identify a third UX operation associated with the first application, the third UX operation having a third initiation condition including at least detection of the presence and the gesture in the required proximity range with a third required confidence level, the third required proximity range being distinct from the first required proximity range; and
- in accordance with the determination that the third initiation condition has been satisfied, abort the first UX operation and initializing the third UX operation associated with the first application.

18. A non-transitory computer-readable medium, having instructions stored thereon, which when executed by one or more processors of an electronic device cause the one or more processors to perform operations comprising:
- detecting, from a first sensor signal, while a first application and a second application are being executed on the electronic device, a proximity of a presence with respect to the electronic device,
- wherein the first application corresponds to at least a first UX operation having a first initiation condition, the second application corresponds to at least a second UX operation having a second initiation condition, and the first and second initiation conditions include at least a required proximity range and a required confidence level;
- detecting, from a second sensor signal, a gesture associated with the proximity of the presence;
- determining whether the first and second initiation conditions have been satisfied by determining whether the proximity is detected in the required proximity range and by determining whether the gesture is a predefined gesture associated with both the first UX operation and the second UX operation with at least the required confidence level; and
- in accordance with a determination that the initiation condition has been satisfied, initializing the first UX operation associated with the first application and initializing the second UX operation associated with the second application.

* * * * *